(12) United States Patent
Petersen et al.

(10) Patent No.: US 12,235,505 B2
(45) Date of Patent: Feb. 25, 2025

(54) FIBER OPTIC CASSETTE ARRANGEMENT

(71) Applicant: CommScope Technologies LLC, Hickory, NC (US)

(72) Inventors: Cyle D. Petersen, Belle Plaine, MN (US); Bruce Ogren, Edina, MN (US); Scott C. Sievers, Jordan, MN (US); Thomas Marcouiller, Shakopee, MN (US); Chris Charles Taylor, Cheltenham Glos (GB); Mark Meredith, Hutto, TX (US); James Joseph Eberle, Jr., Hummelstown, PA (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 18/361,063

(22) Filed: Jul. 28, 2023

(65) Prior Publication Data
US 2023/0367091 A1 Nov. 16, 2023

Related U.S. Application Data

(63) Continuation of application No. 17/497,689, filed on Oct. 8, 2021, now Pat. No. 11,714,246, which is a
(Continued)

(51) Int. Cl.
*G02B 6/44* (2006.01)
*G02B 6/38* (2006.01)
(Continued)

(52) U.S. Cl.
CPC ......... *G02B 6/4453* (2013.01); *G02B 6/3817* (2013.01); *G02B 6/3825* (2013.01);
(Continued)

(58) Field of Classification Search
CPC .............................................. G02B 6/445338
See application file for complete search history.

(56) References Cited

U.S. PATENT DOCUMENTS

| 3,243,761 A | 3/1966 | Piorunneck |
| RE26,692 E | 10/1969 | Ruehlemann |
| (Continued) | | |

FOREIGN PATENT DOCUMENTS

| CA | 2499803 | 4/2004 |
| CN | 104898212 A | 9/2015 |
| (Continued) | | |

OTHER PUBLICATIONS

*Avaya's Enhanced SYSTIMAX® iPatch System Enables IT Managers to Optimise Network Efficiency and Cut Downtime*, Press Release, May 9, 2003, obtained from http://www.avaya.com/usa/about-avaya/newsroom/news-releases/2003/pr-030509 on Jan. 7, 2009.
(Continued)

*Primary Examiner* — Charlie Y Peng
(74) *Attorney, Agent, or Firm* — Merchant & Gould P.C.

(57) ABSTRACT

An adapter assembly includes a single-piece or two-piece multi-fiber adapter defining a recess at which a contact assembly is disposed. The adapter assemblies can be disposed within adapter block assemblies or cassettes, which can be mounted to moveable trays. Both ports of the adapters disposed within adapter block assemblies are accessible. Only one port of each adapter disposed within the cassettes are accessible. Circuit boards can be mounted within the block assemblies or cassettes to provide communication between the contact assemblies and a data network.

20 Claims, 64 Drawing Sheets

Related U.S. Application Data continuation of application No. 16/799,328, filed on Feb. 24, 2020, now Pat. No. 11,143,833, which is a continuation of application No. 16/025,176, filed on Jul. 2, 2018, now Pat. No. 10,571,641, which is a continuation of application No. 15/243,510, filed on Aug. 22, 2016, now Pat. No. 10,012,813, which is a continuation of application No. 14/170,157, filed on Jan. 31, 2014, now Pat. No. 9,423,570.

(60) Provisional application No. 61/843,733, filed on Jul. 8, 2013, provisional application No. 61/761,048, filed on Feb. 5, 2013.

(51) Int. Cl.
  *G02B 6/42* (2006.01)
  *G02B 6/43* (2006.01)
  *H04Q 1/02* (2006.01)
  *H04Q 1/06* (2006.01)

(52) U.S. Cl.
  CPC ......... *G02B 6/3874* (2013.01); *G02B 6/3895* (2013.01); *G02B 6/3897* (2013.01); *G02B 6/428* (2013.01); *G02B 6/43* (2013.01); *G02B 6/4457* (2013.01); *H04Q 1/023* (2013.01); *H04Q 1/06* (2013.01); *G02B 6/3885* (2013.01); *G02B 6/4452* (2013.01)

(56) References Cited

U.S. PATENT DOCUMENTS

| | | | |
|---|---|---|---|
| 3,954,320 | A | 5/1976 | Hardesty |
| 4,127,317 | A | 11/1978 | Tyree |
| 4,737,120 | A | 4/1988 | Grabbe et al. |
| 4,953,194 | A | 8/1990 | Hansen et al. |
| 4,968,929 | A | 11/1990 | Hauck et al. |
| 5,041,005 | A | 8/1991 | McHugh |
| 5,052,940 | A | 10/1991 | Bengal |
| 5,064,381 | A | 11/1991 | Lin |
| 5,107,532 | A | 4/1992 | Hansen et al. |
| 5,161,988 | A | 11/1992 | Krupka |
| 5,166,970 | A | 11/1992 | Ward |
| 5,199,895 | A | 4/1993 | Chang |
| 5,222,164 | A | 6/1993 | Bass, Sr. et al. |
| 5,261,024 | A | 11/1993 | Allen et al. |
| 5,265,187 | A | 11/1993 | Morin et al. |
| 5,305,405 | A | 4/1994 | Emmons et al. |
| 5,353,367 | A | 10/1994 | Czosnowski et al. |
| 5,393,249 | A | 2/1995 | Morgenstern et al. |
| 5,394,503 | A | 2/1995 | Dietz, Jr. et al. |
| 5,413,494 | A | 5/1995 | Dewey et al. |
| 5,418,334 | A | 5/1995 | Williams |
| 5,419,717 | A | 5/1995 | Abendschein et al. |
| 5,448,675 | A | 9/1995 | Leone et al. |
| 5,467,062 | A | 11/1995 | Burroughs et al. |
| 5,470,251 | A | 11/1995 | Sano |
| 5,473,715 | A | 12/1995 | Schofield et al. |
| 5,483,467 | A | 1/1996 | Krupka et al. |
| 5,579,425 | A | 11/1996 | Lampert et al. |
| 5,674,085 | A | 10/1997 | Davis et al. |
| 5,685,741 | A | 11/1997 | Dewey et al. |
| 5,712,942 | A | 1/1998 | Jennings et al. |
| 5,800,192 | A | 9/1998 | David et al. |
| 5,821,510 | A | 10/1998 | Cohen et al. |
| 5,854,824 | A | 12/1998 | Bengal et al. |
| 5,871,368 | A | 2/1999 | Erdner et al. |
| 5,910,776 | A | 6/1999 | Black |
| 5,956,449 | A | 9/1999 | Otani et al. |
| 6,002,331 | A | 12/1999 | Laor |
| 6,095,837 | A | 8/2000 | David et al. |
| 6,095,851 | A | 8/2000 | Laity et al. |
| 6,116,961 | A | 9/2000 | Henneberger et al. |
| 6,201,920 | B1 | 3/2001 | Noble et al. |
| 6,222,908 | B1 | 4/2001 | Bartolutti et al. |
| 6,222,975 | B1 | 4/2001 | Gilbert et al. |
| 6,227,911 | B1 | 5/2001 | Boutros et al. |
| 6,234,830 | B1 | 5/2001 | Ensz et al. |
| 6,238,235 | B1 | 5/2001 | Shavit et al. |
| 6,280,231 | B1 | 8/2001 | Nicholls |
| 6,285,293 | B1 | 9/2001 | German et al. |
| 6,300,877 | B1 | 10/2001 | Schannach et al. |
| 6,305,848 | B1 | 10/2001 | Gregory |
| 6,330,148 | B1 | 12/2001 | Won et al. |
| 6,330,307 | B1 | 12/2001 | Bloch et al. |
| 6,350,148 | B1 | 2/2002 | Bartolutti et al. |
| 6,364,694 | B1 | 4/2002 | Lien |
| 6,409,392 | B1 | 6/2002 | Lampert et al. |
| 6,421,322 | B1 | 7/2002 | Koziy et al. |
| 6,422,895 | B1 | 7/2002 | Lien |
| 6,424,710 | B1 | 7/2002 | Bartolutti et al. |
| 6,437,894 | B1 | 8/2002 | Gilbert et al. |
| 6,456,768 | B1 | 9/2002 | Boncek et al. |
| D466,479 | S | 12/2002 | Pein et al. |
| 6,499,861 | B1 | 12/2002 | German et al. |
| 6,504,986 | B1 * | 1/2003 | Wambeke ......... G02B 6/44524 385/134 |
| 6,511,231 | B2 | 1/2003 | Lampert et al. |
| 6,522,737 | B1 | 2/2003 | Bartolutti et al. |
| 6,554,484 | B2 | 4/2003 | Lampert |
| 6,574,586 | B1 | 6/2003 | David et al. |
| 6,612,856 | B1 | 9/2003 | McCormack |
| 6,626,697 | B1 | 9/2003 | Martin et al. |
| 6,636,152 | B2 | 10/2003 | Schannach et al. |
| 6,684,179 | B1 | 1/2004 | David |
| 6,725,177 | B2 | 4/2004 | David et al. |
| 6,743,044 | B2 | 6/2004 | Musolf et al. |
| 6,793,408 | B2 | 9/2004 | Levy et al. |
| 6,802,735 | B2 | 10/2004 | Pepe et al. |
| 6,808,116 | B1 | 10/2004 | Eslambolchi et al. |
| 6,811,446 | B1 | 11/2004 | Chang |
| 6,814,624 | B2 | 11/2004 | Clark et al. |
| 6,850,685 | B2 | 2/2005 | Tinucci et al. |
| 6,898,368 | B2 | 5/2005 | Colombo et al. |
| 6,905,363 | B2 | 6/2005 | Musolf et al. |
| 6,932,517 | B2 | 8/2005 | Swayze et al. |
| D510,068 | S | 9/2005 | Haggay et al. |
| 6,939,168 | B2 | 9/2005 | Oleynick et al. |
| 6,961,675 | B2 | 11/2005 | David |
| 6,971,895 | B2 | 12/2005 | Sago et al. |
| 6,976,867 | B2 | 12/2005 | Navarro et al. |
| 7,077,710 | B2 | 7/2006 | Haggay et al. |
| 7,081,808 | B2 | 7/2006 | Colombo et al. |
| 7,088,880 | B1 | 8/2006 | Gershman |
| 7,112,090 | B2 | 9/2006 | Caveney et al. |
| 7,123,810 | B2 | 10/2006 | Parrish |
| 7,153,142 | B2 | 12/2006 | Shifris et al. |
| 7,165,728 | B2 | 1/2007 | Durrant et al. |
| 7,193,422 | B2 | 3/2007 | Velleca et al. |
| 7,207,819 | B2 | 4/2007 | Chen |
| 7,210,858 | B2 | 5/2007 | Sago et al. |
| 7,226,217 | B1 | 6/2007 | Benton et al. |
| 7,234,944 | B2 | 6/2007 | Nordin et al. |
| 7,241,157 | B2 | 7/2007 | Zhuang et al. |
| 7,296,935 | B1 | 11/2007 | Childers et al. |
| 7,297,018 | B2 | 11/2007 | Caveney et al. |
| 7,300,214 | B2 | 11/2007 | Doo et al. |
| 7,312,715 | B2 | 12/2007 | Shalts et al. |
| D559,186 | S | 1/2008 | Kelmer |
| 7,315,224 | B2 | 1/2008 | Gurovich et al. |
| 7,330,625 | B2 | 2/2008 | Barth |
| 7,352,289 | B1 | 4/2008 | Harris |
| 7,356,208 | B2 | 4/2008 | Becker |
| 7,370,106 | B2 | 5/2008 | Caveney |
| 7,384,300 | B1 | 6/2008 | Salgado et al. |
| 7,396,245 | B2 | 7/2008 | Huang et al. |
| 7,458,517 | B2 | 12/2008 | Durrant et al. |
| 7,479,032 | B2 | 1/2009 | Hoath et al. |
| 7,488,206 | B2 | 2/2009 | Caveney et al. |
| 7,490,996 | B2 | 2/2009 | Sommer |
| 7,497,709 | B1 | 3/2009 | Zhang |
| 7,519,000 | B2 | 4/2009 | Caveney et al. |
| 7,534,137 | B2 | 5/2009 | Caveney et al. |

(56) References Cited

U.S. PATENT DOCUMENTS

| | | |
|---|---|---|
| 7,552,872 B2 | 6/2009 | Tokita et al. |
| 7,563,116 B2 | 7/2009 | Wang |
| 7,570,861 B2 | 8/2009 | Smrha et al. |
| 7,575,454 B1 | 8/2009 | Aoki et al. |
| 7,588,470 B2 | 9/2009 | Li et al. |
| 7,591,667 B2 | 9/2009 | Gatnau Navarro et al. |
| 7,607,926 B2 | 10/2009 | Wang |
| 7,607,938 B2 | 10/2009 | Clark et al. |
| 7,635,280 B1 | 12/2009 | Crumlin et al. |
| 7,648,377 B2 | 1/2010 | Naito et al. |
| 7,682,174 B2 | 3/2010 | Chen |
| 7,722,370 B2 | 5/2010 | Chin |
| 7,727,026 B2 | 6/2010 | Qin et al. |
| 7,751,674 B2 | 7/2010 | Hill |
| 7,785,154 B2 | 8/2010 | Peng |
| 7,798,832 B2 | 9/2010 | Qin et al. |
| 7,811,119 B2 | 10/2010 | Caveney et al. |
| 7,814,240 B2 | 10/2010 | Salgado et al. |
| 7,867,017 B1 | 1/2011 | Chen |
| 7,869,426 B2 | 1/2011 | Hough et al. |
| 7,872,738 B2 | 1/2011 | Abbott |
| 7,880,475 B2 | 2/2011 | Crumlin et al. |
| 8,119,915 B2 | 2/2012 | Regester et al. |
| 8,157,582 B2 | 4/2012 | Frey et al. |
| 8,282,425 B2 | 10/2012 | Bopp et al. |
| 8,287,316 B2 | 10/2012 | Pepe et al. |
| 8,326,107 B2 | 12/2012 | Cooke et al. |
| 8,467,651 B2 | 6/2013 | Cao et al. |
| 8,488,934 B2 | 7/2013 | Zhou et al. |
| 8,596,882 B2 | 12/2013 | Smrha et al. |
| 8,690,593 B2 | 4/2014 | Anderson et al. |
| 8,879,883 B2 | 11/2014 | Parikh et al. |
| 8,992,260 B2 | 3/2015 | Coffey et al. |
| 9,057,859 B2 | 6/2015 | Solheid et al. |
| 9,128,262 B2 | 9/2015 | Campbell et al. |
| 9,285,552 B2 | 3/2016 | Marcouiller et al. |
| 9,379,501 B2 | 6/2016 | Taylor et al. |
| 9,389,384 B2 | 7/2016 | Solheid et al. |
| 9,423,570 B2 | 8/2016 | Petersen et al. |
| 10,012,813 B2 | 7/2018 | Petersen et al. |
| 10,571,641 B2 | 2/2020 | Petersen et al. |
| 11,143,833 B2 | 10/2021 | Petersen et al. |
| 2002/0008613 A1 | 1/2002 | Nathan et al. |
| 2002/0081076 A1 | 6/2002 | Lampert et al. |
| 2002/0181922 A1 | 12/2002 | Xin et al. |
| 2003/0031423 A1 | 2/2003 | Zimmel |
| 2004/0052471 A1 | 3/2004 | Colombo et al. |
| 2004/0052498 A1 | 3/2004 | Colombo et al. |
| 2004/0117515 A1 | 6/2004 | Sago et al. |
| 2004/0240807 A1 | 12/2004 | Frohlich et al. |
| 2005/0249477 A1 | 11/2005 | Parrish |
| 2006/0160395 A1 | 7/2006 | Macauley et al. |
| 2006/0193591 A1 | 8/2006 | Rapp et al. |
| 2006/0228086 A1 | 10/2006 | Holmberg et al. |
| 2007/0116411 A1 | 5/2007 | Benton et al. |
| 2007/0237470 A1 | 10/2007 | Aronson et al. |
| 2007/0254529 A1 | 11/2007 | Pepe et al. |
| 2008/0090450 A1 | 4/2008 | Harano et al. |
| 2008/0090454 A1 | 4/2008 | Hoath et al. |
| 2008/0100456 A1 | 5/2008 | Downie et al. |
| 2008/0100467 A1 | 5/2008 | Downie et al. |
| 2008/0175532 A1 | 7/2008 | Ruckstuhl et al. |
| 2008/0175550 A1 | 7/2008 | Coburn et al. |
| 2009/0034911 A1 | 2/2009 | Murano |
| 2009/0067800 A1 | 3/2009 | Vazquez et al. |
| 2009/0097846 A1 | 4/2009 | Kozischek et al. |
| 2009/0166404 A1 | 7/2009 | German et al. |
| 2009/0215310 A1 | 8/2009 | Hoath et al. |
| 2009/0232455 A1 | 9/2009 | Nhep |
| 2010/0048064 A1 | 2/2010 | Peng |
| 2010/0054682 A1 | 3/2010 | Cooke et al. |
| 2010/0158465 A1 | 6/2010 | Smrha |
| 2010/0211664 A1 | 8/2010 | Raza et al. |
| 2010/0211665 A1 | 8/2010 | Raza et al. |
| 2010/0211697 A1 | 8/2010 | Raza et al. |
| 2010/0215049 A1 | 8/2010 | Raza et al. |
| 2010/0303421 A1 | 12/2010 | He et al. |
| 2011/0026893 A1 | 2/2011 | Omori et al. |
| 2011/0043371 A1 | 2/2011 | German et al. |
| 2011/0115494 A1 | 5/2011 | Taylor et al. |
| 2011/0116748 A1 | 5/2011 | Smrha et al. |
| 2011/0222819 A1 | 9/2011 | Anderson et al. |
| 2011/0235979 A1 | 9/2011 | Anderson et al. |
| 2011/0255829 A1 | 10/2011 | Anderson et al. |
| 2012/0003877 A1 | 1/2012 | Bareel et al. |
| 2012/0021636 A1 | 1/2012 | Debendictis et al. |
| 2012/0133524 A1 | 5/2012 | Anderson et al. |
| 2012/0168521 A1 | 7/2012 | Jones et al. |
| 2012/0208401 A1 | 8/2012 | Petersen |
| 2012/0294572 A1 | 11/2012 | Petersen |
| 2012/0301098 A1* | 11/2012 | Benedetto .............. H04Q 1/021 385/135 |
| 2012/0322310 A1 | 12/2012 | Taylor |
| 2013/0287356 A1 | 10/2013 | Solheid et al. |
| 2014/0016901 A1 | 1/2014 | Lambourn et al. |
| 2014/0286610 A1 | 9/2014 | Anderson et al. |

FOREIGN PATENT DOCUMENTS

| | | |
|---|---|---|
| DE | 102 44 304 | 3/2004 |
| DE | 10 2004 033 940 A1 | 2/2006 |
| EP | 1 199 586 A2 | 4/2002 |
| EP | 1 237 024 A1 | 9/2002 |
| EP | 1 467 232 A1 | 10/2004 |
| EP | 1 662 287 A1 | 5/2006 |
| JP | 2005-84162 | 3/2005 |
| WO | WO 00/65696 | 11/2000 |
| WO | WO 02/47215 A1 | 6/2002 |
| WO | WO 2007/061490 A2 | 5/2007 |
| WO | WO 2010/001400 A1 | 1/2010 |
| WO | WO 2010/081186 A1 | 7/2010 |
| WO | WO 2010/121639 A1 | 10/2010 |
| WO | WO 2011/019574 A1 | 2/2011 |
| WO | WO 2014/009344 A1 | 1/2014 |

OTHER PUBLICATIONS

*Avaya's Enhanced SYSTIMAX® iPatch System Enables IT Managers to Optimise Network Efficiency and Cut Downtime*, Press Release, May 20, 2003, obtained from http://www.avaya.com/usa/about-avaya/newsroom/news-releases/2003/pr-030520 on Jan. 7, 2009.

European Search Report for Application No. 14748510.6 mailed Aug. 25, 2016.

FOCIS 10—Fiber Optic Connector Intermateability Standard—Type LC, TIA/EIA-604-10A, 38 pages (Mar. 2002).

*Intelligent patching systems carving out a 'large' niche*, Cabling Installation & Maintenance, vol. 12, Issue 7, Jul. 2004 (5 pages).

*IntelliMAC: The intelligent way to make Moves, Adds or Changes!* NORDX/CDT ©2003 (6 pages).

International Search Report and Written Opinion for PCT/US2014/014878 mailed Aug. 18, 2014.

ITRACS Physical Layer Manager FAQ, obtained on Jun. 11, 2008 from http://www.itracs.com/products/physical-layer-manager-faqs.html (6 pages).

Meredith, L., "Managers missing point of intelligent patching," *Daa Center News*, Jun. 21, 2005, obtained Dec. 2, 2008 from http://searchdatacenter.techtarget.com/news/article/0,289142,sid80_gcil099991,00.html.

Ohtsuki, F. et al., "Design of Optical Connectors with ID Modules," *Electronics and Communications in Japan*, Part 1, vol. 77, No. 2, pp. 94-105 (Feb. 1994).

*SYSTIMAX® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.

TrueNet; TFP Series Rack Mount Fiber Panels, Spec Sheet; May 2008; 8 pages.

* cited by examiner

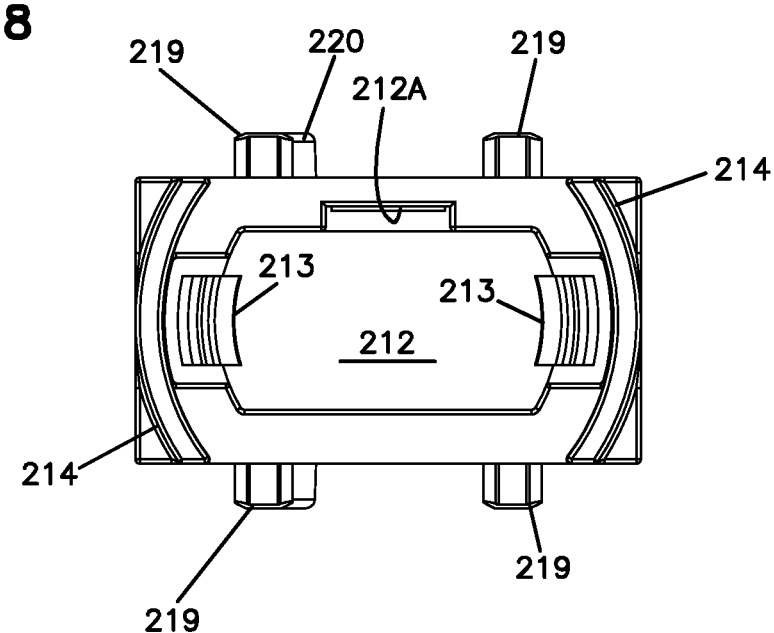
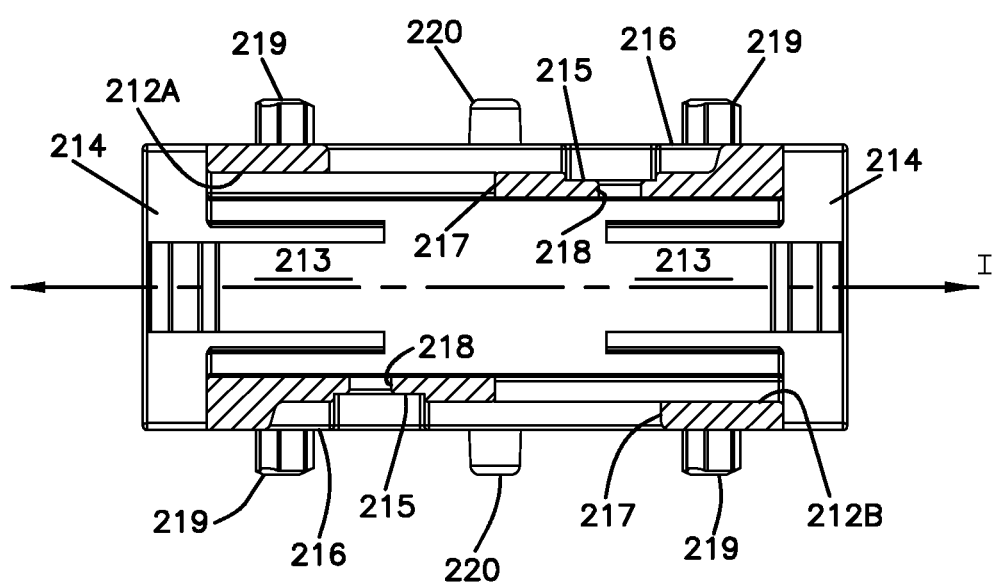

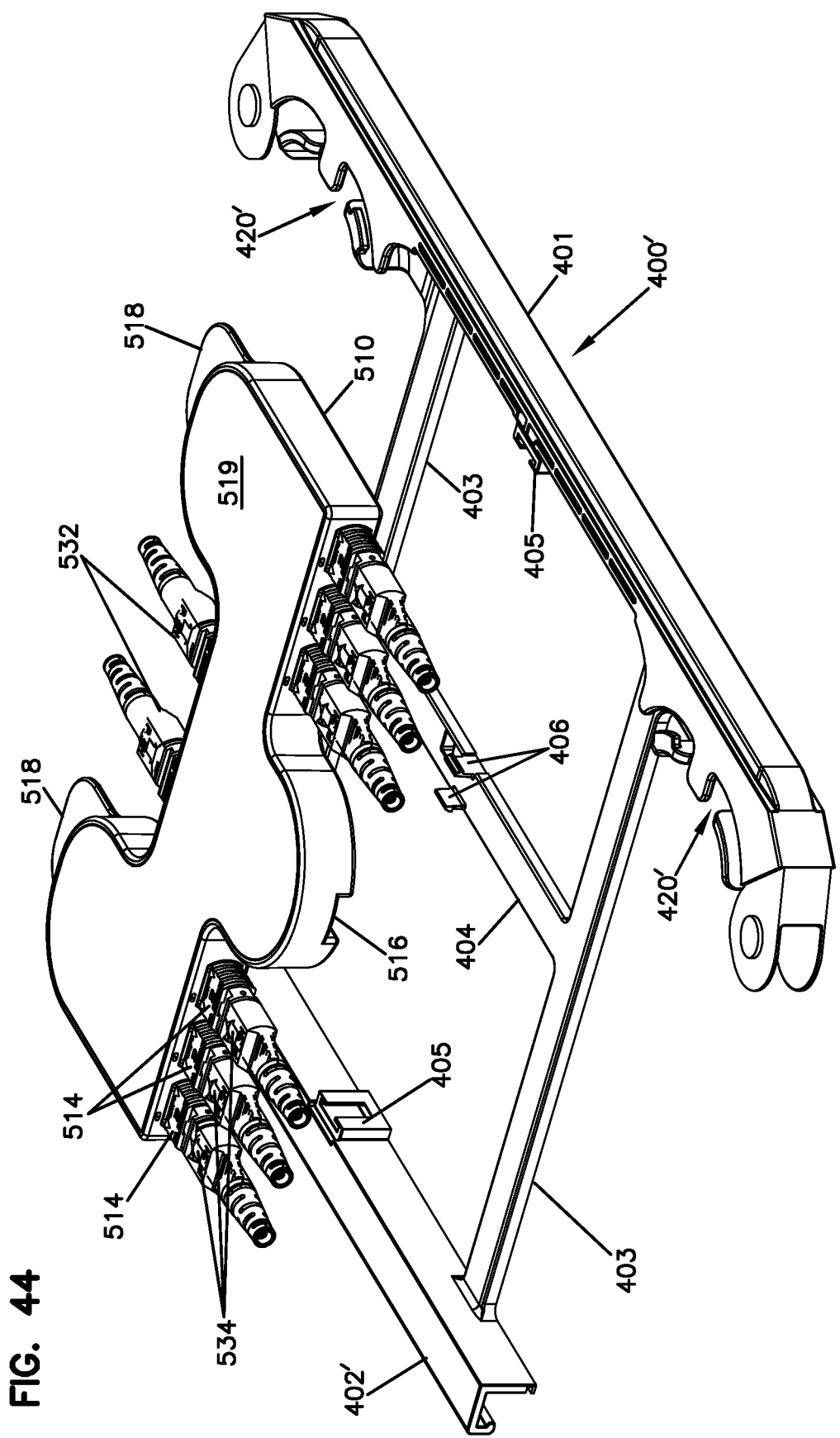

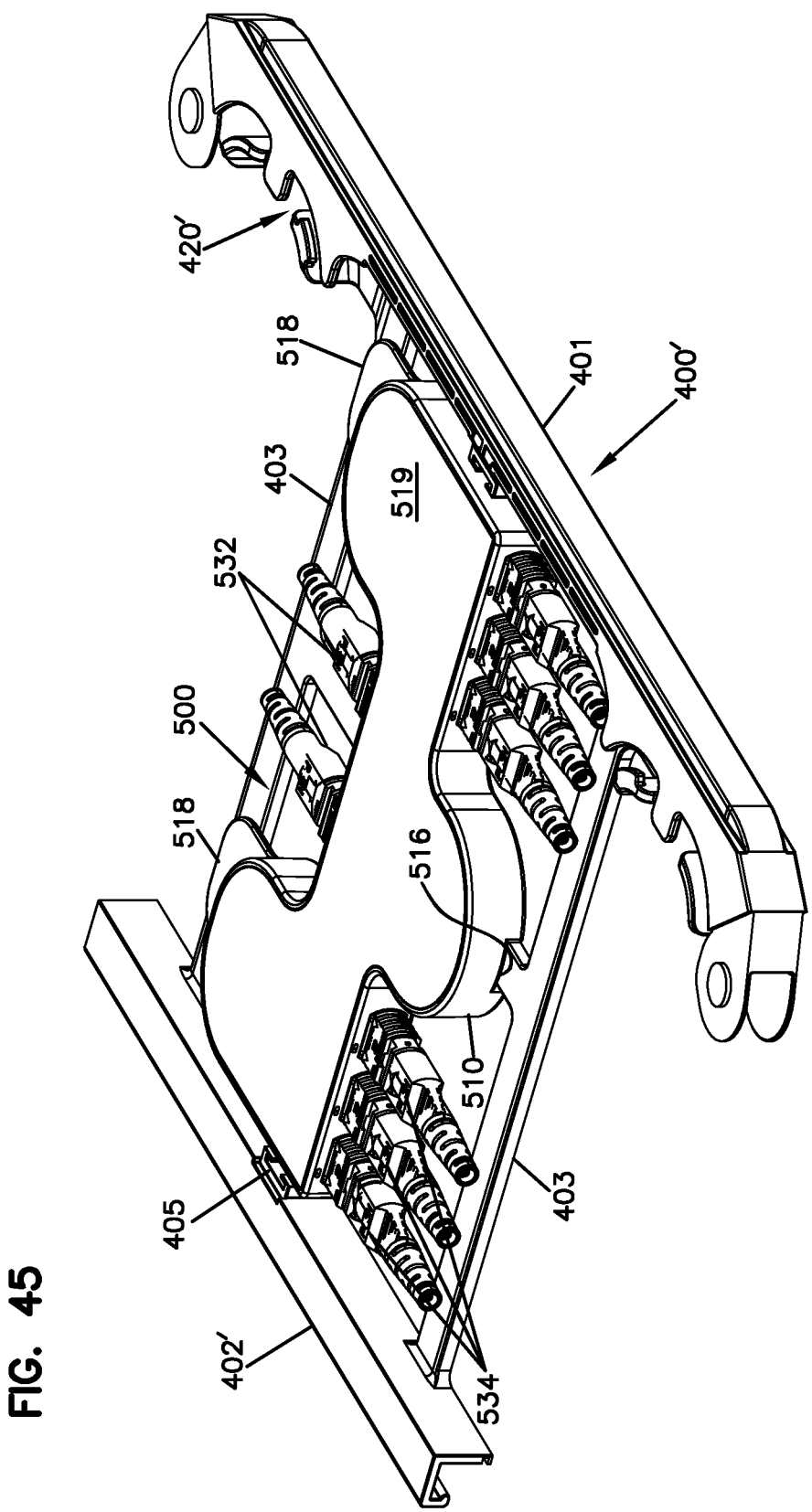

FIBER OPTIC CASSETTE ARRANGEMENT

CROSS-REFERENCE TO RELATED APPLICATIONS

This application is a continuation of application Ser. No. 17/497,689, filed Oct. 8, 2021, now U.S. Pat. No. 11,714,246, which is a continuation of application Ser. No. 16/799,328, filed Feb. 24, 2020, now U.S. Pat. No. 11,143,833, which is a continuation of application Ser. No. 16/025,176, filed Jul. 2, 2018, now U.S. Pat. No. 10,571,641, which is a continuation of application Ser. No. 15/243,510, filed Aug. 22, 2016, now U.S. Pat. No. 10,012,813, which is a continuation of application Ser. No. 14/170,157, filed Jan. 31, 2014, now U.S. Pat. No. 9,423,570, which application claims the benefit of provisional application Ser. No. 61/761,048, filed Feb. 5, 2013, and titled "Optical Assemblies with Managed Connectivity;" and of provisional application Ser. No. 61/843,733, filed Jul. 8, 2013, and titled "Optical Assemblies with Managed Connectivity;" which applications are incorporated herein by reference in their entirety.

BACKGROUND

In communications infrastructure installations, a variety of communications devices can be used for switching, cross-connecting, and interconnecting communications signal transmission paths in a communications network. Some such communications devices are installed in one or more equipment racks to permit organized, high-density installations to be achieved in limited space available for equipment.

Communications devices can be organized into communications networks, which typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord" cross connects the two together. In other words, a single logical communication link is often implemented using several segments of physical communication media.

Network management systems (NMS) are typically aware of logical communication links that exist in a communications network, but typically do not have information about the specific physical layer media (e.g., the communications devices, cables, couplers, etc.) that are used to implement the logical communication links. Indeed, NMS systems typically do not have the ability to display or otherwise provide information about how logical communication links are implemented at the physical layer level.

SUMMARY

The present disclosure relates to communications connector assemblies and connector arrangements that provide physical layer management capabilities. In accordance with certain aspects, the disclosure relates to fiber optic connector assemblies and contact assemblies.

In accordance with some aspects of the disclosure, an example contact assembly includes contact members coupled to the body so that first ends of the contact members extend from a first end of the body and second ends of the contact members extend from a second end of the body. The first end of each contact member defines a first contact surface; the second end of each contact member defines an extension section extending outwardly from the body to a second contact surface; and the second end of each contact member also defines a third contact surface at an opposite side of the second contact surface from the extension section. The extension sections is angled relative to the body so that adjacent ones of the second contact surfaces of the contact members are located closer together than adjacent ones of the first contact surfaces of the contact members.

In an example, the body includes a peg. In an example, the body is overmolded over the contact members. In certain implementations, the first and third contact surfaces define curve in an opposite direction from the second contact surfaces. In certain implementations, the body is coupled to an optical adapter so that at least the second contact surfaces of the contact members are accessible within an interior of the optical adapter.

In accordance with other aspects of the disclosure, an optical adapter assembly includes (a) an optical adapter; (b) a mounting recess; and (c) parallel ribs disposed at the opposite ends of the mounting recess. The adapter defines opposing first port and second ports at which optical plug connectors can be received. The optical adapter also has first and second ends that extend between the opposing ports. The mounting recess is defined in the first end of the adapter. The mounting recess extends along a length between opposite ends of the mounting recess. The mounting recess has a surface that is recessed relative to the first end and is configured to receive a contact assembly. The mounting recess also defines a first aperture through the surface that leads to an interior of the optical adapter. The parallel ribs are disposed at the opposite ends of the mounting recess. The ribs extend over less than a majority of the length of the mounting recess.

In certain examples, the mounting recess also defines a second aperture through the recessed surface that is smaller than the first aperture. In certain implementations, the optical adapter assembly also includes a second mounting recess defined in the second end of the optical adapter; and parallel ribs disposed at the opposite ends of the second mounting recess. The second mounting recess extends along a second length between opposite ends of the second mounting recess. The second mounting recess has a second surface that is recessed relative to the second end of the optical adapter and is configured to receive a second contact assembly. The second mounting recess also defines a first aperture through the second surface that leads to the interior of the optical adapter. The ribs of the second plurality extend over less than a majority of the second length of the second mounting recess.

In certain implementations, the optical adapter is formed as a two-piece housing with each housing piece being configured to receive a separate contact assembly. In other implementations, the optical adapter is formed from a one-piece adapter housing receiving two contact assemblies.

In certain implementations, a contact assembly, which includes contact members held together by a body, is sized to fit in the mounting recess so that the body seats on the recessed surface and so that the contact members extend between the ribs at the opposite ends of the mounting recess. In certain implementations, a circuit board is disposed across the first end of the optical adapter. The circuit board extends across the mounting recess so that the first and third contact surfaces of the contact assembly align with contact pads on the circuit board.

In accordance with other aspects of the disclosure, a cassette includes a cassette body, ports, and an optical fiber arrangement disposed within the cassette body. The cassette body includes fiber management sections extending outwardly from opposite sides of a fiber mating plane.

For example, the cassette body can include a connection section, a first fiber management section extending outwardly from a first port end of the cassette body towards a first side of the cassette body, a second fiber management section extending outwardly from the first port end of the cassette body towards a second side of the cassette body, and a third fiber management section extending outwardly from a second port end of the cassette body. A first port is disposed at the first port end of the connection section between the first and second fiber management sections. A second port is disposed at the second port end of the connection section towards the first side of the cassette body. A third port is disposed at the second port end of the connection section towards the second side of the cassette body. The optical fiber arrangement optically couples the first port with at least one of the second port and the third port.

In certain implementations, the optical fiber arrangement optically couples the first port with multiple of the second ports. In certain implementations, a fourth port is disposed at the first port end of the connection section between the first and second fiber management sections. The optical fiber arrangement optically couples the fourth port with the third port. In examples, the optical fiber arrangement optically couples the fourth port with multiple of the third ports. In an example, the fiber arrangement includes loose optical fibers. In another example, the fiber arrangement includes optical fibers laced onto a flexible substrate (e.g., a foil substrate).

In certain implementations, the ports are defined by optical adapters (e.g., MPO adapters). In certain implementations, the ports are defined by half-adapters.

In certain implementations, a circuit board is disposed within the connection section of the cassette body; and contact assemblies are electrically coupled to the circuit board. Each contact assembly aligns with one of the ports.

In certain implementations, management spools are disposed within the management sections. Each management spool includes a bend radius limiter and retention flanges extending outwardly from the bend radius limiter. In examples, each management spool has a height of no more than about 0.07 inches.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIGS. 6-10 illustrate an example of the optical adapter of FIG. 2;

FIG. 44 is a perspective view of the cassette of FIG. 38 exploded upwardly from an example tray; and FIG. 45 shows the cassette and tray of FIG. 44 assembled together;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

In general, media segments connect equipment of the communications network. Non-limiting examples of media segments include optical cables, electrical cables, and hybrid cables. This disclosure will focus on optical media segments. The media segments may be terminated with optical plug connectors, media converters, or other optical termination components.

Figure 1:
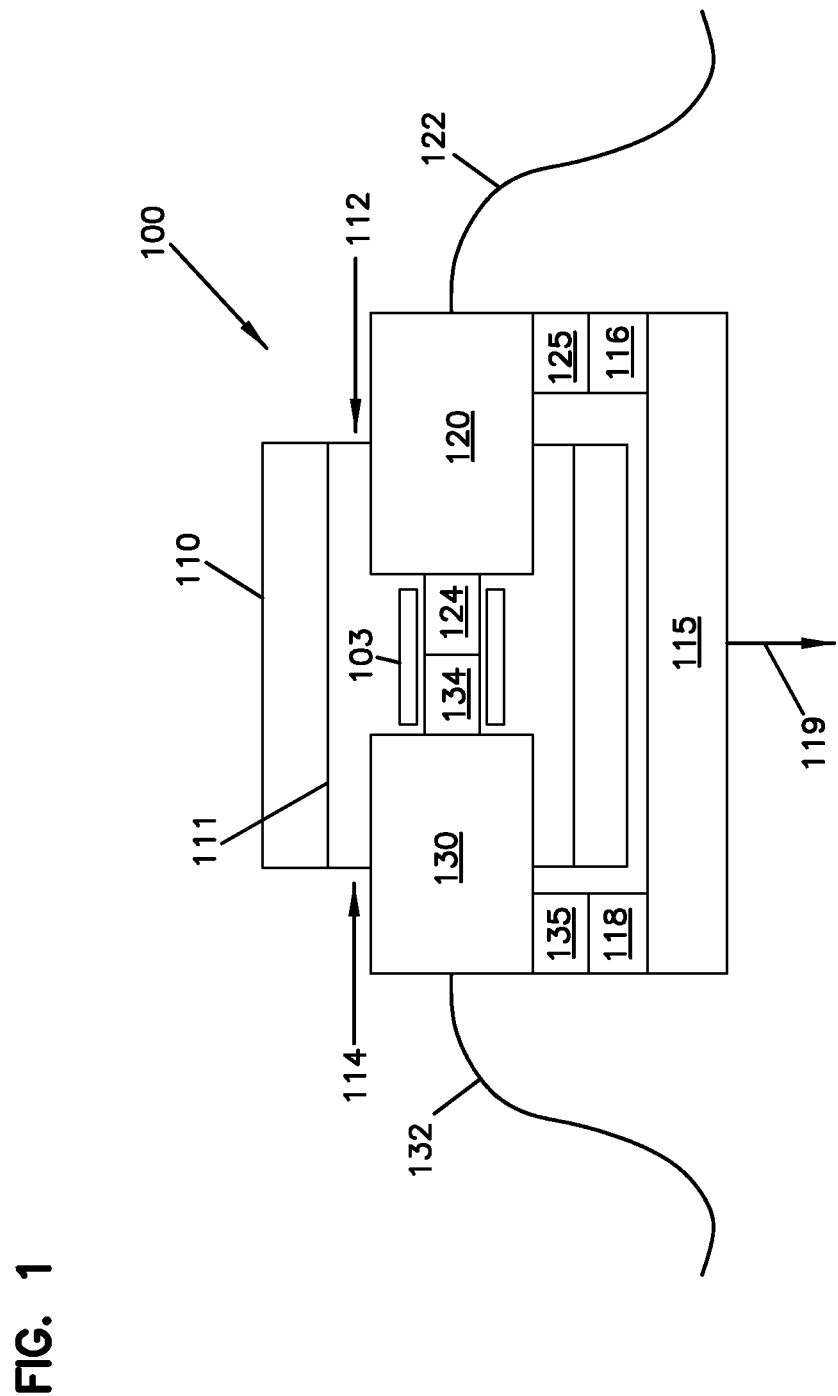
FIG. 1 is a schematic diagram showing two optical connectors with physical layer storage inserted at an optical adapter having media reading interfaces to access the physical layer storage of the connectors.

FIG. 1 is a schematic diagram of one example connection system 100 including a connector assembly (e.g., optical adapters, electrical sockets, wireless readers, etc.) 110 at which communications signals from a first media segment (e.g., an optical fiber, an electrical conductor, a wireless transceiver, etc.) 122 pass to another media segment 132. In some implementations, the media segments 122, 132 are terminated by connector arrangements 120, 130, respectively. The example connector assembly 110 connects segments of optical communications media in an optical network. In other implementations, however, the connector assembly 110 can connect electrical segments, wireless segments, or some combination thereof.

The connector assembly 110 includes a fiber optic adapter defining at least one connection opening 111 having a first port end 112 and a second port end 114. A sleeve (e.g., a split sleeve) 103 is arranged within the connection opening 111 of the adapter 110 between the first and second port ends 112, 114. Each port end 112, 114 is configured to receive a connector arrangement 120. Each fiber connector arrangement 120, 130 includes a ferrule 124, 134 through which optical signals from the optical fiber 122, 132, respectively, pass. The ferrules 124, 134 are held and aligned by a sleeve 103 to allow optical signals to pass between the ferrules 124, 134. The aligned ferrules 124, 134 of the connector arrangements 120, 130 create an optical path along which the communication signals may be carried.

In accordance with aspects of the disclosure, the communications network is coupled to or incorporates a data management system that provides physical layer information (PLI) functionality as well as physical layer management (PLM) functionality. As the term is used herein, "PLI functionality" refers to the ability of a physical component or system to identify or otherwise associate physical layer information with some or all of the physical components used to implement the physical layer of the communications network. As the term is used herein, "PLM functionality" refers to the ability of a component or system to manipulate or to enable others to manipulate the physical components used to implement the physical layer of the communications network (e.g., to track what is connected to each component, to trace connections that are made using the components, or to provide visual indications to a user at a selected component).

As the term is used herein, "physical layer information" refers to information about the identity, attributes, and/or status of the physical components used to implement the physical layer of the communications network. Physical layer information of the communications network can include media information, device information, and location information. Media information refers to physical layer information pertaining to cables, plugs, connectors, and other such physical media. Non-limiting examples of media information include a part number, a serial number, a plug type, a conductor type, a cable length, cable polarity, a cable pass-through capacity, a date of manufacture, a manufacturing lot number, the color or shape of the plug connector, an insertion count, and testing or performance information. Device information refers to physical layer information pertaining to the communications panels, inter-networking devices, media converters, computers, servers, wall outlets, and other physical communications devices to which the media segments attach. Location information refers to physical layer information pertaining to a physical layout of a building or buildings in which the network is deployed.

In accordance with some aspects, one or more of the components (e.g., media segments, equipment, etc.) of the communications network are configured to store physical layer information pertaining to the component as will be disclosed in more detail herein. Some components include media reading interfaces that are configured to read stored physical layer information from the components. The physical layer information obtained by the media reading interface may be communicated over the network for processing and/or storage.

For example, the connector assembly 110 of FIG. 1 can be configured to collect physical layer information from the connector arrangements 120, 130 terminating one or more of the media segments 122, 132. In some implementations, the first connector arrangement 120 may include a storage device 125 that is configured to store physical layer information pertaining to the segment of physical communications media 122 and/or to the first connector arrangement 120. In certain implementations, the connector arrangement 130 also includes a storage device 135 that is configured to store information pertaining to the second connector arrangement 130 and/or to the second optic cable 132 terminated thereby.

In one implementation, each of the storage devices 125, 135 is implemented using an EEPROM (e.g., a PCB surface-mount EEPROM). In other implementations, the storage devices 125, 135 are implemented using other non-volatile memory device. Each storage device 125, 135 is arranged and configured so that it does not interfere or interact with the communications signals communicated over the media segments 122, 132.

In accordance with some aspects, the adapter 110 is coupled to at least a first media reading interface 116. In certain implementations, the adapter 110 also is coupled to at least a second media interface 118. In certain implementations, the adapter 110 is coupled to multiple media reading interfaces. In an example, the adapter 110 includes a media reading interface for each port end defined by the adapter 110. In another example, the adapter 110 includes a media reading interface for each connection opening 111 defined by the adapter 110. In other implementations, the adapter 110 can include any desired number of media reading interfaces 116, 118.

In some implementations, at least the first media reading interface 116 is mounted to a printed circuit board 115. In some implementations, the printed circuit board 115 also can include the second media reading interface 118. The printed circuit board 115 of the adapter 110 can be communicatively connected to one or more programmable processors and/or to one or more network interfaces. The network interface may be configured to send the physical layer information to a physical layer data management network. Examples of data management networks can be found in U.S. Provisional Application No. 61/760,816, filed Feb. 5, 2013, and titled "Systems and Methods for Associating Location Information with a Communication Sub-Assembly Housed within a Communication Assembly," the disclosure of which is hereby incorporated herein by reference.

When the first connector arrangement 120 is received in the first port end 112 of the adapter 110, the first media reading interface 116 is configured to enable reading (e.g., by an electronic processor) of the information stored in the storage device 125. The information read from the first connector arrangement 120 can be transferred through the printed circuit board 115 to the physical layer data management network. When the second connector arrangement 130 is received in the second port end 114 of the adapter 110, the second media reading interface 118 is configured to enable reading (e.g., by an electronic processor) of the information stored in the storage device 135. The information read from the second connector arrangement 130 can be transferred through the printed circuit board 115 or another circuit board to the physical layer data management network.

In some such implementations, the storage devices 125, 135 and the media reading interfaces 116, 118 each include at least three (3) leads—a power lead, a ground lead, and a data lead. The three leads of the storage devices 125, 135 come into electrical contact with three (3) corresponding leads of the media reading interfaces 116, 118 when the corresponding media segment is inserted in the corresponding port. In other example implementations, a two-line interface is used with a simple charge pump. In still other implementations, additional leads can be provided (e.g., for potential future applications). Accordingly, the storage devices 125, 135 and the media reading interfaces 116, 118 may each include four (4) leads, five (5) leads, six (6) leads, etc.

FIGS. 2-5 illustrate one example adapter assembly 200 including an example optical adapter 210 and an example contact assembly 230 suitable for mounting to the optical adapter 210 as a media reading interface. The adapter assembly 200 has a first port end 201, a second port end 202, a first mounting end 203, a second mounting end 204, a first side 205, and a second side 206. The optical adapter 210 defines a port 212 for receiving an optical connector (e.g., an MPO-type connector, an LC-type connector, an SC-type connector, and LX.5-type connector, etc.) at each of the port ends 201, 202. The optical adapter 210 also defines a mounting recess 215 sized and shaped to receive the contact assembly 230.

Figure 3:
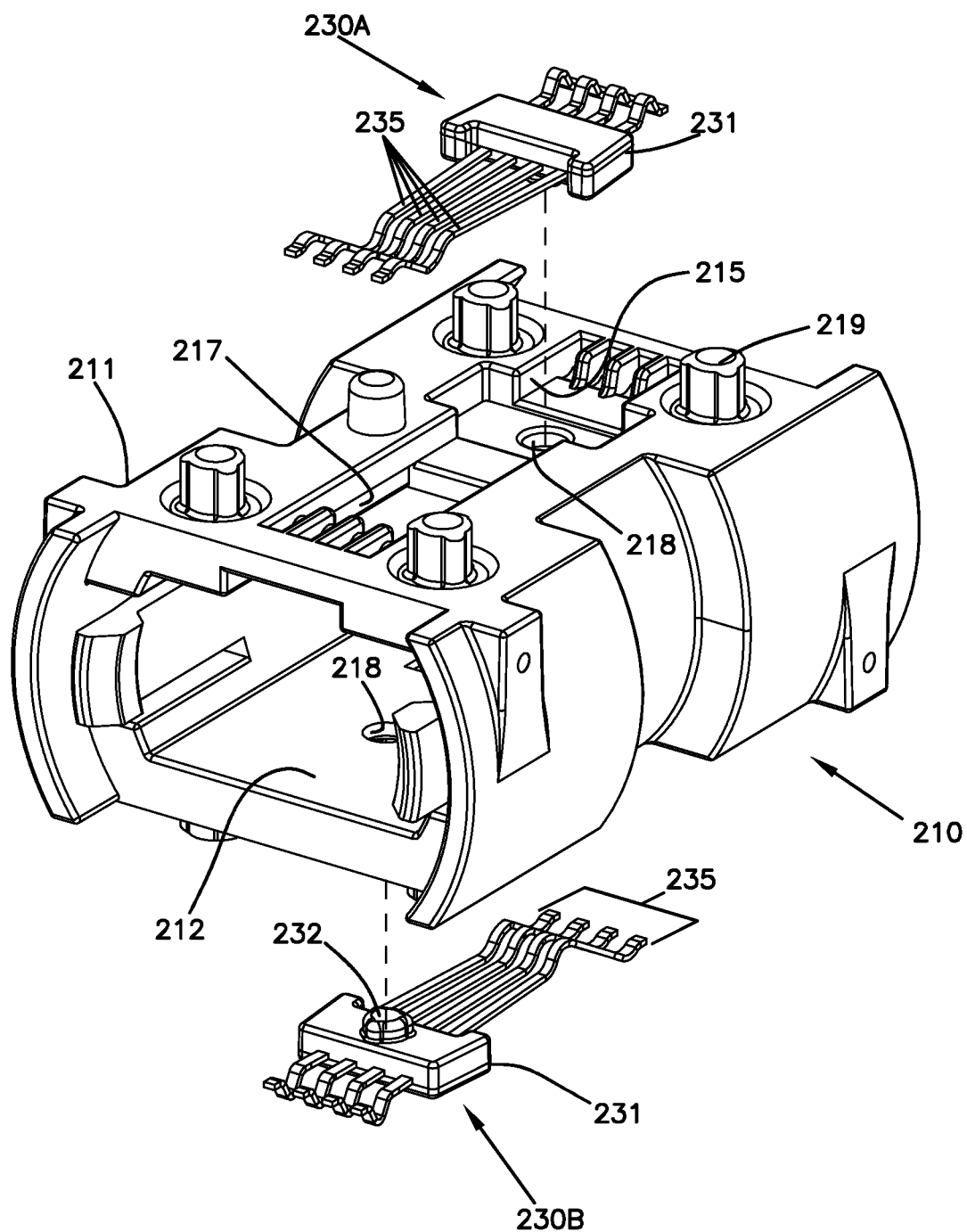
FIG. 3 is an exploded view of the optical adapter of FIG. 2.

In some implementations, multiple contact assemblies 230 can be mounted to the optical adapter 210. For example, as shown in FIG. 3, a first contact assembly 230A can be mounted and a second contact assembly 230B can be mounted to the optical adapter 210. In the example shown, the first contact assembly 230A is mounted at a mounting recess 215 defined at the first mounting end 203 of the adapter assembly 200 and the second contact assembly 230B is mounted at a mounting recess defined at the second mounting end 204 of the adapter assembly 200.

Figure 5:
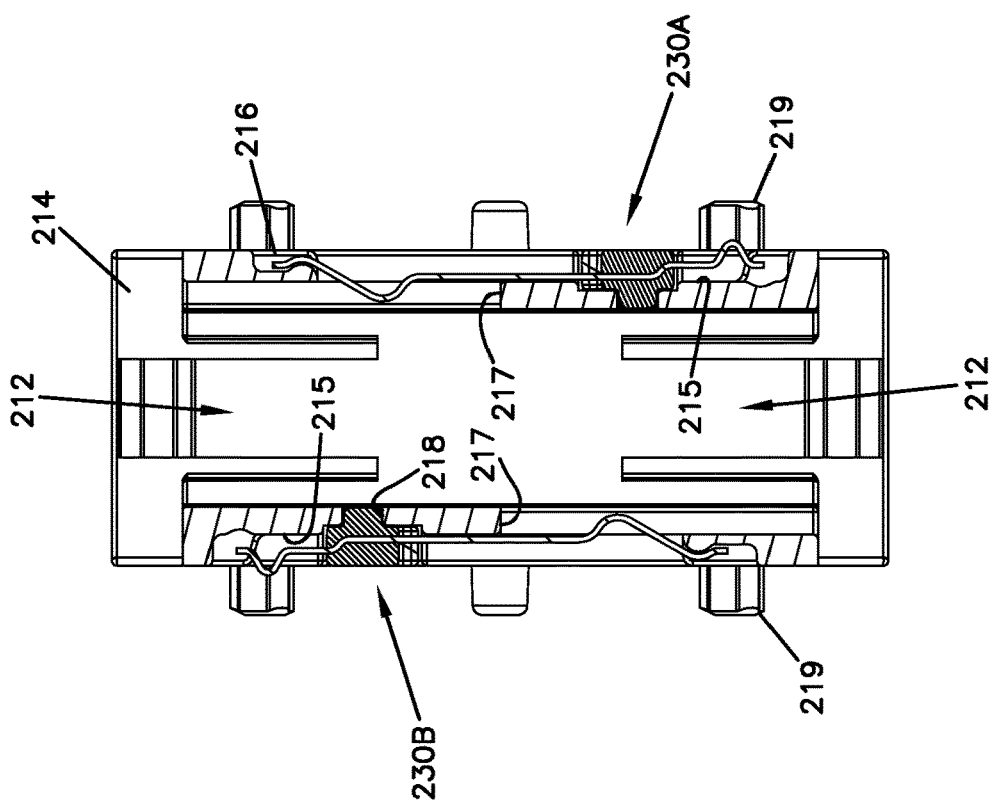
FIG. 5 is an axial cross-sectional view taken along the 5-5 line of FIG. 4.
Figure 4:
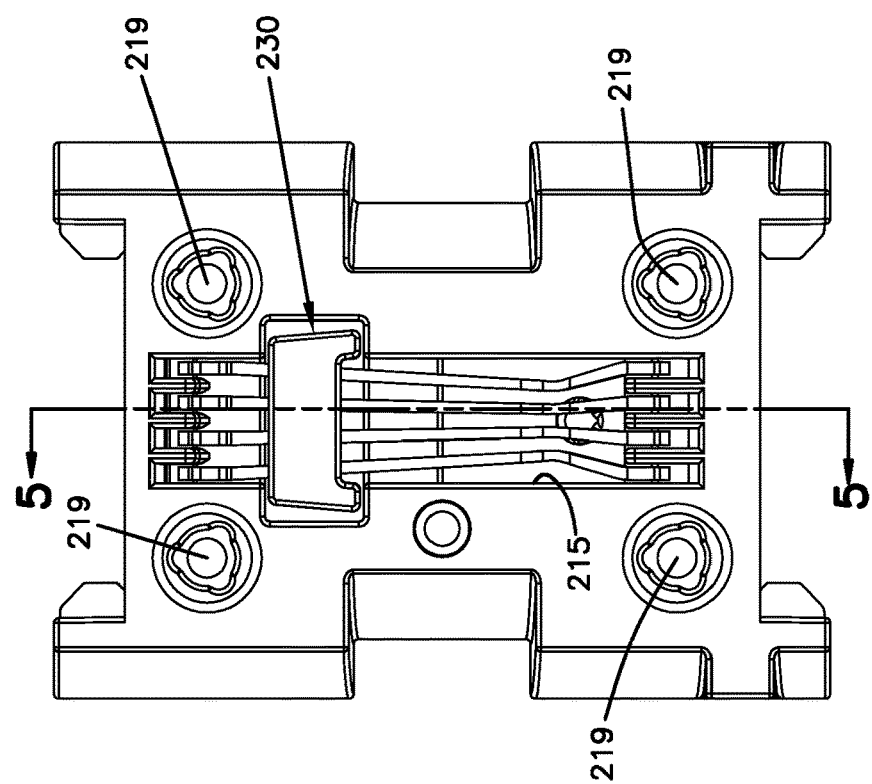
FIG. 4 is a top plan view of the optical adapter of FIG. 2.
Figure 6:
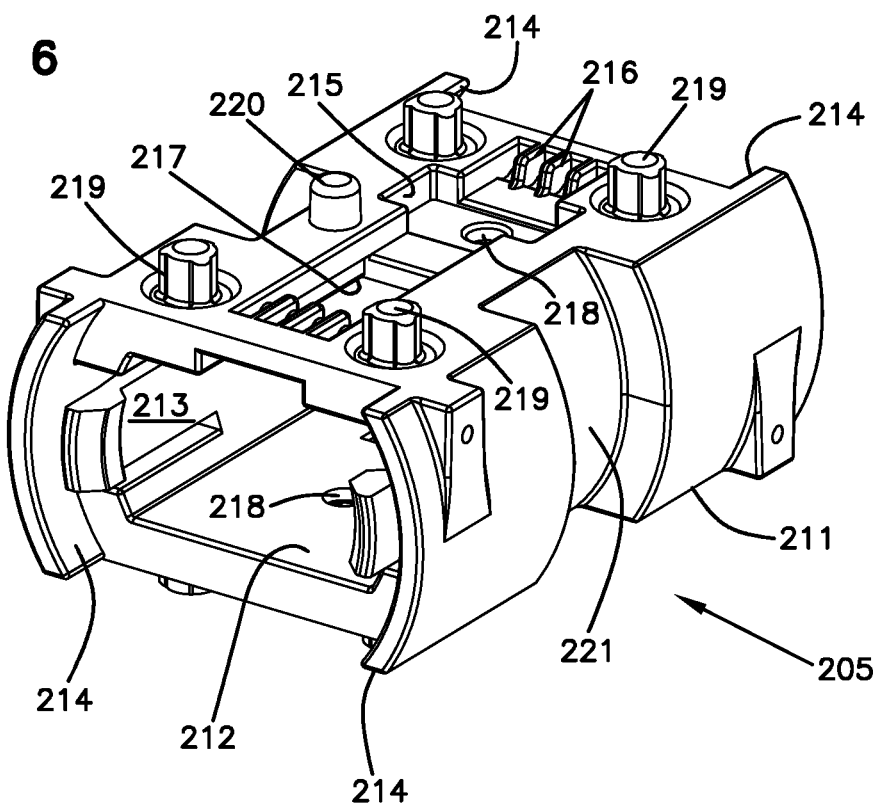
Figure 7:
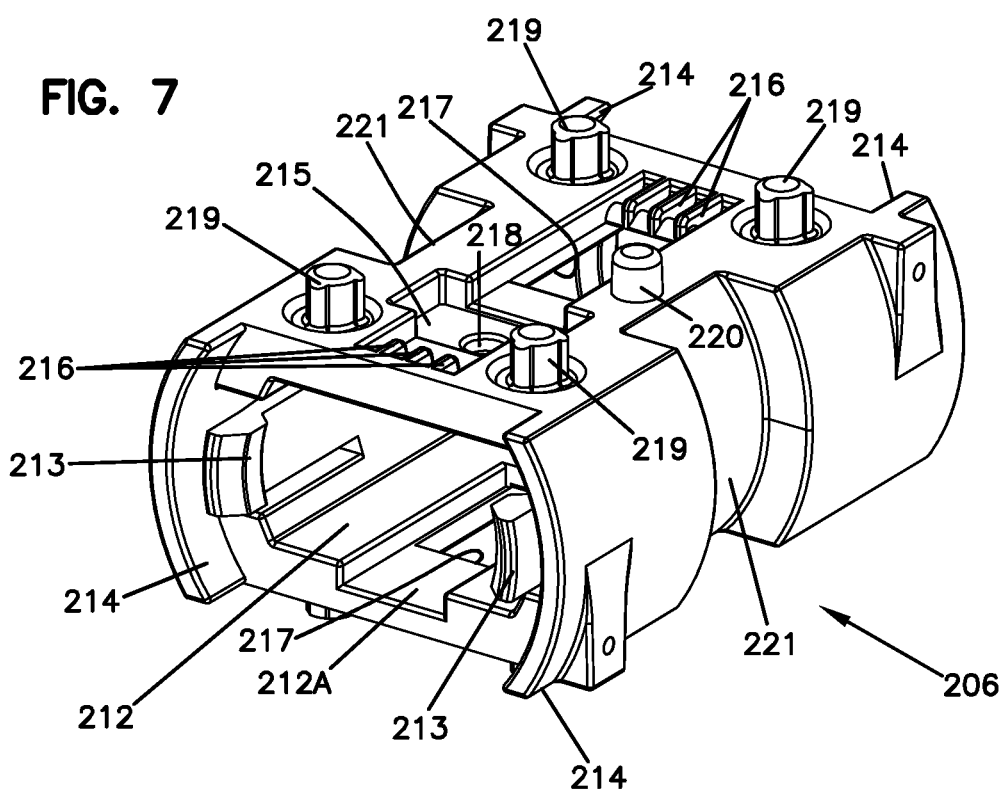
Figure 9:
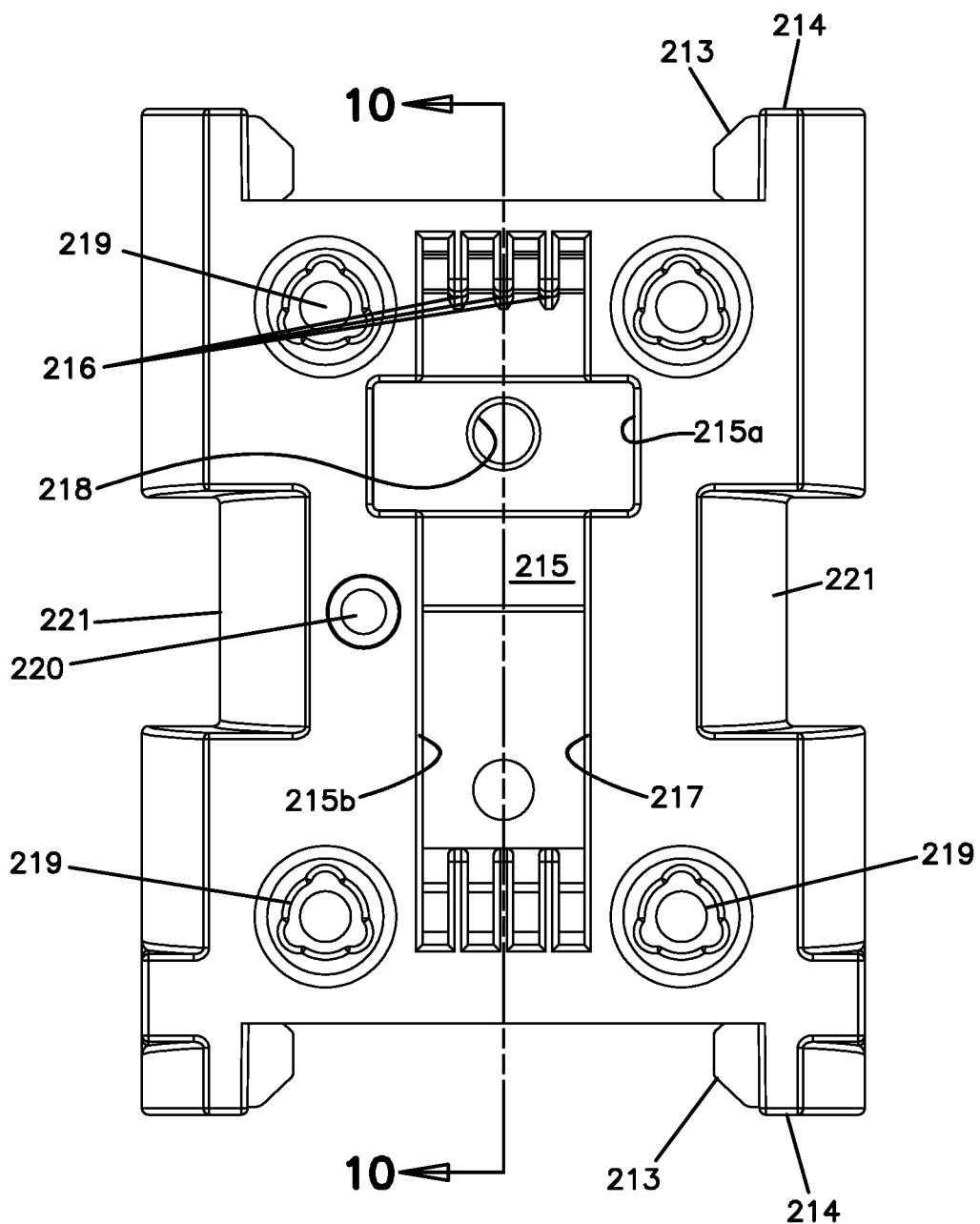
Figure 11:
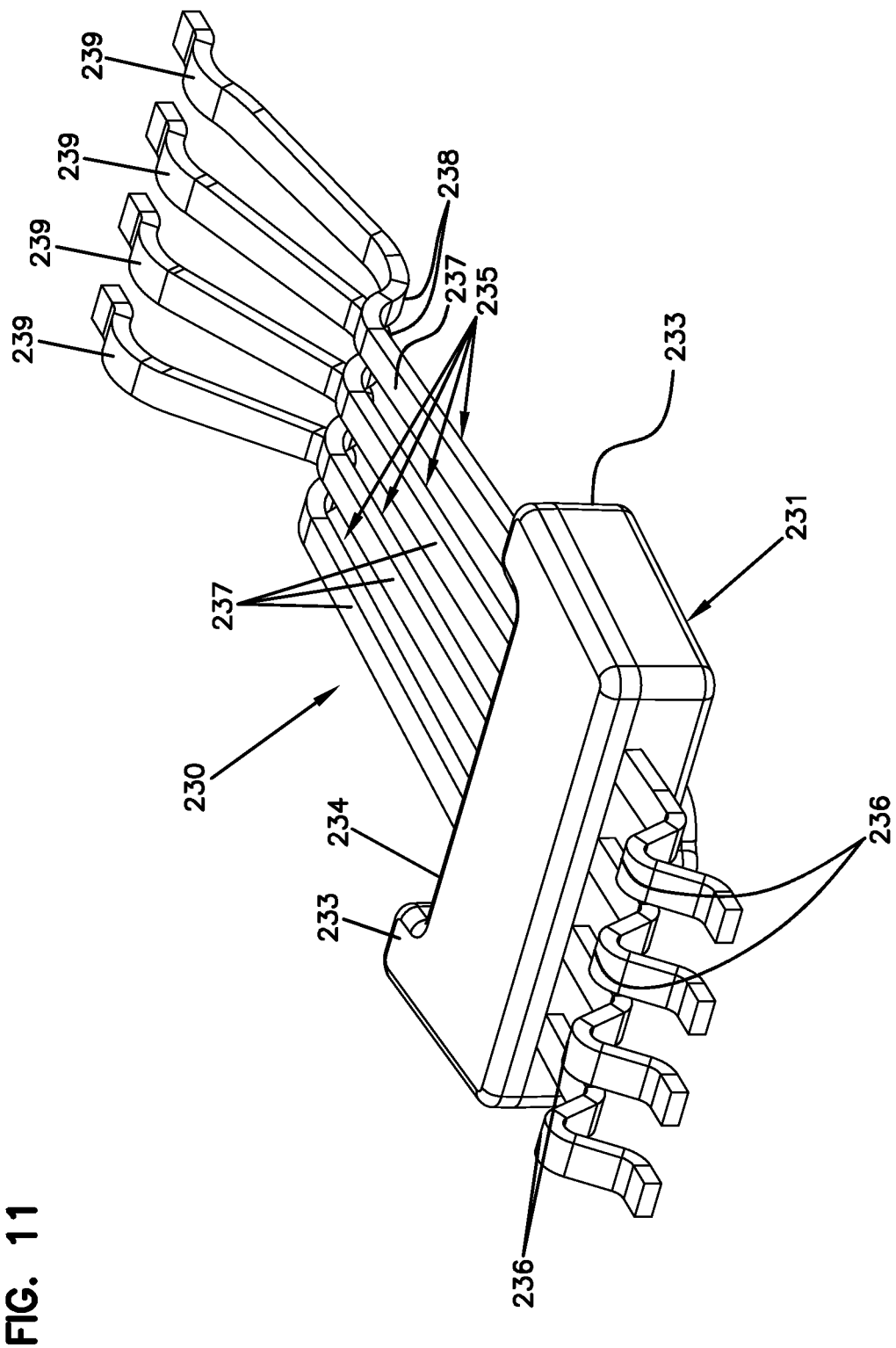
FIGS. 11-14 illustrate an example of the contact assembly of FIG. 2.
Figure 12:
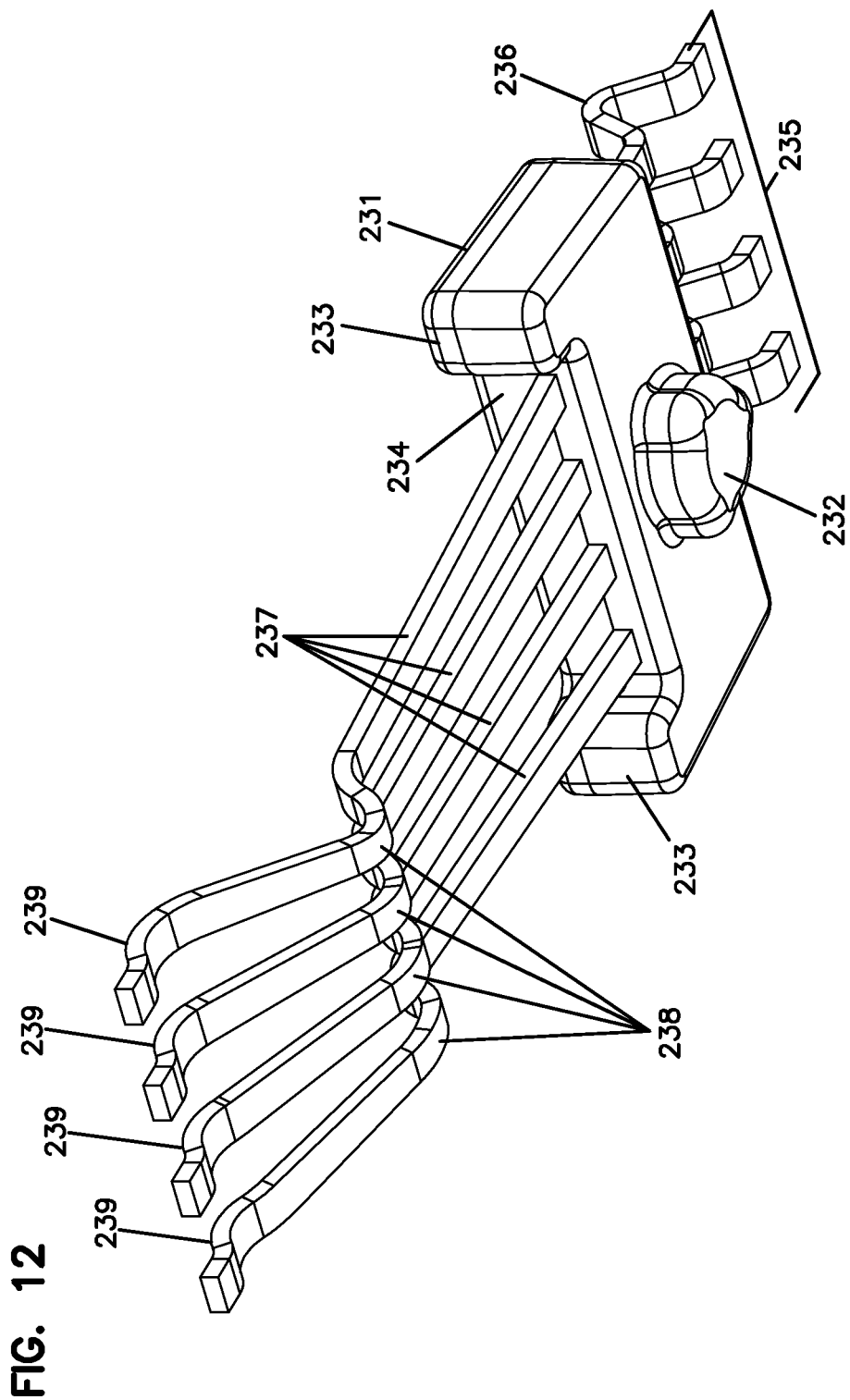

In certain implementations, each mounting recess 215 has a recessed surface on which the respective contact assembly 230 can seat. For example, each contact assembly 230 includes a plurality of contact members 235 coupled together at a body 231, which seats on the recessed surface (see FIG. 5). The mounting recess 215 also defines a first aperture 217 through the recessed surface that leads to an interior of the adapter body 211, which is accessible through the ports 212 (FIG. 5). Portions of the contacts 235 extend through the first aperture 217 towards the interior of the adapter body 211. A second aperture 218 also is defined in the recessed surface spaced from the first aperture 217 (FIG. 3). The second aperture 218 is sized to receive a peg 232 of the contact assembly body 231 to help hold the contact assembly 230 within the mounting recess 215 (see FIG. 5).

FIGS. 6-10 illustrate one example optical adapter 210 suitable for use in the adapter assembly 200 of FIGS. 2-5. The optical adapter 210 includes an adapter body 211 defining first and second ports 212 at opposite ends 201, 202 of the adapter body 211. In other implementations, however, the optical adapter body 211 may define a greater number of ports 212 at one or both ends 201, 202 of the adapter body 211. The optical adapter 210 shown includes an MPO-type adapter. In other implementations, however, the optical adapter 210 can be any desired type of optical adapter.

Figure 17:
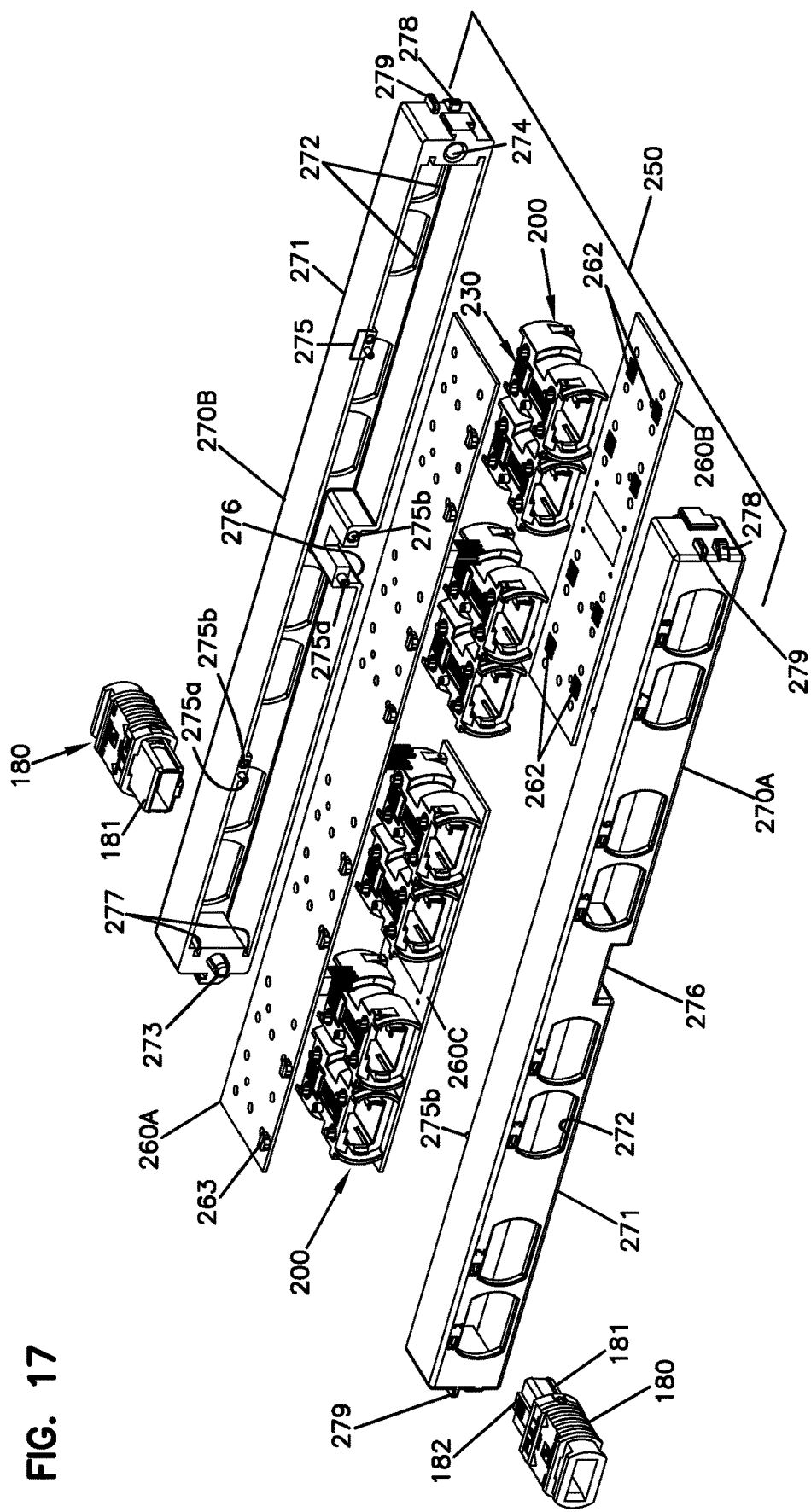
FIG. 17 is an exploded view of the adapter block assembly of FIG. 16.

Each port 212 of the optical adapter body 211 is configured to receive an optical plug (e.g., see optical plug 180 of FIG. 17) along an insertion axis I (FIG. 10). In some implementations, the adapter body 211 includes latching arms 213 at each port 212 that are configured to latch around the received optical plug to hold the plug to the port 212. In certain implementations, each port 212 defines a key area 212A sized and shaped to accommodate a keying feature of the optical plug. In certain implementations, the optical adapter body 211 also includes shroud walls 214 that extend outwardly from the port ends 201, 202 of the adapter body 211 at opposite sides 205, 206 of the adapter body 211. The shroud walls 214 aid in protecting the port 212 and/or the connection between the adapter 210 and the plug. In the example shown, the shroud walls 214 define a concave curve facing towards the port 212.

As discussed above, the adapter body 211 also defines one or more mounting recesses 215 each having a recessed surface, a first aperture 217, and a second aperture 218. The body 231 and contacts 235 of each contact assembly 230 fit within a mounting recess 215. In certain implementations, an example mounting recess 215 defines a first portion 215a sized to accommodate the body 231 of the contact assembly 230 and a second portion 215b sized to accommodate the contacts 235 of the contact assembly 230 (see FIG. 9). In certain implementations, ribs 216 (FIGS. 6 and 7) can be provided at one or both ends of the mounting recess 215 to aid in maintaining separation of the ends of the contacts 235 (e.g., see FIG. 4).

In certain implementations, the adapter body 211 includes one or more alignment features that aid in positioning and/or orienting the adapter body 211 on a circuit board, adapter block assembly, tray, drawer, or other such structure. In some implementations, the adapter body 211 includes mounting pegs 219 extending from the first and second mounting ends 203, 204. In certain implementations, the mounting pegs 219 extend outwardly from areas around the mounting recesses 215. In the example shown, four mounting pegs 219 extend outwardly from the mounting ends 203, 204 of the adapter body 211. In other implementations, a greater or fewer number of mounting pegs 219 can be utilized.

In some implementations, an alignment peg 220 also can extend outwardly from one or both mounting ends 203, 204 of the adapter body 211. In the example shown, each mounting end 203, 204 is associated with a single alignment peg 220. In other implementations, however, additional mounting pegs 220 can be provided. In the example shown, the alignment peg 220 at the first mounting end 203 is disposed at an opposite side 205, 206 of the adapter body 211 from the alignment peg 220 at the second mounting end 204. In certain implementations, the adapter body 211 defines cutout regions or slots 221 at the sides 205, 206 of the adapter body 211. In certain implementations, the cutout regions 221 can aid in positioning the adapter body 211 at a mounting structure.

FIGS. 11-14 illustrate an example contact assembly 230 suitable for use in the adapter assembly 200 of FIGS. 2-5. As discussed above, the contact assembly includes a body 231 holding one or more contact members 235. The body 231 includes an alignment peg 232 that is configured to fit into the adapter aperture 218 to secure the contact assembly 230 to the optical adapter 210. The body 231 also defines a recessed side 234 that forms shoulders 233. A longer section of the contact members 235 extends from the recessed side 234 of the body 231 between the shoulders 233 and a shorter section of the contact members 235 extends from an opposite side of the body 231.

The shorter section of each contact member 235 defines a first contact surface 236. In certain implementations, the first contact surface 236 is defined by a bump or peak formed in the shorter section (see FIG. 11). The longer section of each contact member 235 defines a second contact surface 238 and a third contact surface 239. In certain implementations, the second and third contact surfaces 238, 239 are defined by bumps or peaks formed in the longer section (see FIG. 12). In the example shown, the second contact surfaces 238 curve in an opposite direction from the first and third contact surfaces 236, 239.

Figure 13:
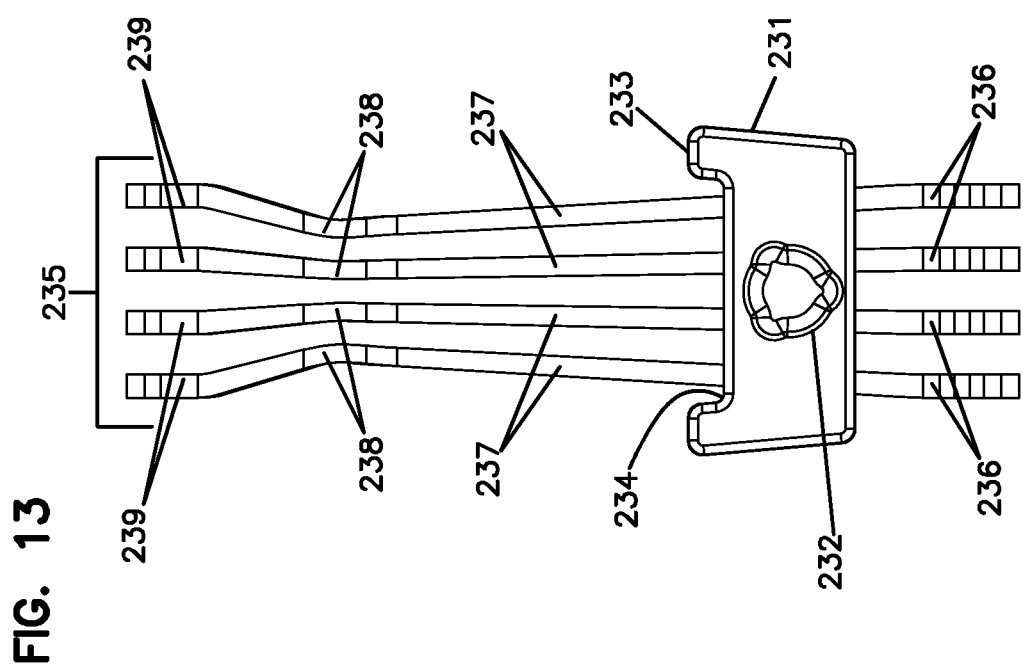
Figure 14:
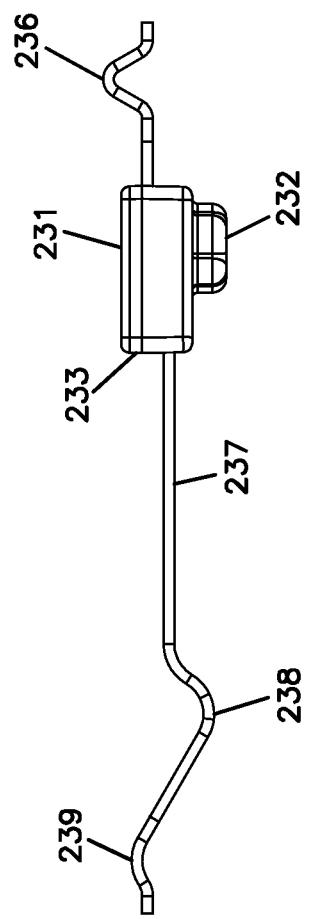

In certain implementations, the longer sections also include extensions 237 that extend between the body 231 and the second contact surfaces 238. The longer sections of the contact members 235 can deflect along the extensions 237. For example, the second and third contact surfaces 238, 239 can deflect relative to the first contact surfaces 236. In some implementations, the contact members 235 deflect along parallel paths. In certain implementations, the contact members 235 do not deflect laterally towards each other. In some implementations, the contact members 235 extend generally parallel to each other. In other implementations, however, portions of the contact members 235 can be angled to extend towards and/or away from each other. For example, as shown in FIG. 13, the extensions 237 can be angled towards each other so that contact members 235 are disposed closer to each other at the second contact surfaces 238 than at the recessed section 234 of the body 231. The contact members 235 also can be angled outwardly so that the third contact surfaces 239 are spaced farther apart than the second contact surfaces 238.

Figure 15:
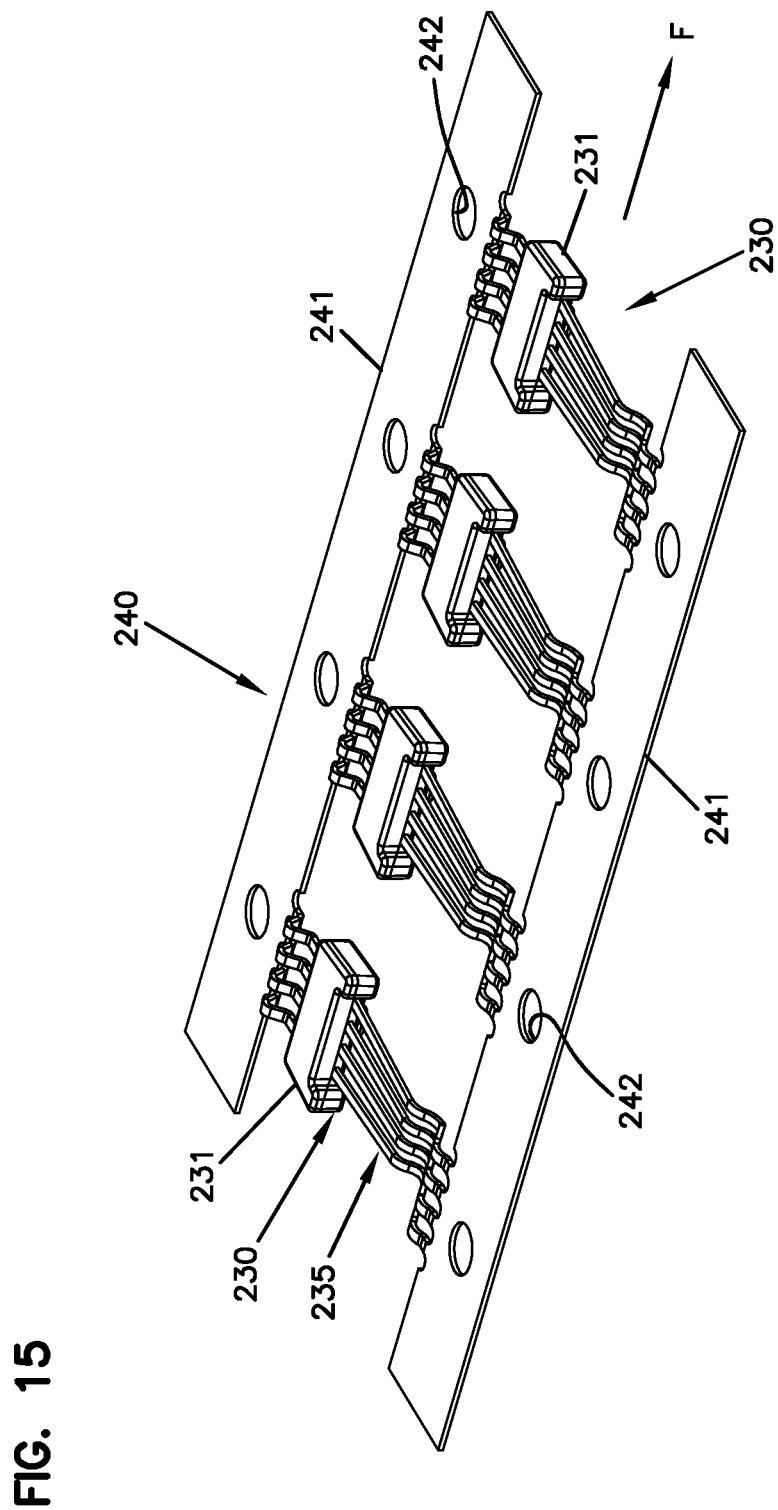
FIG. 15 illustrates multiple contact assemblies mounted to a carrier strip during manufacturing of the contact assemblies.
Figure 16:
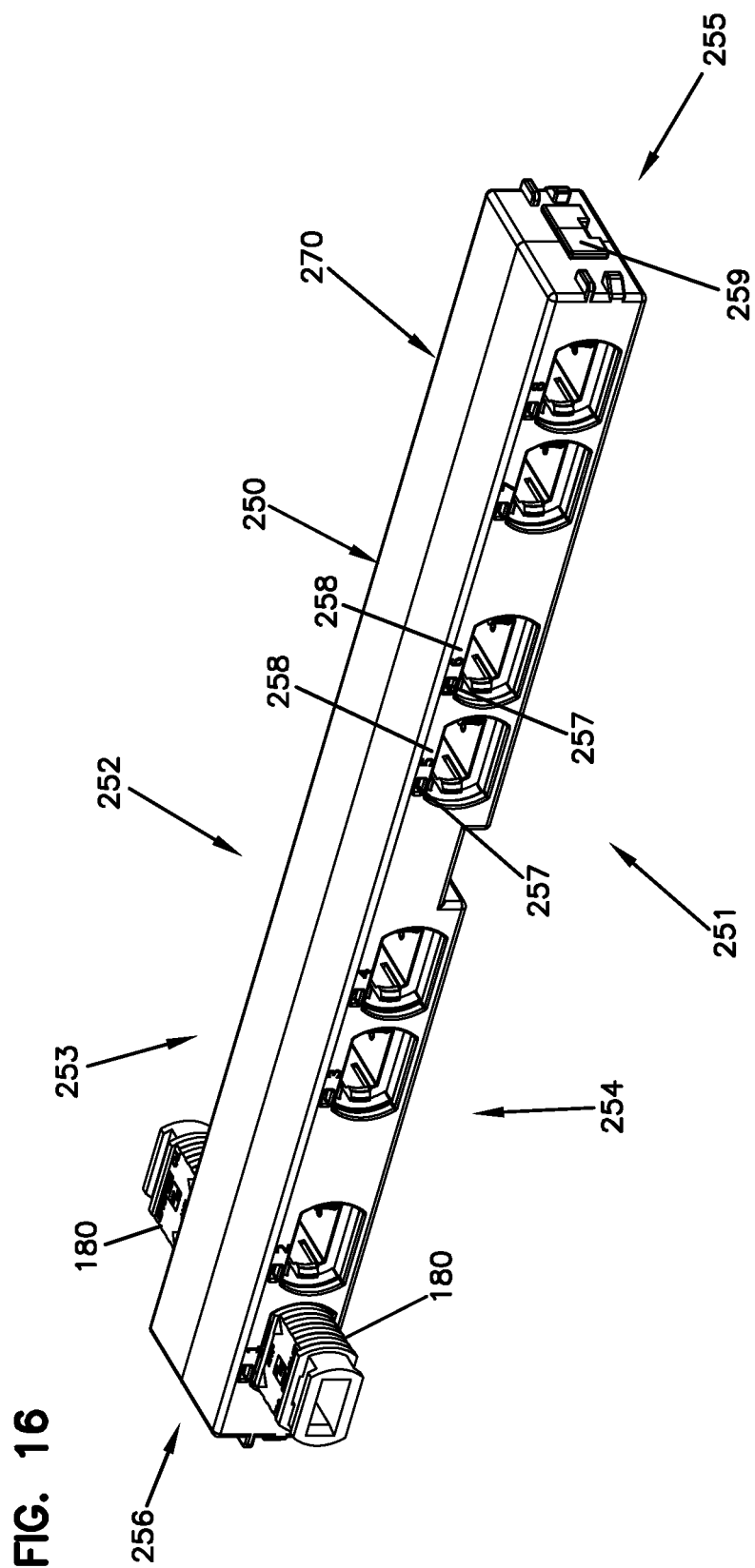
FIG. 16 is a perspective view of an example adapter block assembly holding multiple optical adapters and contact assemblies.

As shown in FIG. 15, contact assemblies 230 can be manufactured using carrier strip arrangement 240. Each carrier strip arrangement 240 defines sequencing holes 242 at opposite sides. The sequencing holes 242 can be engaged by a machine (e.g., by as spiked wheel, etc.) to advance the carrier strip arrangement 240 in a feed direction F. Material is removed from the carrier strip 240 to form contact members 235 extending between two strips 241. For example, material can be removed by cutting, stamping, laser cutting, etching, or any other removal process. The contact members 235 of a first contact assembly 230 are spaced along the strips 241 in the feed direction F. During the manufacturing process, a body 231 is formed around the contact members 235 of each contact assembly 230. For example, in certain implementations, the contact members 235 of each contact assembly 230 are overmolded together. In other implementations, the contact members 235 can be sandwiched between a two-piece body 231.

FIGS. 16-21 illustrate an example adapter block assembly 250 that holds one or more adapter assemblies 200. The adapter block assembly 250 has a first end 251, a second end 252, a top 253, a bottom 254, a first side 255, and a second side 256. The first and second ends 251, 252 provide access to the ports 212 of the adapter assemblies 200. The sides 255, 256 of the adapter block assembly 250 are configured to mount the adapter block assembly 250 to a tray, blade, drawer, or other mounting structure (hereinafter "tray"). For example, the sides 255, 256 of the adapter block assembly 250 can include a retention member 259.

In certain implementations, labeling 258 can be provided at the first and/or second ends 251, 252. For example, a label 258 can be provided at each port 212. In certain implementations, a light indicator 257 also can be provided at the first and/or second ends 251, 252. In some implementations, a single light indicator 257 can be provided at one or both ends 251, 252 to identify the adapter block assembly. In other implementations, each port 212 may be associated with a respective light indicator 257 to identify the port 212 (e.g., for tracing or marking purposes).

The adapter block assembly 250 includes one or more adapter assemblies 200 mounted to a circuit board arrangement 260 within a housing 270. In the example shown in FIG. 17, the housing 270 includes a two-piece housing 270A, 270B that defines an interior in which to hold the adapter assemblies 200 and circuit boards 260. In other implementations, the housing 270 can be formed of greater or fewer pieces and may or may not fully surround the adapter assemblies 200 and circuit boards 260. In the example shown, the housing 270 hold eight adapter assemblies 200. In other implementations, the housing 270 may hold a greater or lesser number of adapter assemblies 200.

The circuit board arrangement 260 includes a controller (e.g., processor, microprocessor, etc.) to manage obtaining information from the contact assemblies 230 at each adapter block port. 212. The circuit board arrangement 260 also includes a circuit board connector 265 (FIG. 19) that is configured to connect the controller to a data management network as will be described in more detail herein. In some implementations, the circuit board arrangement 260 includes a first circuit board 260A that extends over the first mounting end 203 of the adapter assemblies 200. The circuit board 260A includes contact pads 262 that align with the first and third contact surfaces 236, 239 of the contact assemblies 230 mounted to the first mounting ends 203 of the adapter assemblies 200. The first circuit board 260A also may include the controller. The circuit board connector 265 may extend downwardly from the circuit board 260A, past the adapter assemblies 200, and towards the bottom 254 of the housing 270.

In some implementations, the adapter assemblies 200 include contact assemblies 230 mounted to both mounting ends 203, 204 of the adapter assemblies 200. In such implementations, the circuit board arrangement 260 also includes at least a second circuit board 260B that extends over the second mounting end 204 of one or more of the adapter assemblies 200. The second circuit board 260B also includes contact pads 262 that align with the first and third contact surfaces 236, 239 of the contact assemblies 230 mounted to the second mounting ends 204 of the one or more adapter assemblies 200. In certain implementations, the second circuit board 260B electrically connects to the first circuit board 260A. In other implementations, the second circuit board 260B electrically connects to the electrical circuit or component to which the first circuit board 260A connects.

In some implementations, the second circuit board 260B extends across all of the adapter assemblies 200 in the adapter block assembly 250. In other implementations, however, the second circuit board 260B extends across the second mounting ends 204 of only some of the adapter assemblies 200. In some such implementations, a third circuit board 260C may extend across the second mounting ends 204 of a remainder of the adapter assemblies 200. The third circuit board 260C also includes contact pads 262 that align with the first and third contact surfaces 236, 239 of the contact assemblies 230 mounted to the second mounting ends 204 of the remainder of the adapter assemblies 200.

In certain implementations, the third circuit board 260C is aligned with and spaced from the second circuit board 260B. For example, the circuit board connector 265 of the first circuit board 260A may be positioned to extend downwardly between the second and third circuit boards 260B, 260C (see FIG. 17). In certain implementations, the third circuit board 260C electrically connects to the first circuit board 260A. In other implementations, the third circuit board 260C electrically connects to the electrical circuit or component to which the first circuit board 260A connects.

In some implementations, the housing 270 includes a first housing piece 270A and a second housing piece 270B that are configured to fit together to form the housing 270. In the example shown in FIG. 17, the first housing piece 270A is identical to the second housing piece 270B. In certain implementations, each of the housing pieces 270A, 270B defines one of the first and second ends 251, 252 of the adapter block assembly 250; and the housing pieces 270A, 270B cooperate to define the top 253, bottom 254, first side 255, and second side 256. In other implementations, the housing 270 can be divided differently so that each housing piece 270A, 270B can define a complete side 255, 256, a complete top 253 or bottom 254, or partials of one or more sides.

Figure 18:
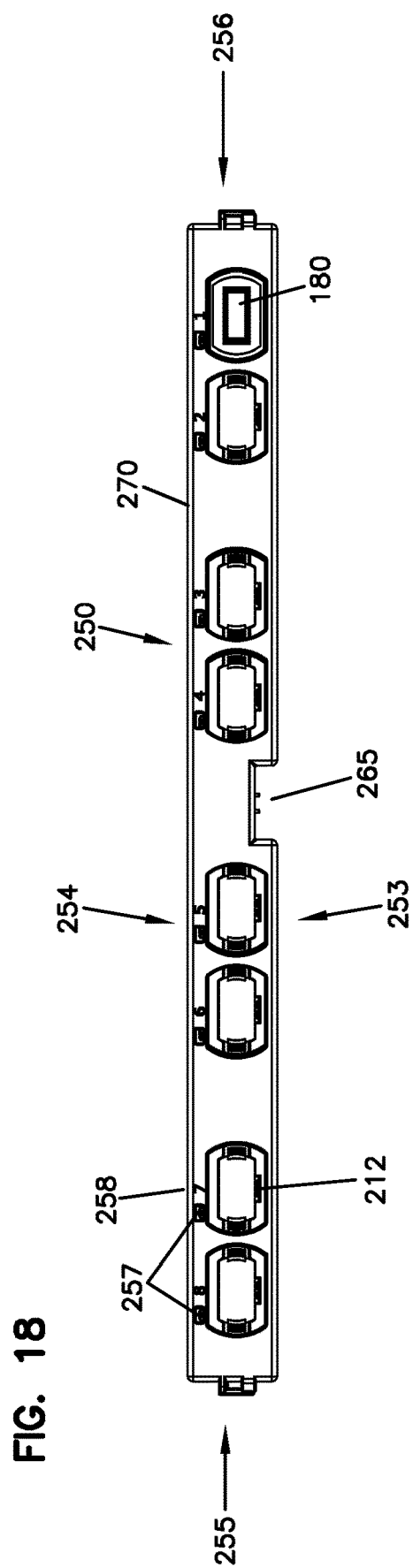
FIGS. 18-21 illustrate additional views of the adapter block assembly of FIG. 16.

Each housing piece 270A, 270B includes a body 271 defining openings 272 aligned with the ports 212 of the adapter assemblies 200. In some implementations, the adapter assemblies 200 are evenly spaced within the housing 270 and, accordingly, the openings 272 are evenly spaced along the first and second ends 251, 252 of the housing 270. In other implementations, the adapter assemblies 200 and, hence, the openings 272 can be separated into two or more groups. In the example shown, the openings 272 of the housing 270 are grouped in pairs along the length L of the housing 270 (FIG. 18).

Each housing piece 270A, 270B is configured to couple to the other housing piece 270A, 270B. For example, in some implementations, each housing piece 270A, 270B includes a peg, latch, or other fastener 273 that aligns with a corresponding opening 274 on the other housing piece 270A, 270B at inwardly facing edges of the housing pieces 270A, 270B. In the example shown, each housing piece 270A, 270B includes a peg 273 disposed at one side 255, 256 of the housing piece 270A, 270B and defines a hole 274 at the opposite side 255, 256 of the housing piece 270A, 270B. The peg 273 is configured to friction-fit, snap-fit, be adhesively fixed, be welded, or be otherwise secured within the hole 274.

In certain implementations, one or more alignment arrangements 275 can be disposed at the inwardly facing edges of the housing pieces 270A, 270B. For example, the alignment arrangements 275 can include smaller pegs 275a and/or holes 275b that align with pegs and holes of the other piece 270A, 270B. In certain implementations, each alignment arrangement 275 includes one peg 275a and one hole 275b disposed laterally adjacent each other. In other implementations, each alignment arrangement 275 includes only one or more pegs 275a or only one or more holes 275b.

In some implementations, the housing pieces 270A, 270B cooperate to define a connector egress 276 through which the circuit board connector 265 can extend partially out of the housing 270. In some implementations, the connector egress 276 can be disposed at an inwardly recessed location relative to the bottom 254 of the adapter block assembly 250. The connector egress 276 is configured to inhibit contaminants (e.g., dust) from entering the housing 270. In certain implementations, one or more alignment arrangements 275 can be provided on the connector egress 276 (see FIG. 17).

In some implementations, each housing piece 270A, 270B is configured to secure the circuit boards 260 within the interior of the housing 270. In some implementations, each housing piece 270A, 270B defines guides 277 in which the circuit boards 260 can be inserted to secure the circuit boards 260 within the housing 270. In the example shown in FIG. 17, guides 277 are provided at opposite sides of internal sidewalls of each housing piece 270A, 270B. For example, the first circuit board 260A can be inserted opposing guides 277 disposed at a top of each housing piece 270A, 270B. One end of the second circuit board 260B can be inserted into the guide 277 provided at the second side 256 of the housing piece 270A, 270B and one end of the third circuit board 260C can be inserted into the guide 277 provided at the first side 255 of the housing piece 270A, 270B.

In some implementations, the adapter block assembly 250 is configured to be mounted to a tray. For example, one or more alignment and/or securement structures can be provided at exterior surfaces of the adapter block assembly 250. In the example shown in FIG. 17, each housing piece 270A, 270B includes a ramped structure 278 and a tab structure 279 that extend outwardly from opposite sides 255, 256 of the housing body 271. When the housing pieces 270A, 270B are assembled, the retention member 259 is disposed between two ramped structures 278 and two tab structures 279.

Figure 19:
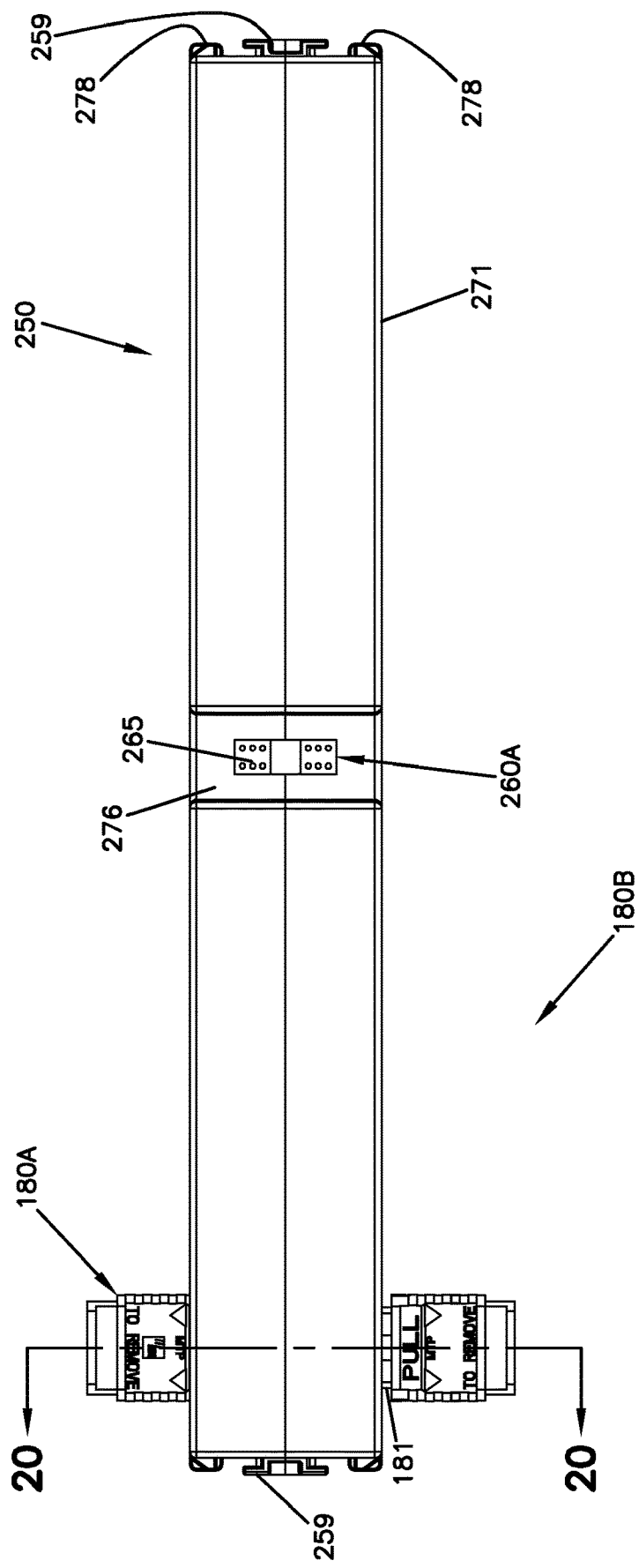
Figure 20:
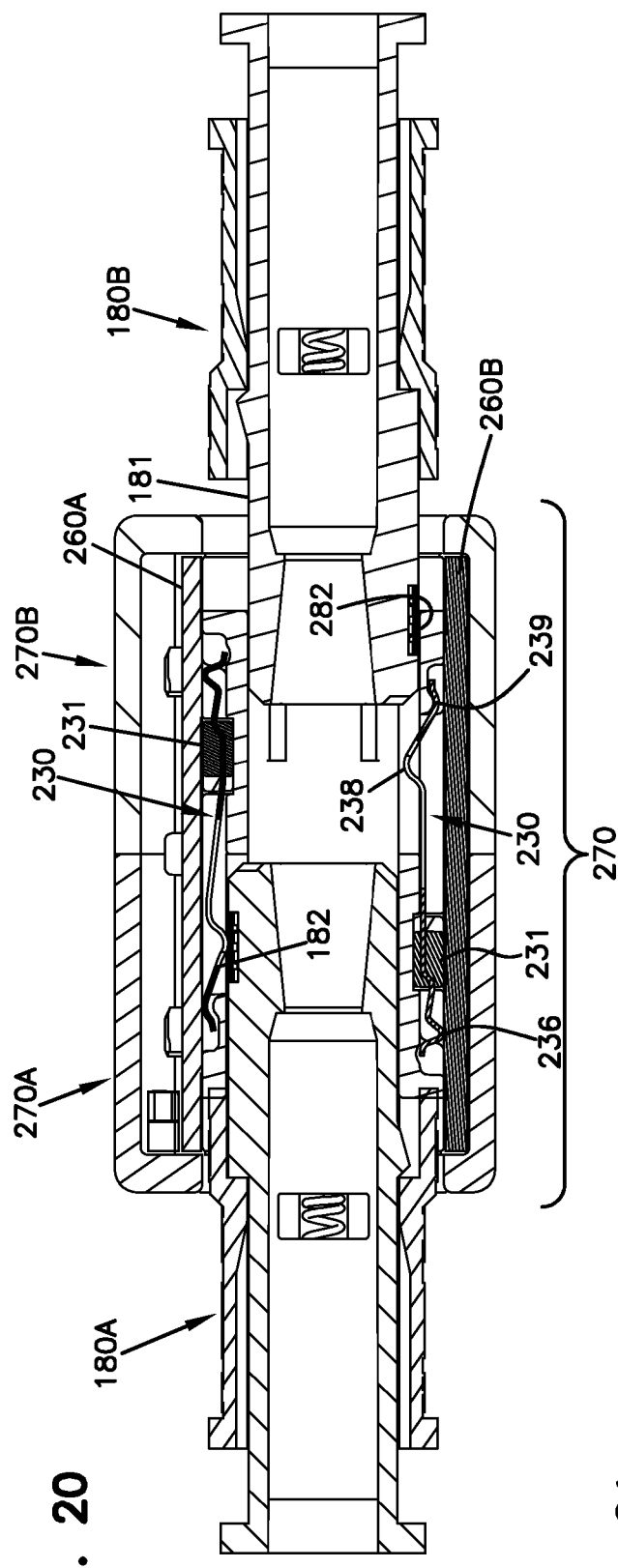
Figure 21:
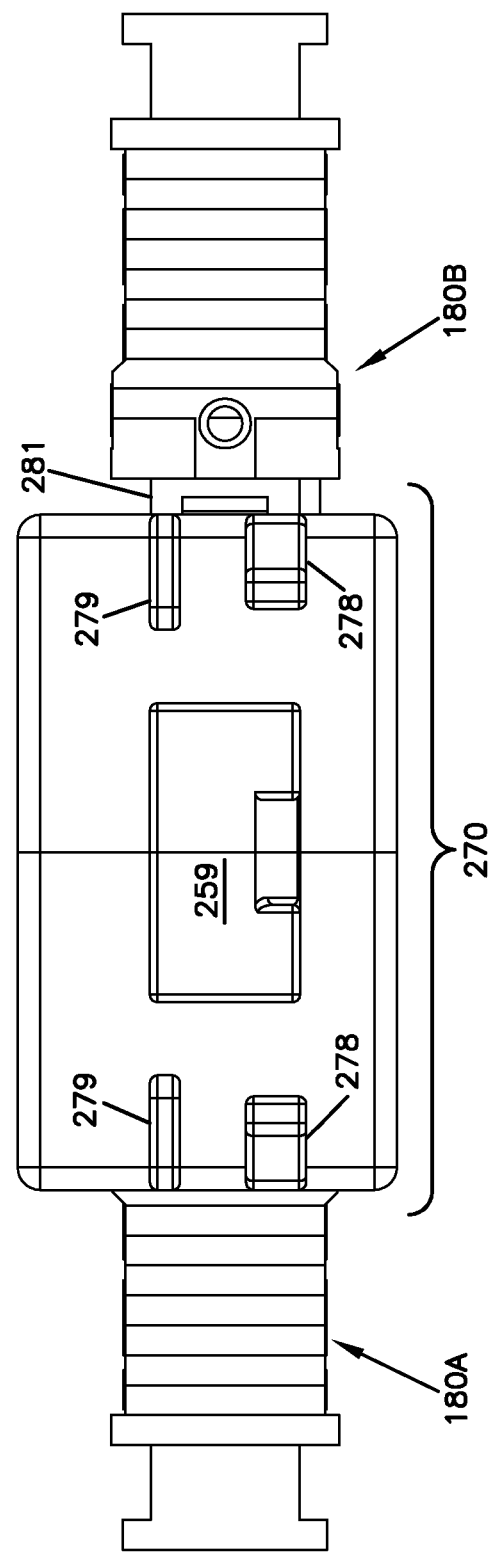

Referring to FIGS. 19-21, inserting optical plug connectors 180 into the ports 212 of the adapter block assembly 250 provides a connection between storage 182 provided on the optical plug connectors 180 and the data network via the contact assemblies 230 of the adapter assemblies 200, the circuit boards 260, and the electrical circuit to which the circuit boards 260 couple. Each optical plug connector 180 includes a signal conveying section (e.g., one or more optical fibers, one or more electrical connectors, etc.) 181. At least some of the optical plug connectors 180 includes memory (e.g., an EEPROM mounted to a circuit board chip) 182 disposed on the optical plug connector 180. In one example, the memory 182 is disposed in a keying region of the optical plug connector 180.

FIG. 20 illustrates a first optical plug connector 180A fully inserted into one port of one of the adapter assemblies 200 of the adapter block assembly 250 and a second optical plug connector 180B partially inserted into an opposing port of the adapter assembly 200. The memory 182 of the first optical plug connector 180A aligns with the second contact surfaces 238 of one of the contact assemblies 230 mounted to the adapter assembly 200. Physical contact between the first plug connector 180A (e.g., the memory 182) and the second contact surfaces 238 deflects the extensions 237 of the contact assembly 230 so that the third contact surfaces 239 touch or swipe along the contact pads 262 of the first circuit board 260A of the adapter block assembly 250. Accordingly, information (e.g., PLI) can be communicated from the memory 182 to a data management network (e.g., through the contact assembly 230, through the circuit board 260A, through the circuit board connector 265, and through the electrical circuit). In other implementations, the data management network and/or a local processor can detect the closing of the circuit (i.e., when the third contact surfaces 239 touch or swipe along the contact pads 262) to detect the presence of the plug connector 180A within the port 212.

The second optical plug connector 180B has only been partially inserted into the respective port 212. The second optical plug connector 180B is not yet touching the second contact surfaces 238 of the other contact assembly 230 mounted to the adapter assembly 200. Because the plug connector 180B is not biasing the second contact surfaces 238 towards the exterior of adapter assembly 200, the third contact surfaces 239 of the other contact assembly 230 are not touching the contact pads 262 on the second circuit board 260B. Accordingly, the data management network and/or a local processor can determine that the circuit is open and, thereby, determine that the plug connector 180B is not yet present within the port 212 (i.e., at least not sufficiently present to enable reading of data stored in memory 182 of the second plug connector 180B).

Additional information about how physical layer information can be read from the plug connectors by the contact assemblies at adapters can be found in U.S. Publication No. 2011-0262077, now U.S. Pat. No. 8,690,593 the disclosure of which is hereby incorporated herein by reference.

FIGS. 22-25 illustrate one example adapter assembly 300 including an example optical adapter 310 to which one or more contact assemblies 230 can be mounted. The adapter assembly 300 has a first port end 301, a second port end 302, a first mounting end 303, a second mounting end 304, a first side 305, and a second side 306. The optical adapter 310 defines a port 312 for receiving an optical connector (e.g., an MPO-type connector, an LC-type connector, an SC-type connector, and LX.5-type connector, etc.) at each of the port ends 301, 302. In the example shown, the optical adapter 310 includes an MPO-type optical adapter. The optical adapter 310 also defines a mounting recess 315 sized and shaped to receive the contact assembly 230.

Figure 23:
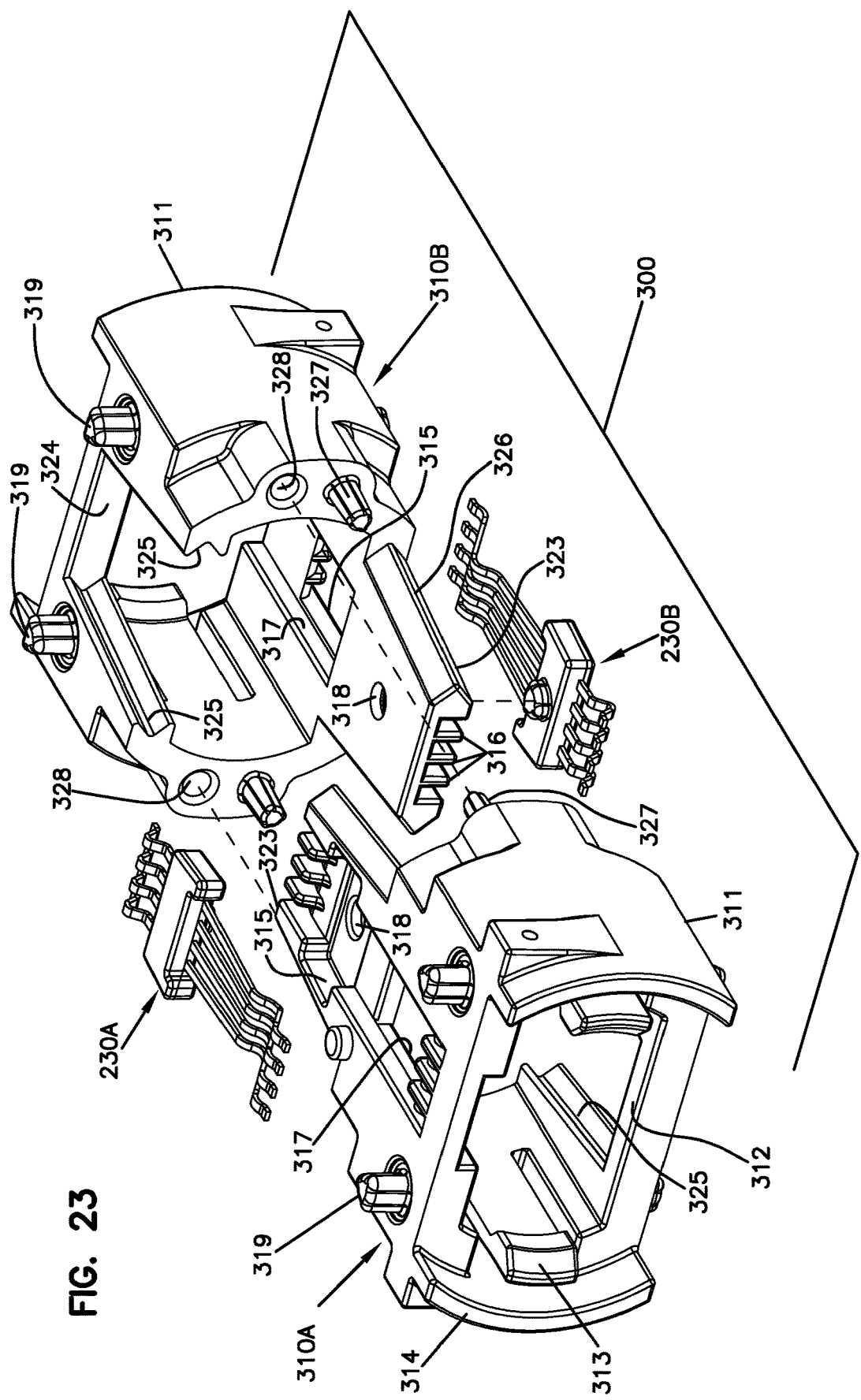
FIG. 23 is an exploded view of the optical adapter and contact assemblies of FIG. 22.

In some implementations, multiple contact assemblies 230 can be mounted to the optical adapter 310. For example, as shown in FIG. 23, a first contact assembly 230A and a second contact assembly 230B can be mounted to the optical adapter 310. In the example shown, the first contact assembly 230A is mounted at a mounting recess 315 defined at the first mounting end 303 of the adapter assembly 300 and the second contact assembly 230B is mounted at a mounting recess 315 defined at the second mounting end 304 of the adapter assembly 300.

Figure 25:
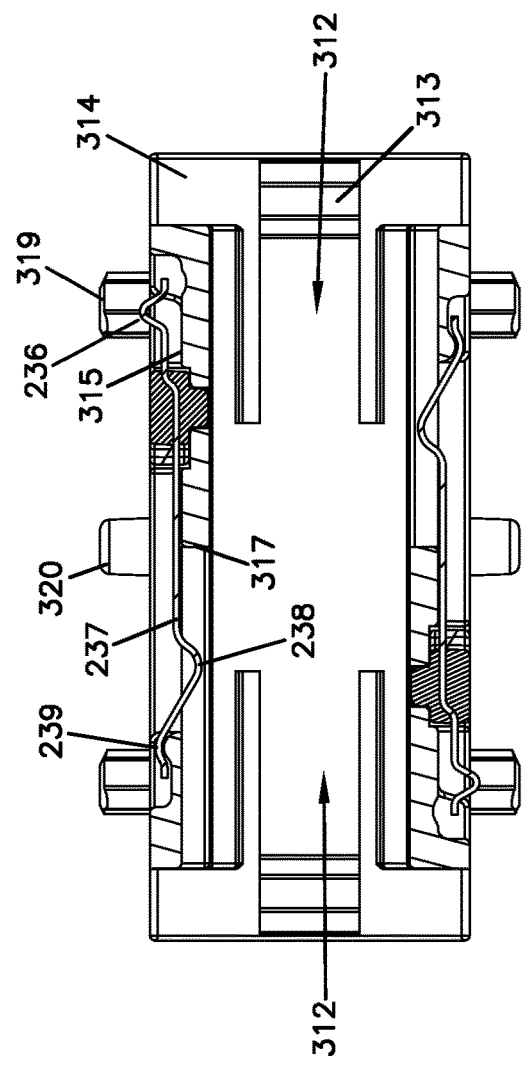
FIG. 25 is an axial cross-sectional view taken along the 25-25 line of FIG. 24.
Figure 24:
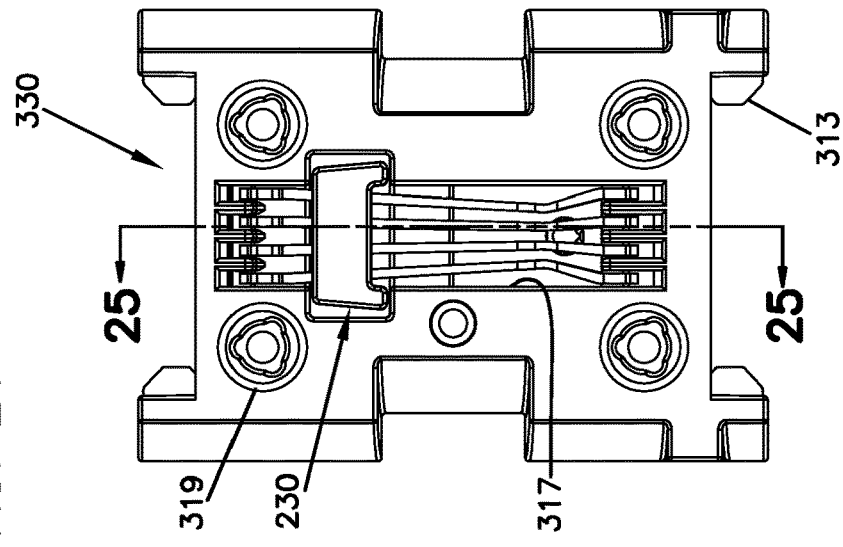
FIG. 24 is a top plan view of the optical adapter of FIG. 22.
Figure 26:
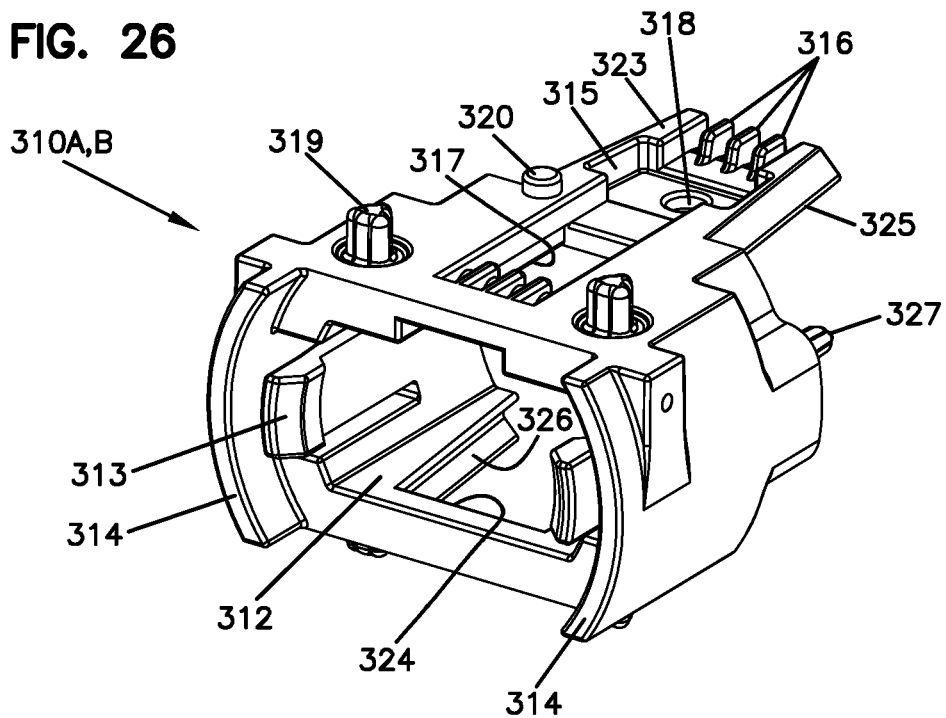
FIGS. 26-33 illustrate one example adapter piece of the example optical adapter of FIG. 22.
Figure 27:
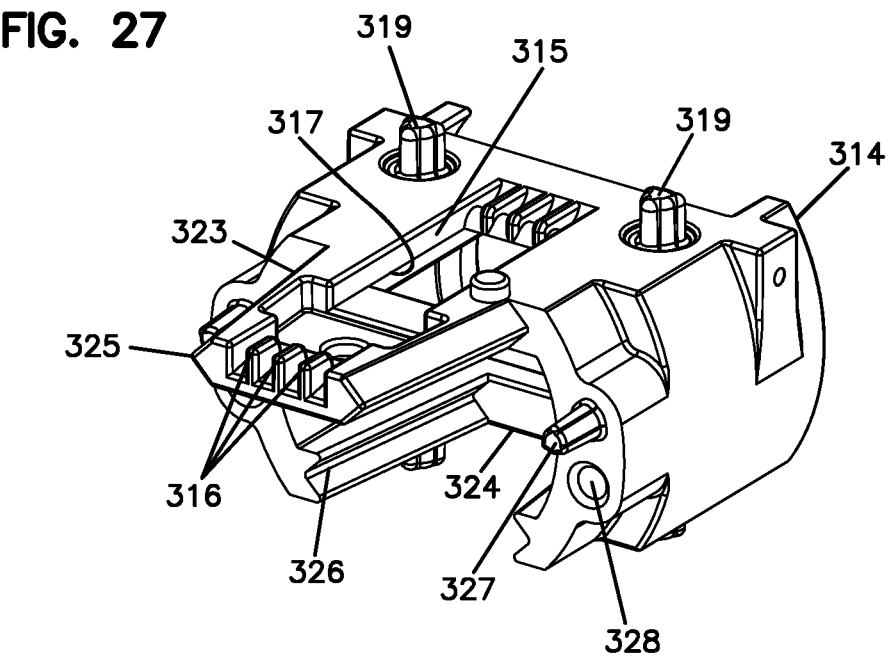
Figure 28:
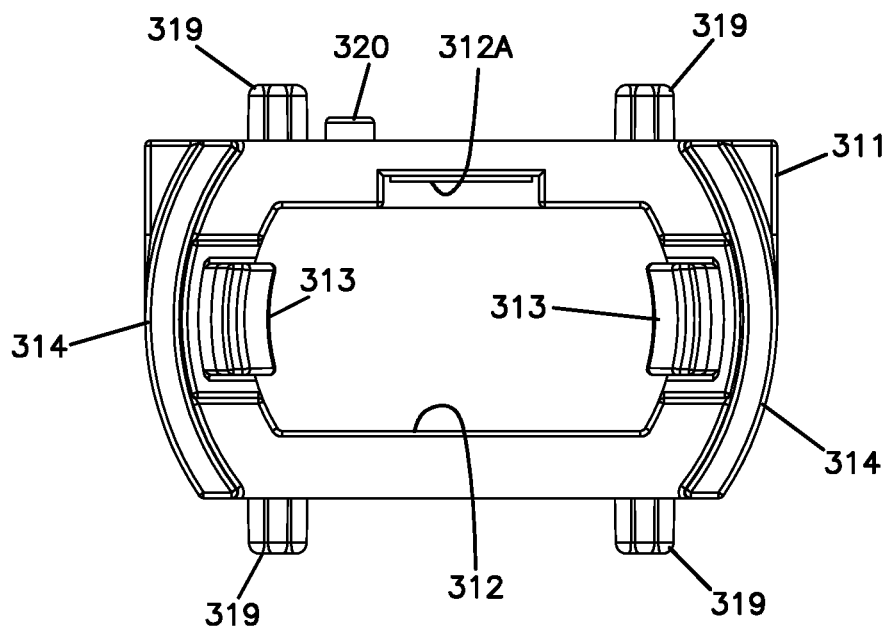
Figure 29:
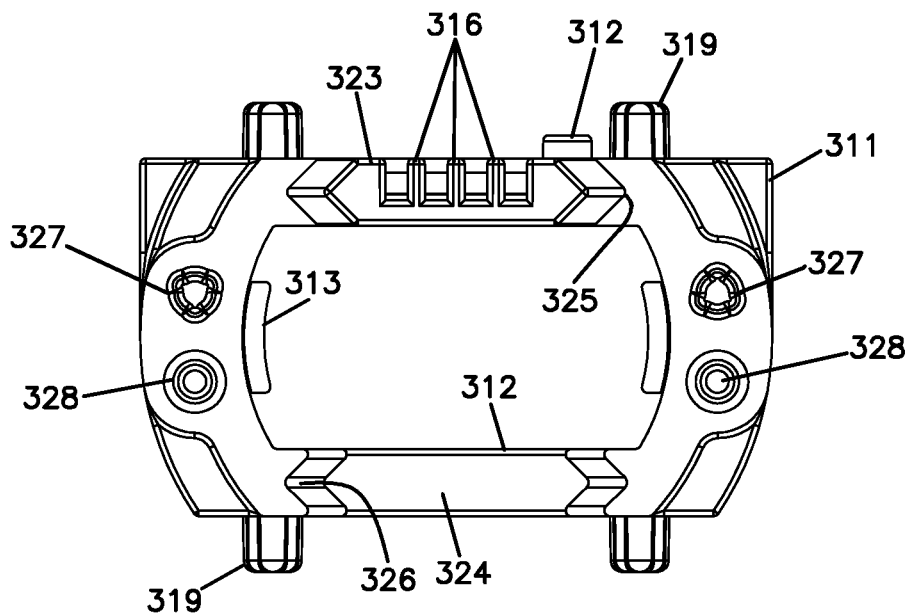
Figure 30:
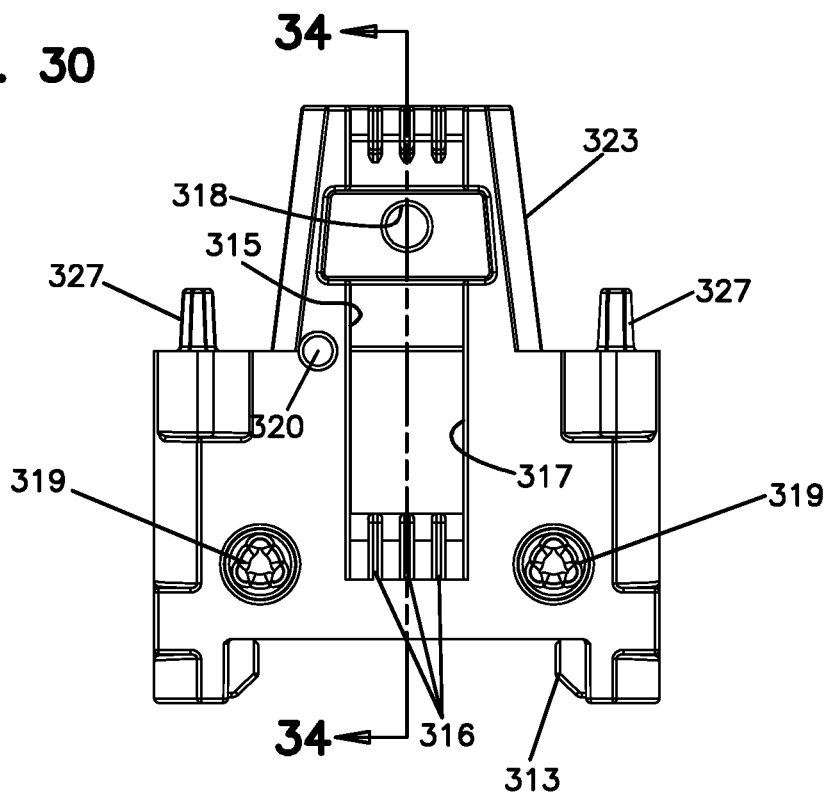
Figure 31:
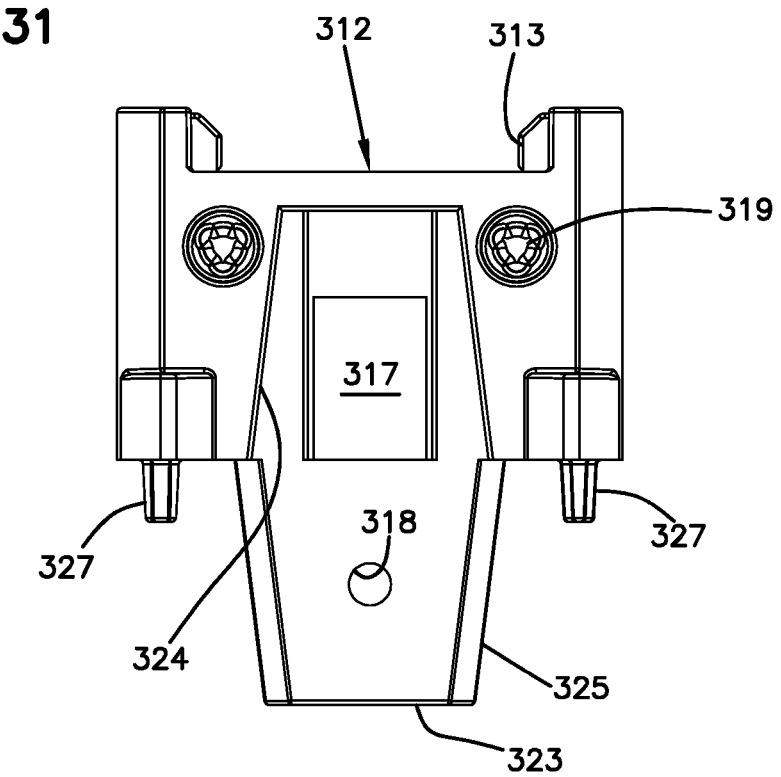
Figure 32:
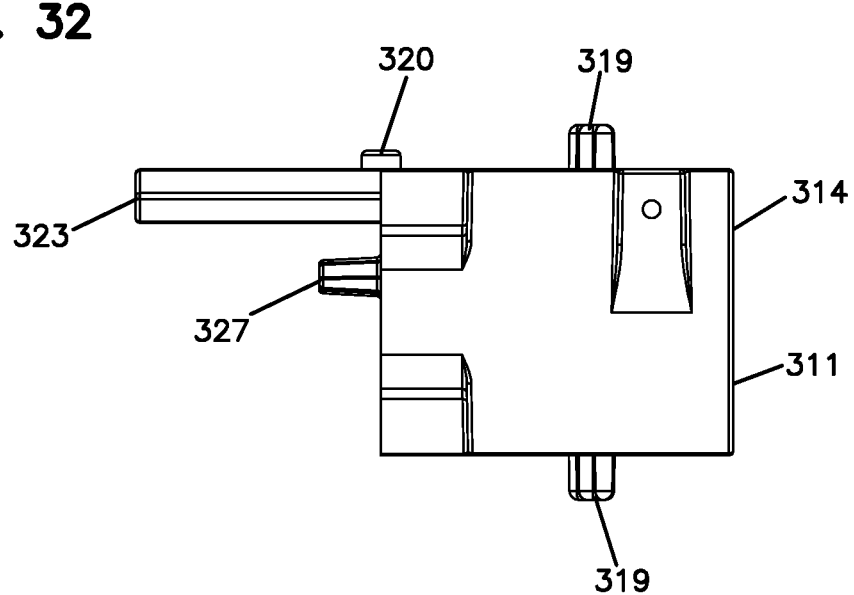
Figure 33:
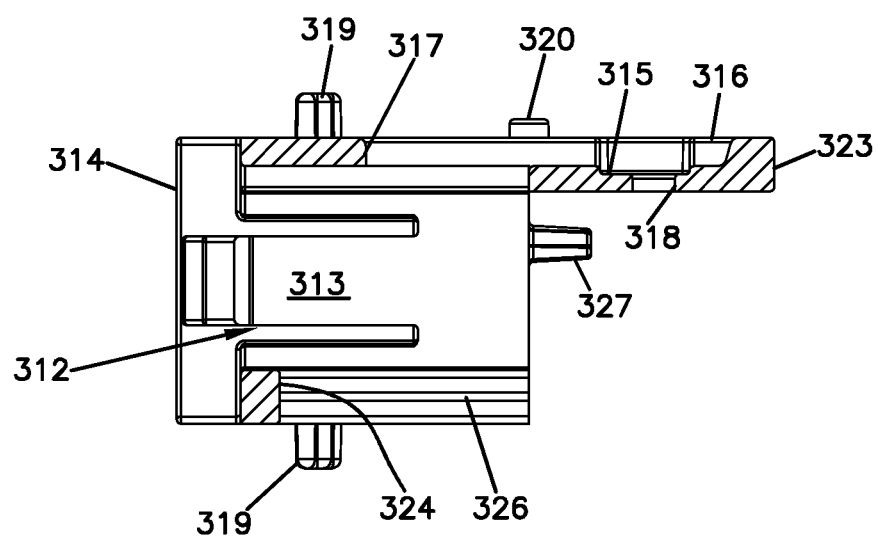

In certain implementations, each mounting recess 315 has a recessed surface on which the body 231 of the respective contact assembly 230 can seat. The mounting recess 315 also defines a first aperture 317 through the recessed surface that leads to an interior of the adapter body 311, which is accessible through the ports 312. Portions of the contacts 235 extend through the first aperture 317 towards the interior of the adapter body 311 (FIG. 25). In certain implementations, a second aperture 318 (FIG. 23) also is defined in the recessed surface spaced from the first aperture 317. The second aperture 318 can be sized to receive a peg 232 of the contact assembly body 231 to help hold the contact assembly 230 within the mounting recess 315.

In some implementations, the adapter 310 is formed from multiple pieces. In the example shown in FIG. 23, the adapter 310 is formed from a first piece 310A and a second piece 310B that fit together to form the adapter 310. In other implementations, the adapter 310 can be formed from a greater number of pieces. In some implementations, the first and second pieces 310A, 310B are identically formed. In other implementations, the adapter pieces 310A, 310B have different shapes or sizes that fit together to form the adapter 310.

As shown in FIG. 23, each adapter piece 310A, 310B includes a body 311 extending from an open end to the port 312. The open ends of the adapter pieces 310A, 310B fit together to form the adapter 310. In some implementations, the adapter pieces 310A, 310B include attachment features that enable the adapter pieces 310A, 310B to fit together. For example, in some implementations, edges of the open end of each body 311 include attachment pegs 327 and openings 328 configured to receive the attachment pegs 327 of the opposing adapter body 311. In other implementations, the open ends can be glued, welded, soldered, or otherwise fixed together.

In certain implementations, the second adapter piece 310B is configured to be rotated 180° about the port insertion axis relative to the first adapter piece 310A. The body 311 includes a flange 323 extending outwardly from the open end of the body 311 at one of the mounting ends 303, 304 of the adapter 310. The body 311 also defines a cutout region 324 extending inwardly from the open end towards the port 312 at an opposite one of the mounting ends 303, 304. The flange 323 of the first adapter piece 310A is sized to fit within the cutout region 324 of the second adapter piece 310B and the flange 323 of the second adapter piece 310B is sized to fit within the cutout region 324 of the first adapter piece 310A. The flange 323 defines contoured sides 326 that fit (e.g., slide) within guides 325 defined in sides of the cutout region 324.

The contact assemblies 230A, 230B fit into mounting recesses 315 defined in the flanges 323 and bodies 311 of the adapter pieces 310A, 310B. In the example shown in FIG. 23, a first aperture 317 extends through the mounting recess 315 to an interior of the adapter body 311 and a second aperture 318 extends through the mounting recess 315 and through the flange 323 (see FIG. 23). Pegs 232 of the contact assembly body 231 may fit in the second apertures 318. Portions of the contact members 235 may extend through the first apertures 317 (see FIG. 25). Ribs 316 are provided at opposite ends of the mounting recess 315 to separate contact members 235 of the contact assembly 230 mounted thereat (see FIG. 22).

FIGS. 26-33 illustrate one example structure suitable for use as housing piece 310A, 310B of FIGS. 22-25. Each structure is configured to receive an optical plug (e.g., see optical plug 180 of FIG. 34) along an insertion axis of the respective port 312. In some implementations, the adapter body 311 includes latching arms 313 at the port 312 that are configured to latch around the received optical plug 180 to hold the plug at the port 312. In certain implementations, each port 312 defines a key area 312A (FIG. 28) sized and shaped to accommodate a keying feature of the optical plug 180. In certain implementations, the optical adapter body 311 also includes shroud walls 314 that extend outwardly from the port 312 at opposite sides 305, 306 of the adapter body 311. The shroud walls 314 aid in protecting the port 312 and/or the connection between the adapter 310 and the plug 180. In the example shown, the shroud walls 314 define a concave curve facing towards the port 312.

In certain implementations, the adapter body 311 includes one or more alignment features that aid in positioning and/or orienting the adapter body 311 on a circuit board, adapter block assembly, or tray. In some implementations, the adapter body 311 includes mounting pegs 319 extending from the first and second mounting ends 303, 304. In certain implementations, the mounting pegs 319 extend outwardly from areas around the mounting recesses 315. In the example shown, two mounting pegs 319 extend outwardly from the mounting ends 303, 304 of the adapter body 311. In other implementations, a greater or fewer number of mounting pegs 319 can be utilized. In some implementations, an alignment peg 320 also can extend outwardly from one or both mounting ends 303, 304 of the adapter body 311. In the example shown, each structure includes a single alignment peg 320. In other implementations, however, additional alignment pegs 320 can be provided.

Figure 34:
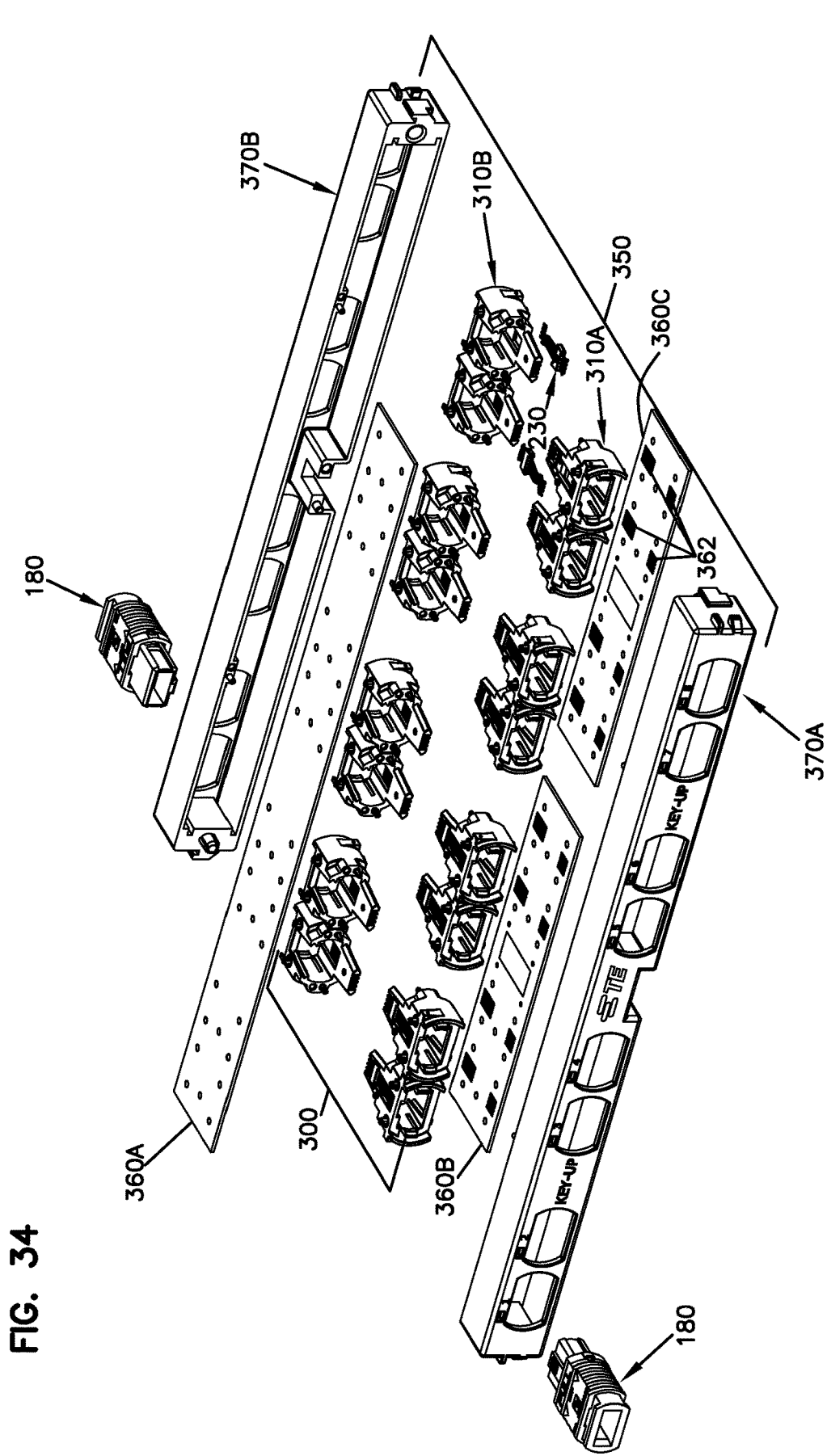
FIG. 34 is an exploded view of another example adapter block assembly holding multiple optical adapters and contact assemblies of FIG. 22.
Figure 35:
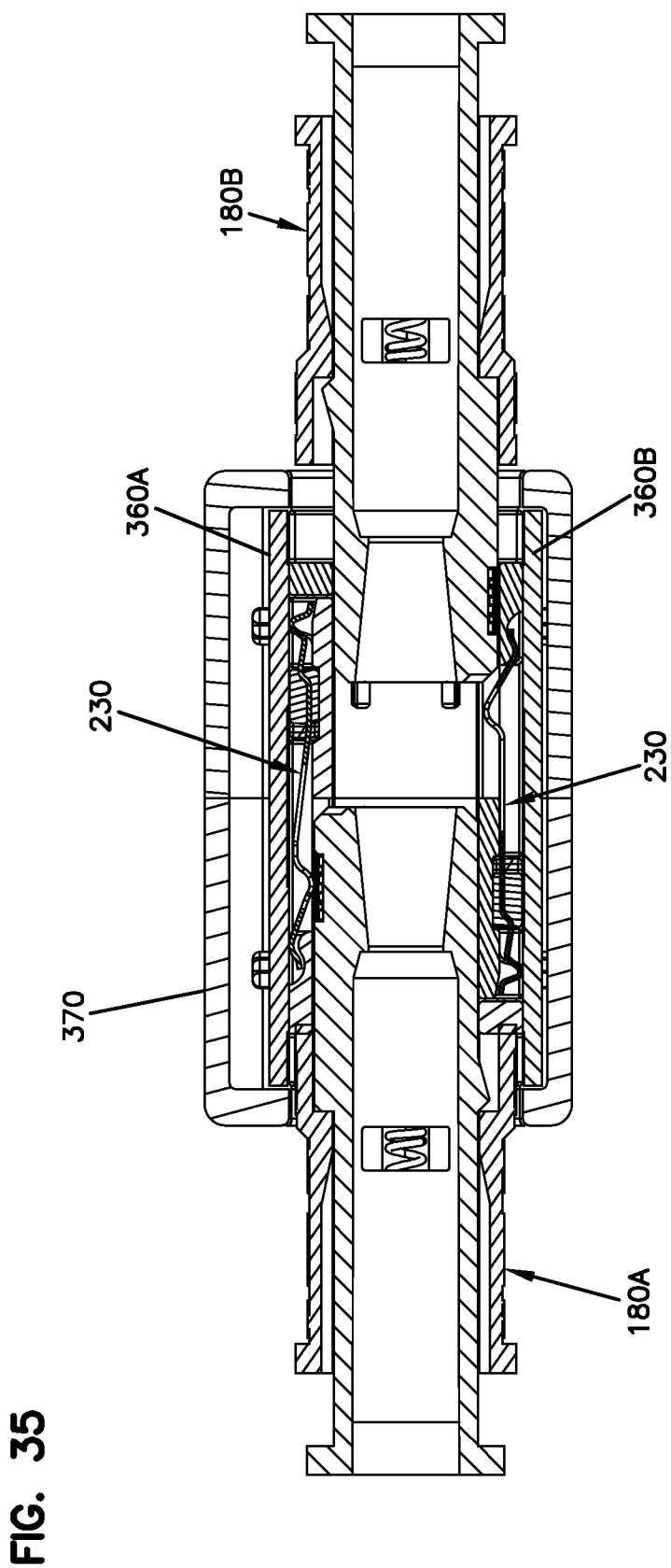
FIG. 35 is a cross-sectional view of the adapter block assembly of FIG. 34 taken along an insertion axis of one opposing pair of ports.

FIGS. 34-35 illustrate an example adapter block assembly 350 that holds one or more adapter assemblies 300. First and second ends of the adapter block assembly 350 provide access to the ports 312 of the adapter assemblies 300. Optical plug connectors 180 can be inserted through the ends of the adapter block assembly 350 and into the ports 312. In certain implementations, labeling can be provided at each port 312. In certain implementations, a light indicator also can be provided at each port 312. Sides of the adapter block assembly 350 are configured to mount the adapter block assembly 350 to a tray.

The adapter block assembly 350 includes one or more adapter assemblies 300 mounted to a circuit board arrangement 360 within a housing 370. The pieces 310A, 310B of the adapter assemblies 300 are shown exploded in FIG. 34. However, the pieces 310A, 310B are assembled together and coupled to the circuit board arrangement 360 when disposed within the housing 370. In the example shown in FIG. 34, the housing 370 includes a two-piece housing 370A, 370B that defines an interior in which to hold the adapter assemblies 300 and circuit board arrangement 360. In other implementations, the housing 370 can be formed of greater or fewer pieces. In the example shown, the housing pieces 370A, 370B are substantially identical to the housing pieces 270A, 270B of FIG. 17.

The circuit board arrangement 360 includes a controller that manages obtaining information from the contact assemblies 230 of the adapter assemblies 300. In some implementations, the circuit board arrangement 360 includes a first circuit board 360A that extends over the first mounting end 303 of the adapter assemblies 300. The circuit board 360A includes contact pads that align with the first and third contact surfaces 236, 239 of the contact assemblies 230 mounted to the first mounting ends 303 of the adapter assemblies 300. In certain implementations, the first circuit board 360A includes the controller. The circuit board 360A also includes a circuit board connector that extends from the circuit board 360A, past the adapter assemblies 300, towards the bottom of the adapter block assembly 350. The circuit board connector is configured to couple to an electrical circuit or component to electrically couple the contact assemblies 230 to a data management network as will be described in more detail herein.

In some implementations, the adapter assemblies 300 include contact assemblies 230 mounted to both mounting ends 303, 304 of the adapter assemblies 300. In such implementations, the circuit board arrangement 360 also includes at least a second circuit board 360B that extends over the second mounting end 304 of one or more of the adapter assemblies 300. In certain implementations, the circuit board arrangement 360 also includes a third circuit board 360C that is positioned parallel to the first circuit board 360A and laterally spaced from the second circuit board 360B. The second and third circuit boards 360B, 360C also connect to the electrical circuit or component to electrically couple contact assemblies 230 at the second and third circuit boards 360B, 360C to the data management network.

FIG. 35 illustrates part of a first optical plug connector 180A fully inserted into one port of one of the adapter assemblies 300 of the adapter block assembly 350 and part of a second optical plug connector 180B partially inserted into an opposing port of the adapter assembly 300. For ease in viewing, internal components of the plug connectors 180A, 180B (e.g., the ferrules) are not shown. The memory 182 of the first optical plug connector 180A aligns with the second contact surfaces 238 of one of the contact assemblies 230 mounted to the adapter assembly 300. Physical contact between the first plug connector 180A (e.g., the memory 182) and the second contact surfaces 238 deflects the extensions 237 of the contact assembly 230 so that the third contact surfaces 239 touch or swipe along the contact pads of the first circuit board 360A of the adapter block assembly 350. Accordingly, information (e.g., present detection information and/or PLI) can be communicated from the memory 182 to a data management network.

The second optical plug connector 180B has only been partially inserted into the respective port 312. The second optical plug connector 180B is not yet touching the second contact surfaces 238 of the other contact assembly 230 mounted to the adapter assembly 300. Because the plug connector 180B is not biasing the second contact surfaces 238 towards the exterior of adapter assembly 300, the third contact surfaces 239 of the other contact assembly 230 are not touching the contact pads 362 on the second circuit board 360B. Accordingly, the data management network and/or a local processor can determine that the circuit is open and, thereby, determine that the plug connector 180B is not yet present within the port 312 (i.e., at least not sufficiently present to enable reading of data stored in memory 182 of the second plug connector 180B).

Figure 36:
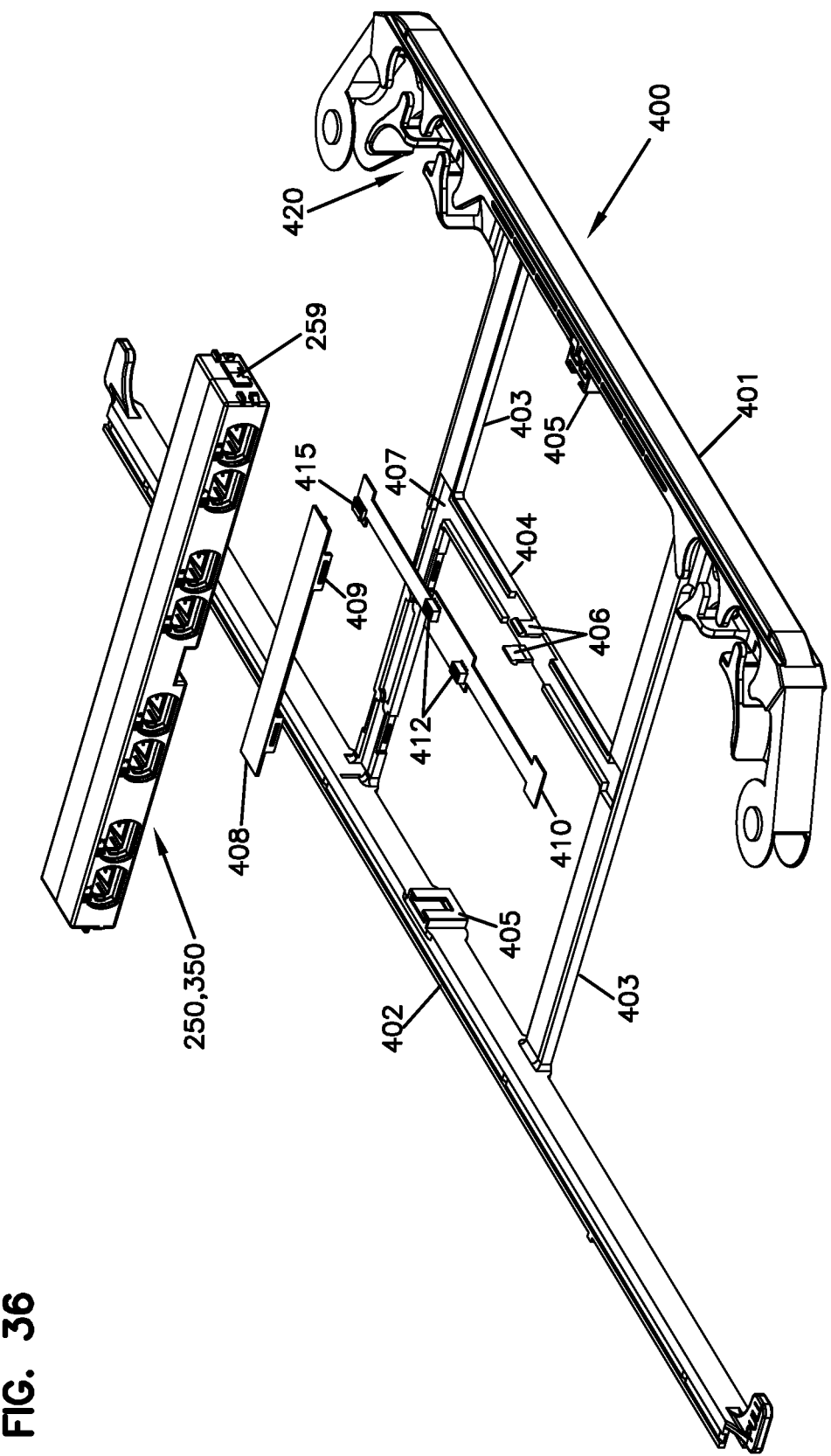
FIG. 36 is a perspective view of the adapter block assembly of FIG. 34 assembled together and exploded upwardly from an example tray.
Figure 37:
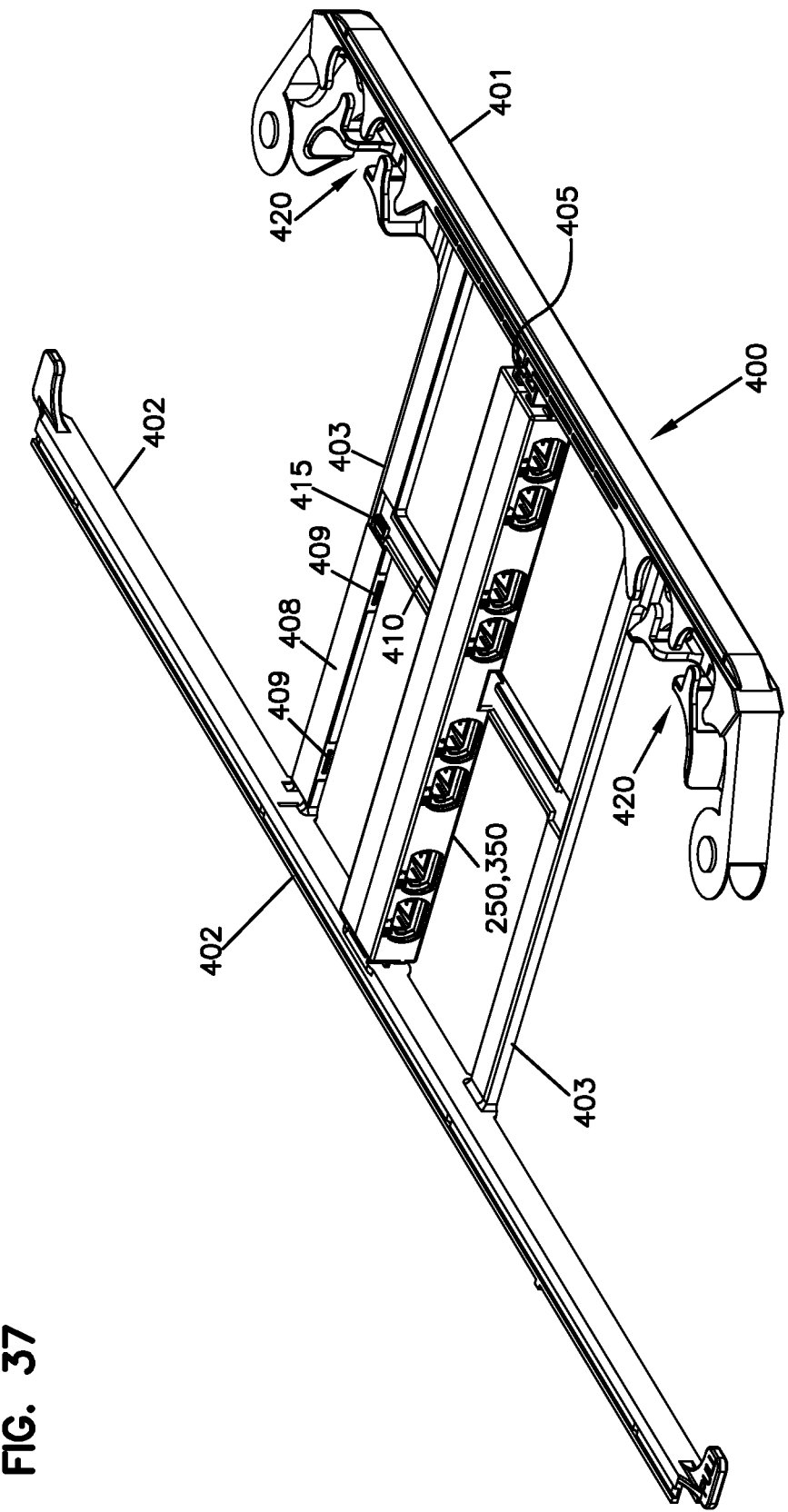
FIG. 37 shows the adapter block assembly and tray of FIG. 36 assembled together.
Figure 38:
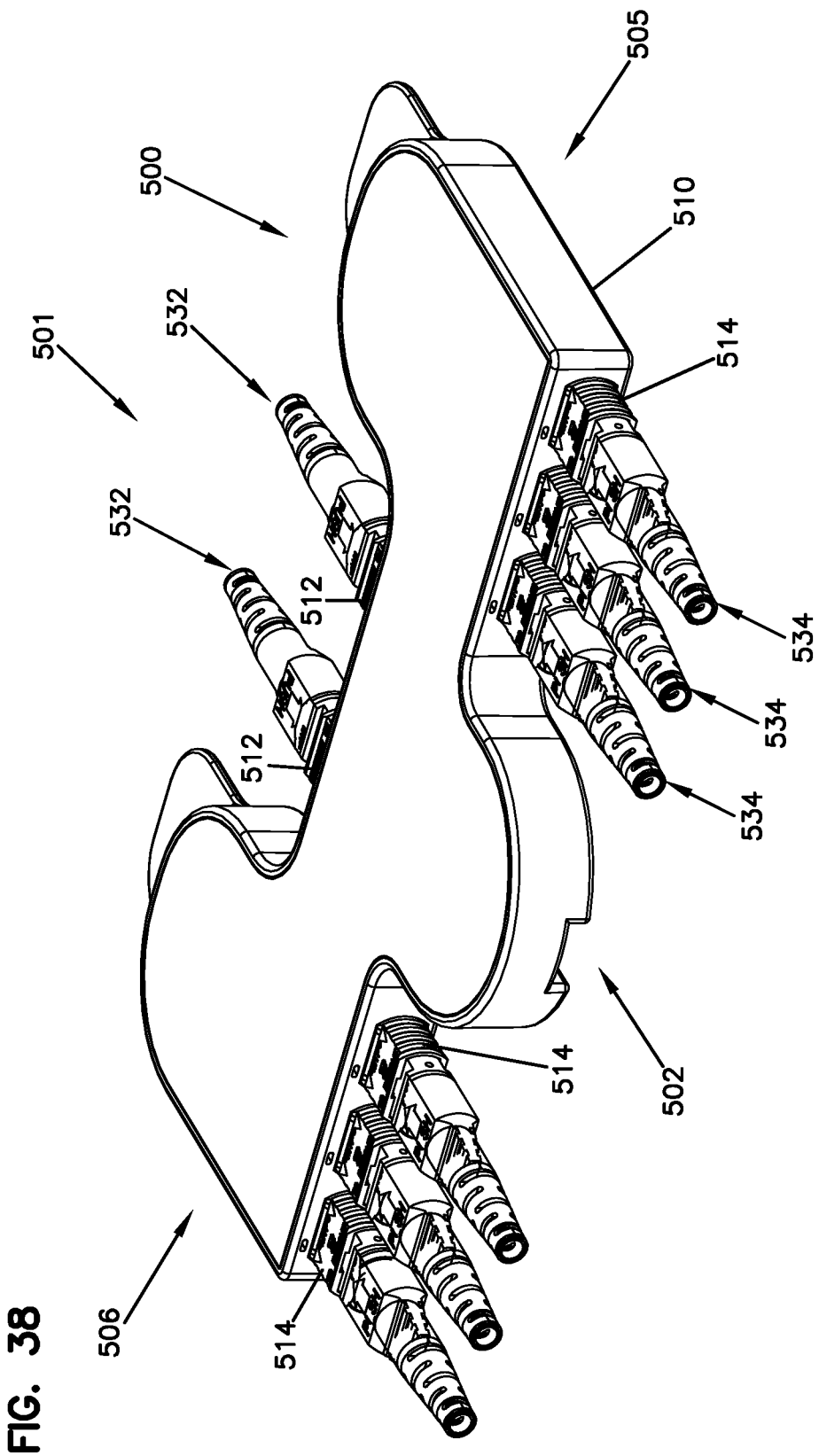
FIG. 38 is a perspective view of an example adapter cassette configured to couple first optical plug connectors to second optical plug connectors.
Figure 48:
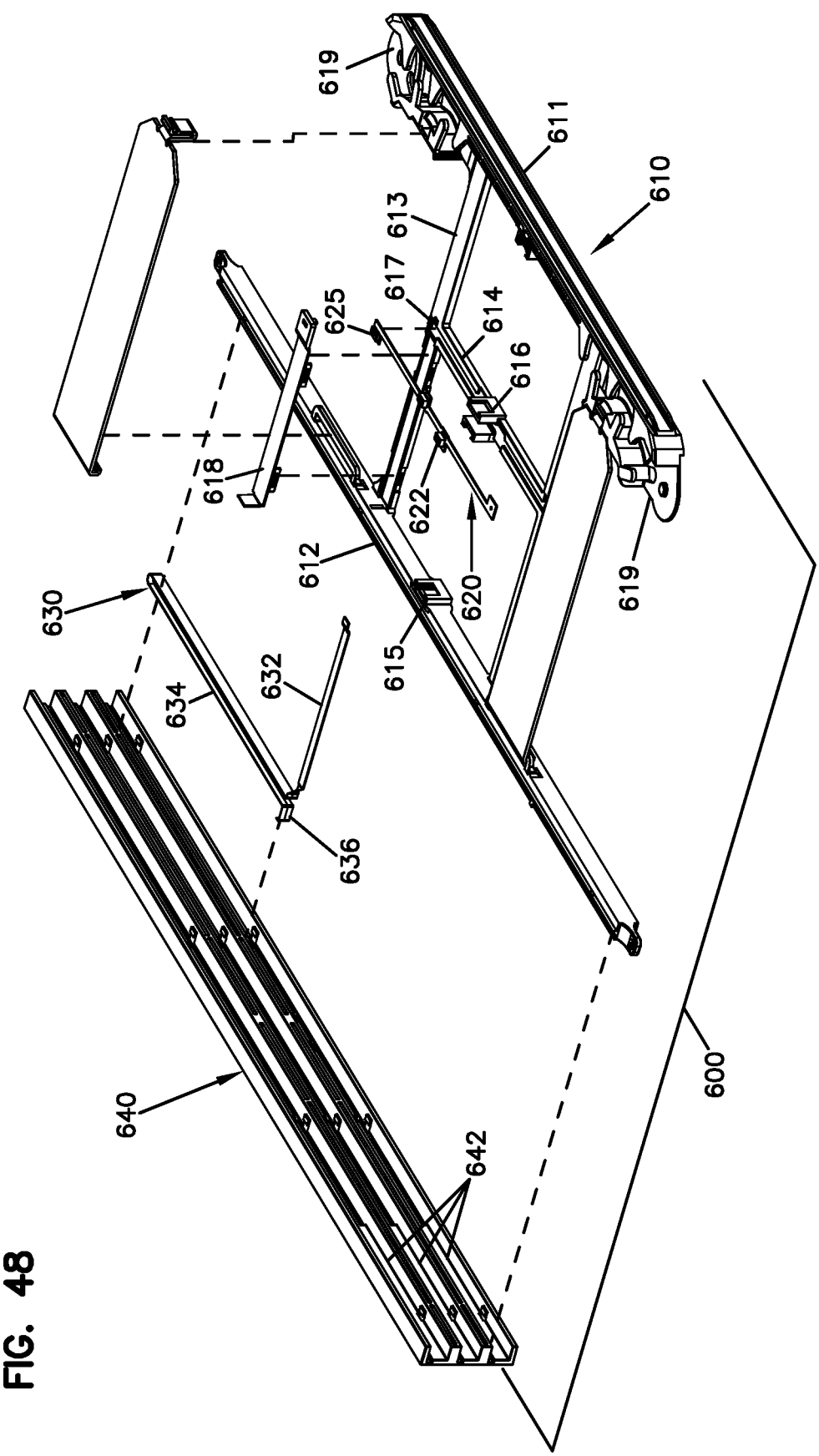
FIG. 48 illustrates an example tray arrangement including another example tray to which any of the adapter block assemblies or cassettes disclosed herein can be mounted.
Figure 49:
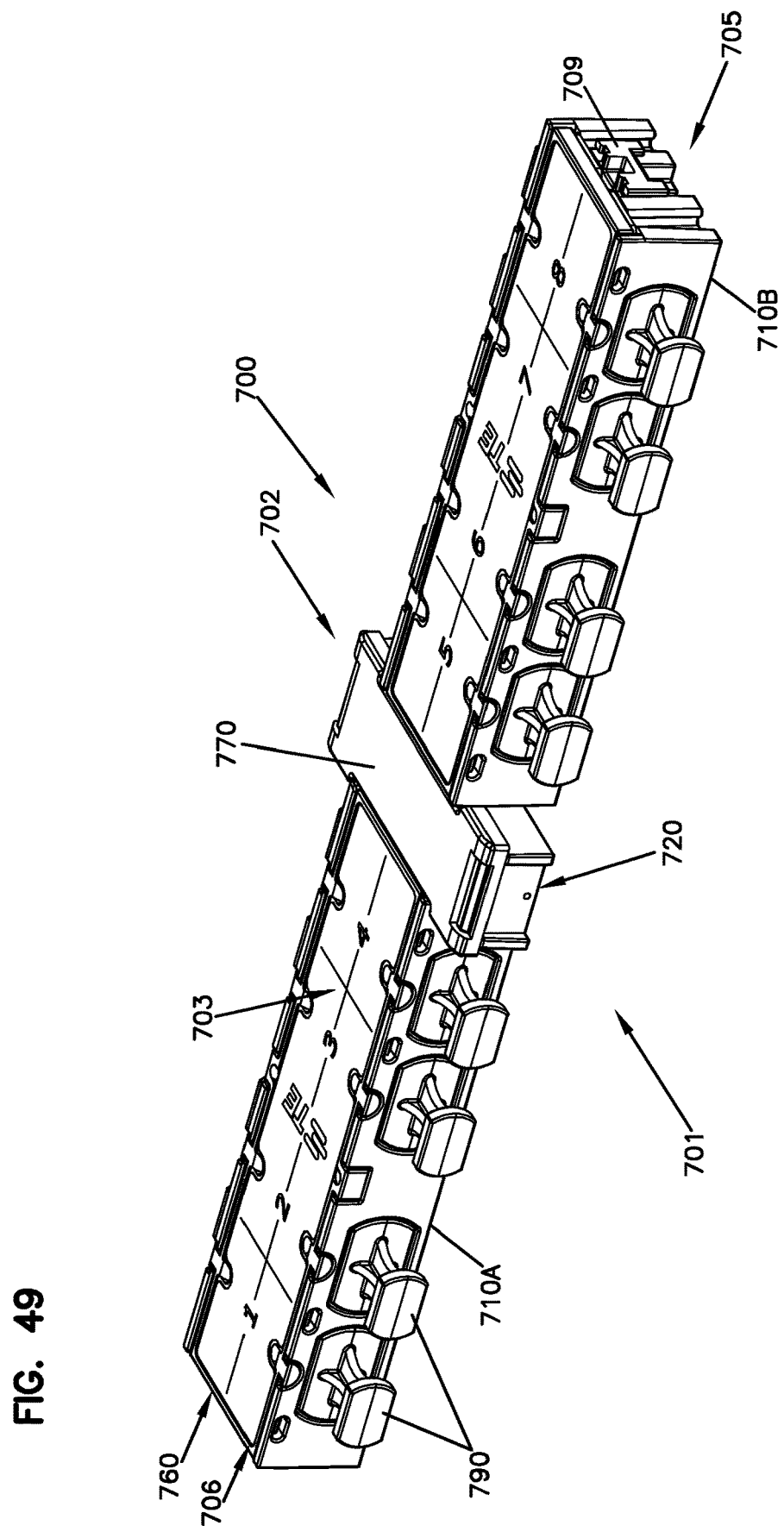
FIG. 49 is a top perspective view of another example adapter block assembly holding multiple optical adapters and contact assemblies of FIG. 22.
Figure 56:
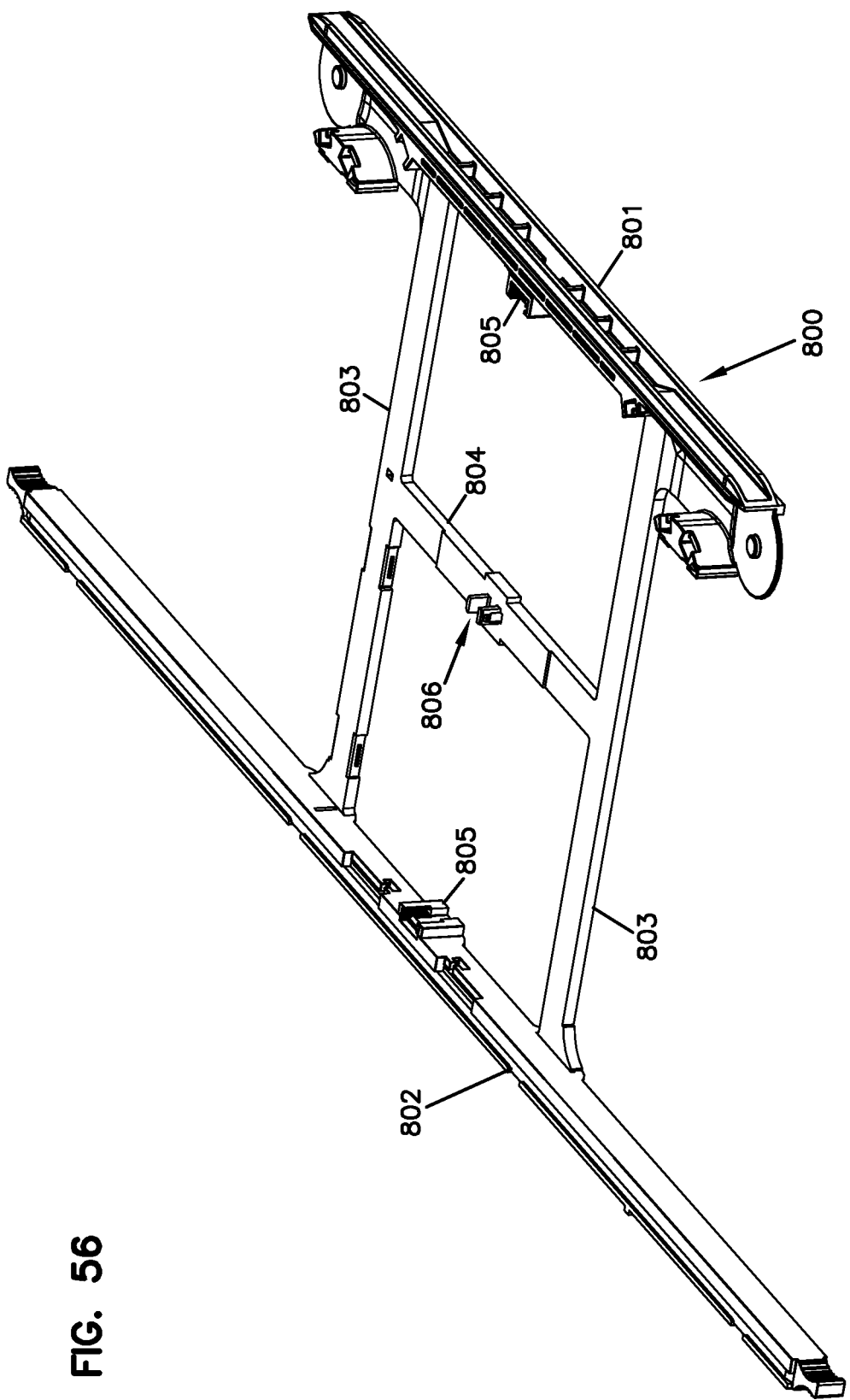
FIG. 56 is an example tray suitable for mounting any of the adapter block assemblies or cassettes disclosed herein.
Figure 57:
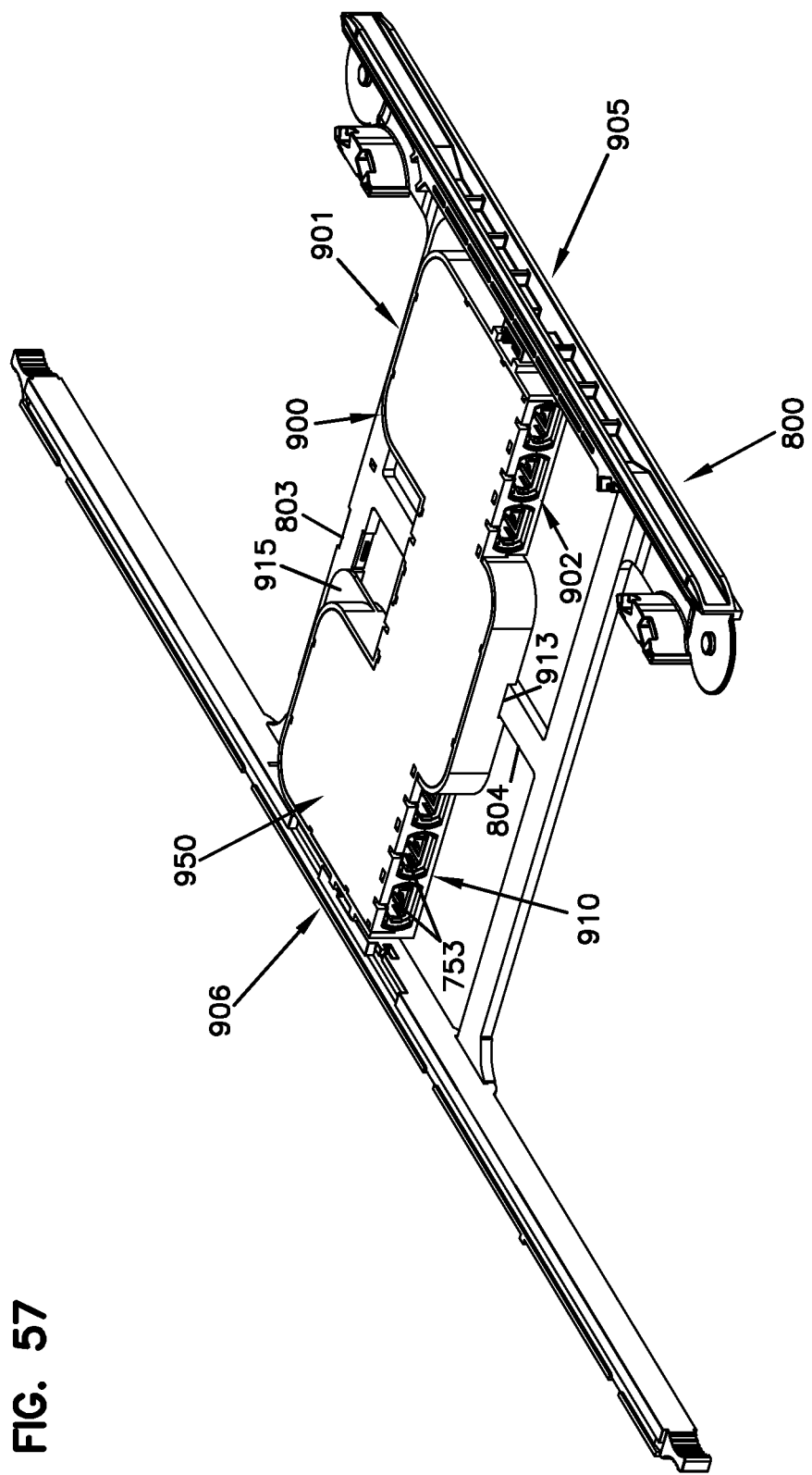
FIG. 57 shows an example cassette disposed on the tray of FIG. 56.

FIGS. 36 and 37 illustrate mounting one of the adapter block assemblies 250, 350 to an example tray 400. Other example trays 400', 610, 800 are illustrated in FIGS. 44, 48, and 56 and discussed herein. Information about how such trays (e.g., trays 400, 400', 600, 1100) can be moveably mounted within a chassis or rack and how such an arrangement can be used within a telecommunications system can be found in U.S. application Ser. No. 14/169,941, filed Jan. 31, 2014, now U.S. Pat. No. 9,128,262 and titled "Slidable Telecommunications Tray with Cable Slack Management," the disclosure of which is hereby incorporated herein by reference. Another system including trays on which the adapter blocks and cassettes disclosed herein can be mounted is disclosed in U.S. application Ser. No. 13/925, 375, filed Jun. 24, 2013, now U.S. Pat. No. 9,195,021 and titled "Slidable Fiber Optic Connection Module with Cable Slack Management," the disclosure of which is hereby incorporated herein by reference.

The tray 400 is configured to receive at least one adapter block assembly 250, 350. In some implementations, the tray 400 also is configured to manage optical fibers/cables routed to the ports 212, 312 of the adapter block assemblies 250, 350. In the example shown in FIG. 36, the tray 400 includes cross-members 403 extending between two side rails 401, 402. A mounting rail 404 extends between the cross-members 403. In some implementations, latching fingers 406 extend upwardly from the mounting rail 404. The latching fingers 406 are configured to engage the adapter block assembly 250, 350 to further secure the adapter block assembly 250, 350 to the tray 400. In certain implementations, two latching fingers 406 face in opposite directions towards the side rails 401, 402. In other implementations, another type of adapter block assembly securement structure can be disposed at the mounting rail 404.

Mounting structures 405 are provided at the inner sides of the side rails 401, 402. In certain implementations, the mounting structures 405 are laterally aligned. The mounting structures 405 are configured to receive the retention members 259 of the adapter block assemblies 250, 350. For example, the mounting structures 405 receive the retention members 259 extending outwardly from the sides 255, 256 of the adapter block assemblies 250, 350. In an example, each mounting structures 405 defines a T-shaped cavity having an open top through which one of the retention members 259 can slide. Each mounting structures 405 also includes a shelf on which the retention member 259 can seat.

In certain implementations, the tray 400 is moveable (e.g., slideable, pivotal, etc.) relative to a frame, rack, cabinet, or other mounting structure. For example, exterior surfaces of the side rails 401, 402 can include guides that interact with guides on the holding structure. In certain implementations, the tray 400 includes cable management guides 420 that form routing paths for optical fibers/cables routed onto the tray 400. The management guides 420 may aid in managing the optical fibers/cables during movement of the tray 400.

In some implementations, the tray 400 provides an electrical connection between the adapter block assemblies 250, 350 and a data management network. In some implementations, an electrical circuit (e.g., a second circuit board 410) is mounted to the mounting rail 404. For example, the mounting rail 404 and/or one or more of the cross-members 403 can define a pocket or channel 407 sized to fit the circuit board 410 (e.g., see FIG. 36). The circuit board 410 includes connectors (e.g., pin receptacles) configured to receive the circuit board connectors 265 of the printed circuit boards 260, 360 within the adapter block assemblies 250, 350. In some implementations, the circuit board 410 extends over the mounting rail 404 and over at least part of one of the cross-members 403 towards an aperture in the second side rail 402 through which the circuit board 410 can connect to a chassis electrical circuit (e.g., backplane, cable, etc.).

In other implementations, an electrical cable (e.g., a flexible cable) or other circuit can extend from the chassis electrical circuit, through the aperture in the second side rail 402, extend across at least part of the cross-members 403, and connect (e.g., via connector 415) to the second circuit board 410. A cover 408 can be positioned over the cross-member channel 407 to protect the flex circuit. In an example, the cover 408 can be latched (e.g., using latches 409) other otherwise secured to the cross-member 403. In certain implementations, the chassis electrical circuit includes a local processor to manage the data obtained from the adapter block assemblies 250, 350. In other implementations, the chassis electrical circuit includes a data port through which the data can be carried to a data management network.

FIGS. 38-48 illustrate an example cassette 500 configured to optically couple together first cables 532 and second cables 534. In some implementations, at least of the first cables 532 and the second cables 534 are multi-fiber (e.g., MPO-type) cables. In certain implementations, both the first cables 532 and the second cables 534 are multi-fiber cables. In other implementations, the second cables 534 may include single-fiber cables. In some implementations, the cassette 500 couples a number of first cables 532 to a greater number of second cables 534. In the example shown, the cassette 500 couples one first cable 532 to the second cables 534. In other example, the cassette 500 can couple two first cables 532 to three second cables 534. In other implementations, each first cable 523 can be coupled to any desired number of second cables 534.

The cassette 500 includes a cassette body 510 having a first port end 501, a second port end 502, a mounting end 503, a cover end 504, a first side 505, and a second side 506. The first cables 532 are configured to plug into ports at the first port end 501 and the second cables 534 are configured to plug into ports at the second port end 502. In certain implementations, the ports at the first and second port ends 501, 502 are defined by adapter assemblies 512, 514. In certain implementations, the adapter assemblies 512 at the first port end 501 are defined by MPO-type adapter assemblies. In an example, the adapter assemblies 514 of the second port end 502 are defined by MPO-type adapter assemblies. In other implementations, however, the adapter assemblies 514 of the second port end 502 can be defined by LC-type adapter assemblies or other single-fiber adapter assemblies.

Figure 39:
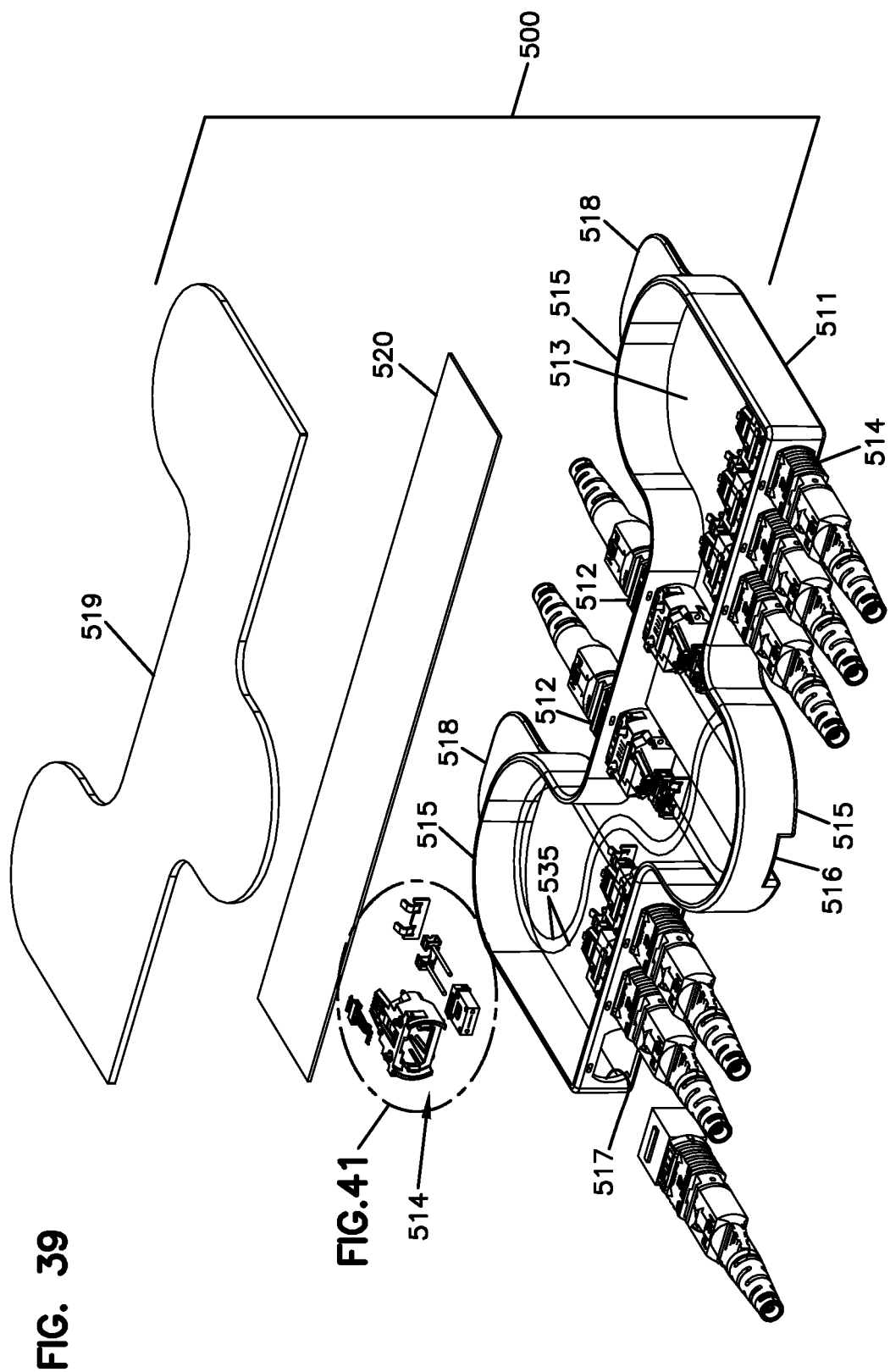
FIG. 39 is an exploded view of the adapter cassette of FIG. 38.

As shown in FIG. 39, the cassette body 510 includes a bottom housing 511 having a base 513, a sidewall, and a cover 519 that attaches to the bottom housing 511 to close an interior of the cassette body 510. The base 513 defines the mounting end 503 and the cover 519 defines the cover end 504. The adapters 512, 514 are mounted at openings 517 at the first and second port ends 501, 502. In certain implementations, the openings 517 at the first port end 501 are disposed along a row extending between the first and second sides 505, 506; and the openings 517 at the second port end 502 are disposed along another row extending between the first and second sides 505, 506.

Figure 41:
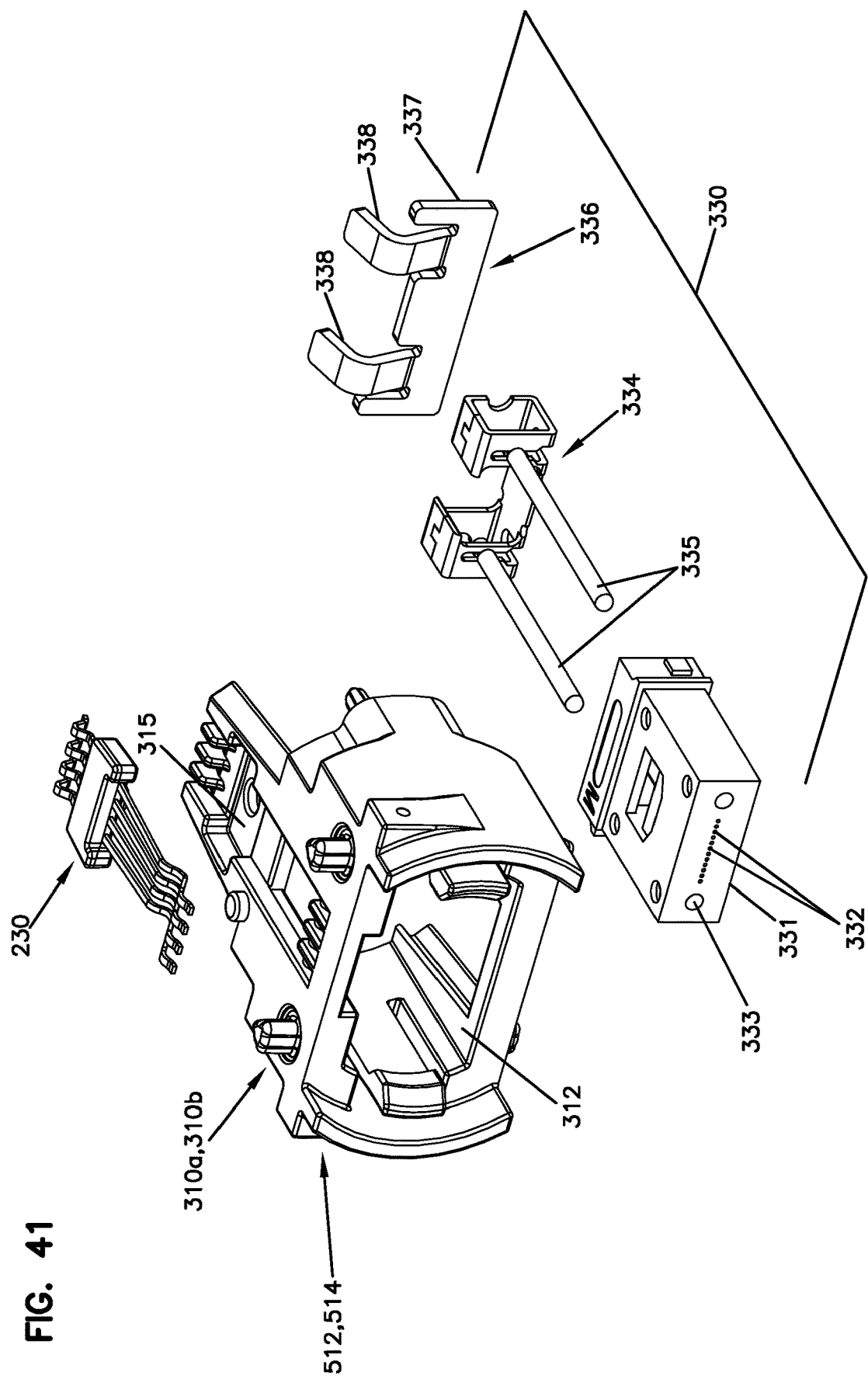
FIG. 41 is an exploded view of an example adapter assembly including a port and a spring-biased ferrule assembly facing the port.
Figure 42:
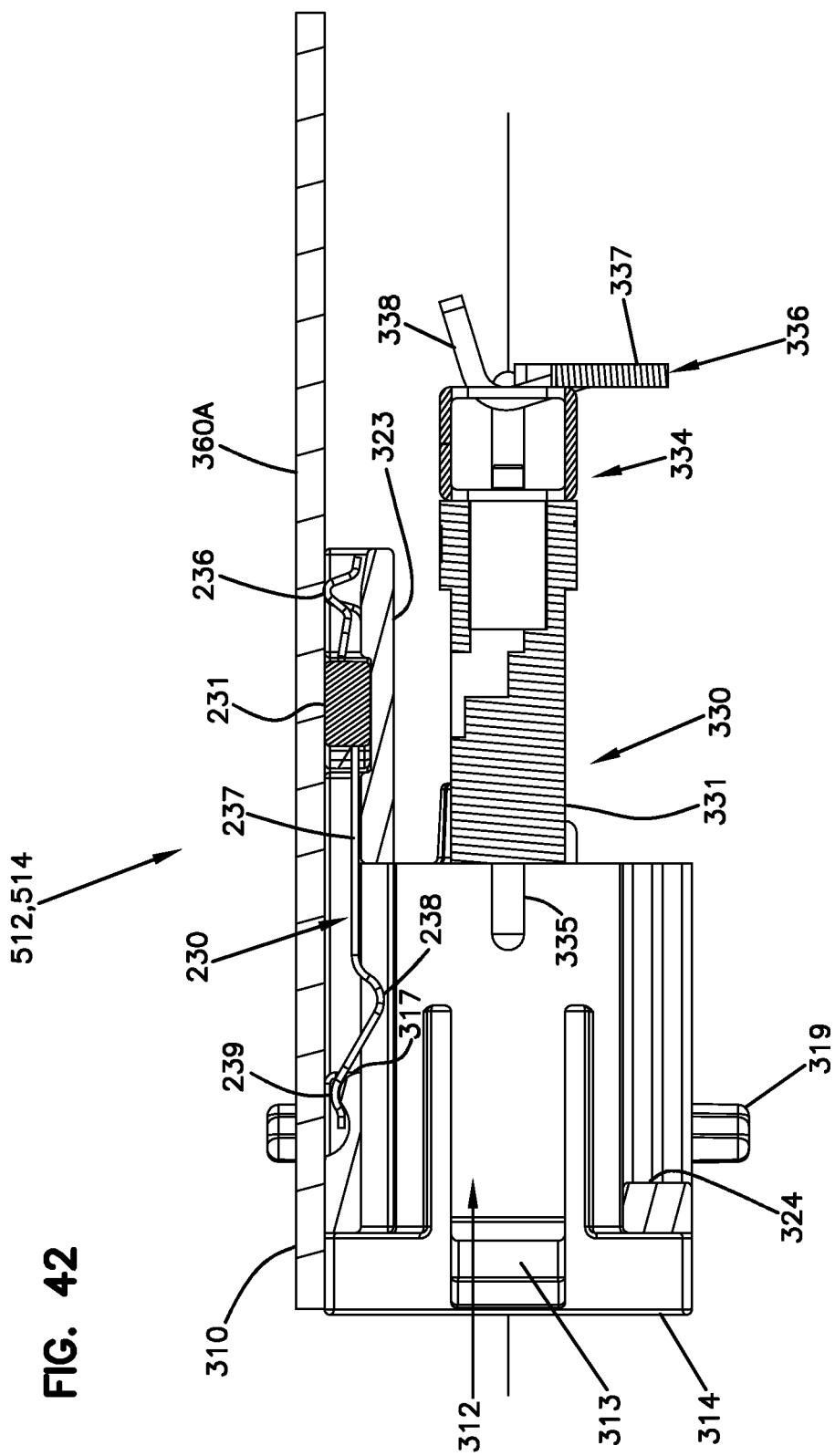
FIG. 42 is an axial cross-sectional view of the adapter assembly of FIG. 41.

As shown best in FIG. 41, the adapter assemblies 512, 514 define a port for receiving an optical connector plug 180 and include a ferrule assembly 330 mounted opposite the port. In certain implementations, the adapter assemblies 512, 514 include one of the adapter pieces 310A, 310B of the second example adapter assemblies 300. The adapter piece 310A, 310B defines the port 312 for receiving the connector plug 180 at the port ends 501, 502 of the cassette body 511. The ferrule assembly 300 mounts to the adapter piece 310A, 310B at the flange 323 or other portion of the body 311 (e.g., see FIG. 42).

Figure 40:
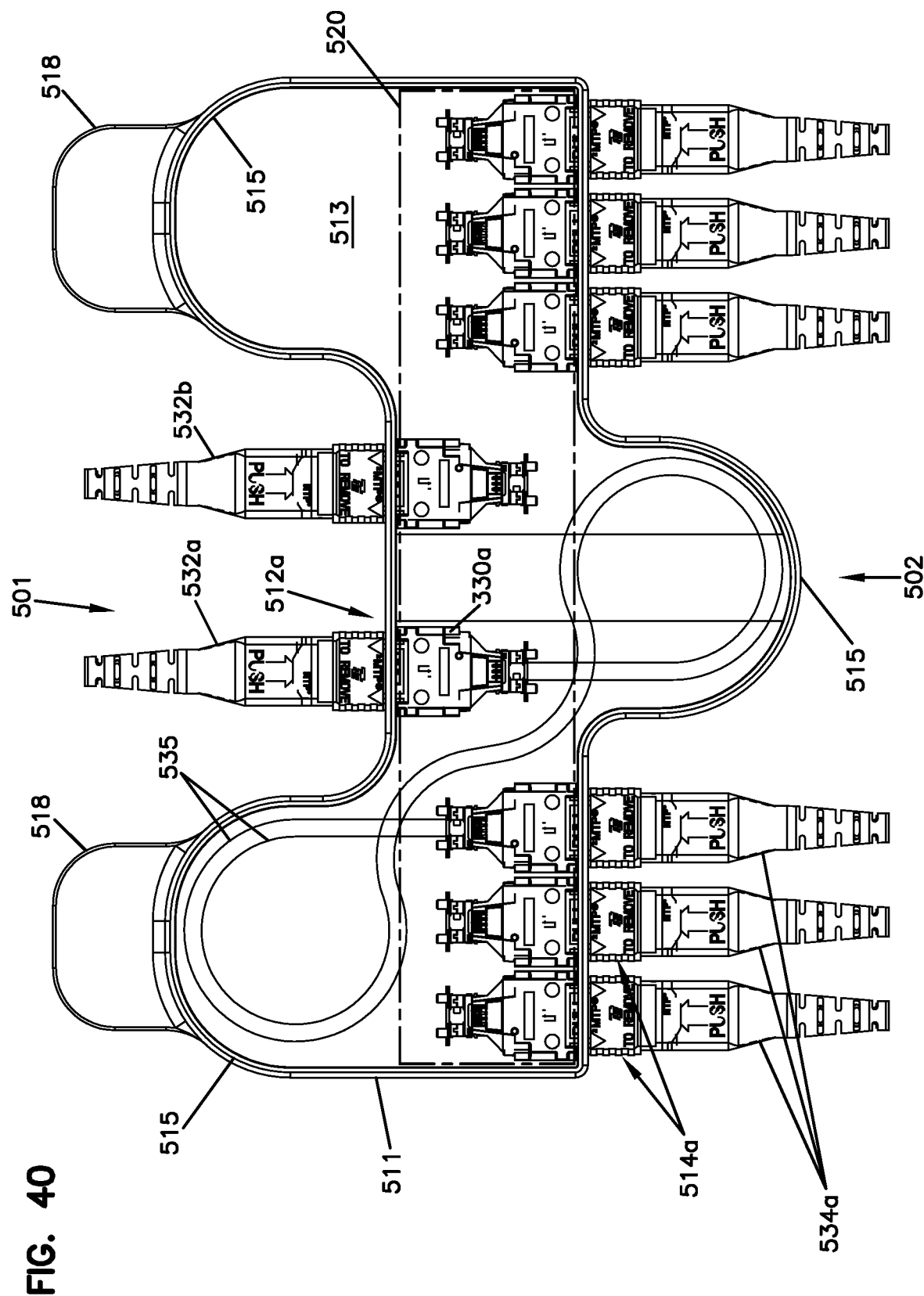
FIG. 40 is a plan view of the adapter cassette of FIG. 38.

The port of each adapter assembly 512, 514 faces outwardly from the respective port end 501, 502 of the cassette body 510 (FIG. 40). The ferrule assembly 330 faces inwardly towards the interior of the cassette body 510 (FIG. 40). The ferrule assembly 330 can be spring-biased towards the port 312 to engage a ferrule of an optical connector plug 180 inserted at the port 312 (FIG. 41). In some implementations, the ferrule assembly 330 is pre-cabled with optical fibers. In certain implementations, the ferrule assembly 330 of at least one adapter assembly 512 can be pre-cabled with optical fibers that extend to the ferrule assembly 330 of one or more adapter assemblies 514 as will be described in more detail herein.

As shown in FIG. 41, the ferrule arrangement 330 includes an optical ferrule 331 defining one or more through-passages 332 through which one or more optical fibers can be mounted. In certain implementations, the ferrule 331 also defines pin openings 333 through which pins 335 of a pin arrangement 334 can extend. The ferrule arrangement 330 also includes a spring 336 to bias the ferrule 331 towards the port 312 of the adapter assembly 512, 514. In the example shown, the spring 336 includes two leaf springs 338 extending from a base 337 to interact with the pin arrangement 334. In other implementations, other types of springs can be used to bias the ferrule arrangement 330 towards the port 312 of the adapter assembly 512, 514. In some implementations, adapter assemblies 512 at the first port end 501 can be pre-cabled to adapter assemblies 514 at the second port end 502. For example, optical fibers 535 (e.g., bare optical fibers) can be routed within the interior of the cassette body 510 between the ferrule assemblies 330 of the adapter assemblies 512, 514. In certain implementations, portions of the cassette body 510 define bend radius contours 515 that facilitate fiber routing within the cassette body 510. For example, portions of the cassette sidewall opposite the port openings 517 can extend away from the port openings 517 to define a concave contour facing the port openings 517 (see FIG. 40).

FIG. 40 shows one example routing plan for optically coupling a first adapter assembly 512 to at least one second adapter assembly 514. In the example shown in FIG. 40, a first one 512*a* of the first adapter assemblies 512 has a port configured to receive a first connector plug 532*a*. The first one 512*a* of the first adapter assemblies 512 also includes a first ferrule arrangement 330*a* (see FIGS. 41-42) that is pre-cabled with optical fibers 535*a* that are routed to a second ferrule arrangements 330*a*' at one of the second adapter assemblies 514*a*. The optical fibers 535*a* extend from the first ferrule arrangement 330*a*, towards one of the bend radius contours 515, loops around towards the second side 506 of the cassette body 510, loops around another of the bend radius contours 515, and terminates at the second ferrule arrangement 330*a*'.

In some implementations, the cassette body 510 has more second adapter assemblies 514 than first adapter assemblies 512. For example, optical fibers 535 of each of the first adapter assemblies 512 can be routed to two or more of the second adapter assemblies 514. In the example shown in FIG. 40, optical fibers 535 of each of the first adapter assemblies 512 can be routed to three of the second adapter assemblies 514. In another example, optical fibers 535 of two of the first adapter assemblies 512 can be routed to three of the second adapter assemblies 514. In other implementations, the cassette 500 can have any desired number of first and second adapter assemblies 512, 514.

Figure 43:
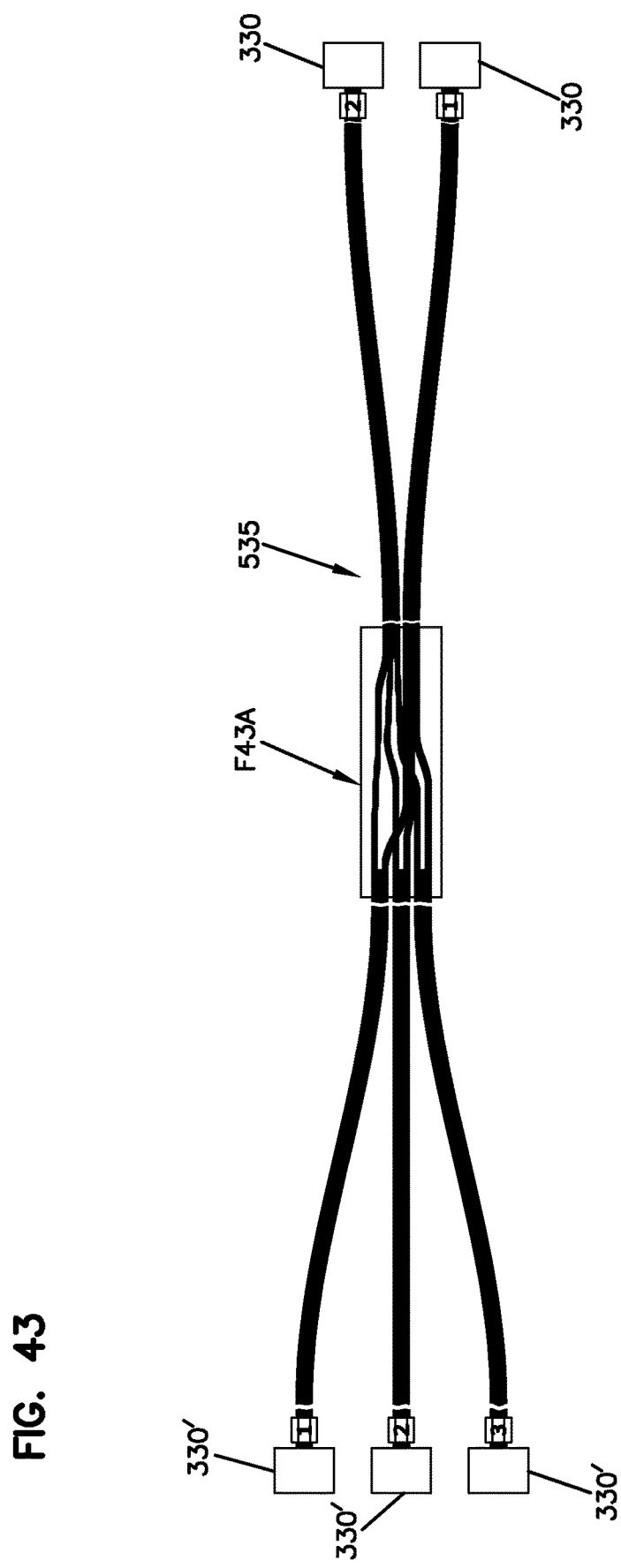
FIG. 43 illustrates one example fiber arrangement disposed within the cassette to couple ferrule assemblies of first adapter assemblies to ferrule assemblies of second adapter assemblies.
Figure 43A:
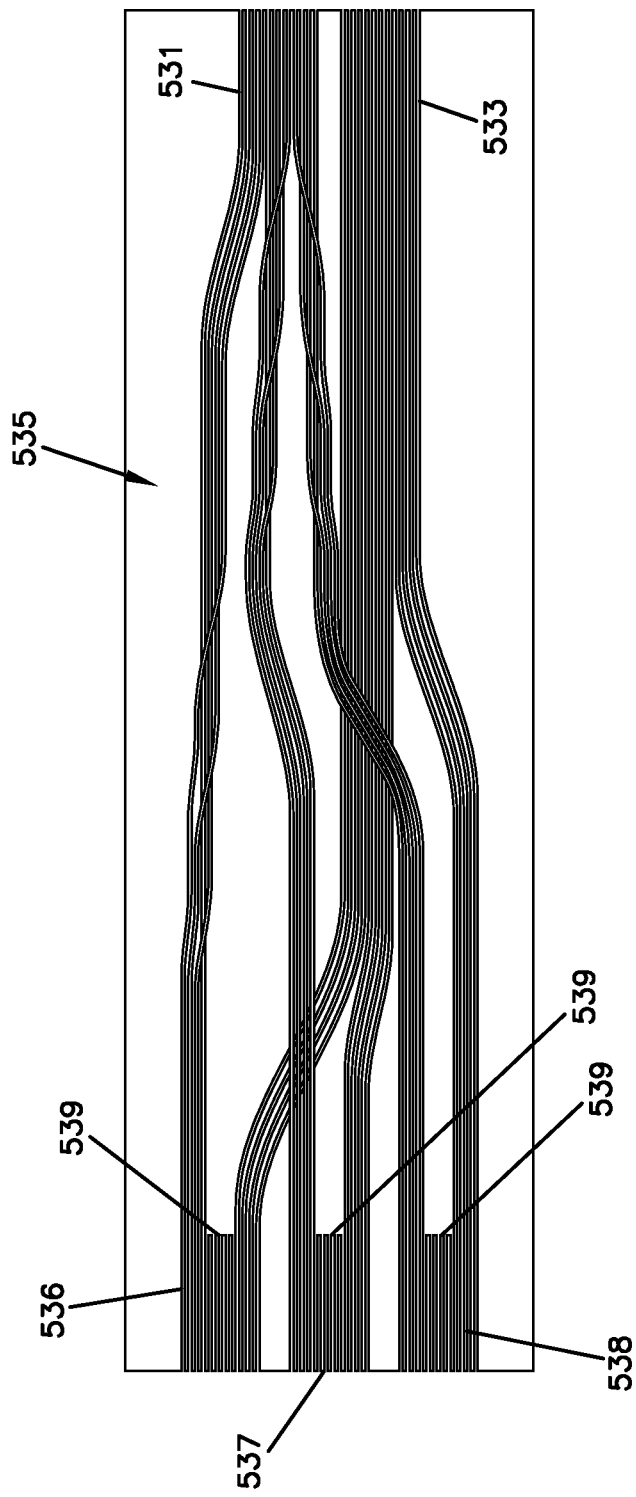
FIG. 43A is an enlarged view of a portion of FIG. 43.

FIGS. 43 and 43A illustrate one example optical fiber arrangement 535 configured to extend between ferrule arrangements 330, 330' of some of the first and second adapter assemblies 512, 514. In the example shown, the optical fiber arrangement 535 extends between the ferrule arrangements 330 of two first adapter assemblies 512 and the ferrule arrangements 330' of three second adapter assemblies 514. The optical fiber arrangement 535 includes optical fibers being separated from two groups 531, 533 of twelve fibers into three groups 536, 537, 538 of eight optical fibers. Each group 531, 533, 536-538 of optical fibers terminates at one of the ferrule arrangements 330, 330'. In other implementations, however, the optical fiber arrangement 535 can extend between any desired number of first and second adapter assemblies 512, 514.

In certain implementations, each ferrule arrangement 330, 330' is configured to receive a like number of fibers (e.g., to fill fiber receptacles within the ferrule 331). If the ferrule arrangement 330, 330' is configured to receive fewer fibers of the fiber arrangement 535, then the ferrule arrangement 330, 330' can receive fiber stubs 539 (e.g., dark fibers) so that all through-passages 332 of the ferrule 331 are filled. For example, in FIG. 43A, each ferrule arrangement 330, 330' is configured to receive twelve optical fibers. However, the fiber arrangement 535 includes two groups 531, 533 of twelve fibers and three groups 536-538 of eight fibers. Accordingly, the ferrule arrangements 330' receiving the second groups 536-538 of fibers also receive four fiber stubs 539. In other implementations, each ferrule arrangement 330, 330' can be configured to receive a greater or lesser number of fibers.

Referring back to FIG. 39, some types of cassettes 500 are configured to obtain data (e.g., PLI) from the connector plugs 532, 534 received at the ports of the adapter assemblies 512, 514. In certain implementations, the cassette 500 includes a circuit board 520 that is configured to extend over the contact assemblies 230 mounted to the adapter pieces 310A, 310B of the adapter assemblies 512, 514 (see FIGS. 39 and 40). Contact pads on the circuit board 520 interface with the contact assemblies 230 to obtain the data stored at the plug connectors 532, 534 received at the ports. A controller (e.g., processor, microprocessor, etc.) can be mounted to the circuit board 520) to manage the information obtained from the contact assemblies 230. In certain implementations, a circuit board connector extends from the circuit board 520, through the mounting end 503 or the cover end 504 of the cassette body 510, towards an electrical circuit (e.g., flex circuit, circuit board, etc.) connected to a chassis processor and/or data management network.

Some cassettes 500 are configured to mount to the tray 400 shown in FIGS. 36 and 37. In other implementations, however, the cassette 500 can be mounted to the tray 400 or any other support structure. For example, FIGS. 44-45 illustrate the cassette 500 mounting to a tray 400' that is substantially the same as the tray 400. In the example shown in FIGS. 44-45, however, the tray 400' includes a side rail 402' having a different shape than the side rail 402 of the tray 400. Cable management guides 420' of the example tray 400' also differ from the cable management guides 420 of the tray 400.

In some implementations, the cassette body 510 can define a notched section 516 that is configured to seat on the mounting rail 404 of the tray 400, 400'. In certain implementations, latch arms 406 are configured to couple to latching shoulders defined by the cassette body 510. In other implementations, the cassette body 510 can be otherwise coupled to the mounting rail 404. In some implementations, the cassette body 510 includes flanges 518 that extend outwardly from the bottom housing 511 or cover 519 to seat on one or both of the tray cross-members 403 of the tray 400, 400' (see FIG. 45).

In some implementations, the tray 400' also can include a second circuit board 410 and flex cable as described above with respect to tray 400. In other implementations, the tray 400' may include another type of electrical circuit to receive a circuit board connector extending from the circuit board 520 of the cassette 500 to communicate the data stored on the plug connectors 532, 534 to a chassis processor or data management network.

Figure 46:
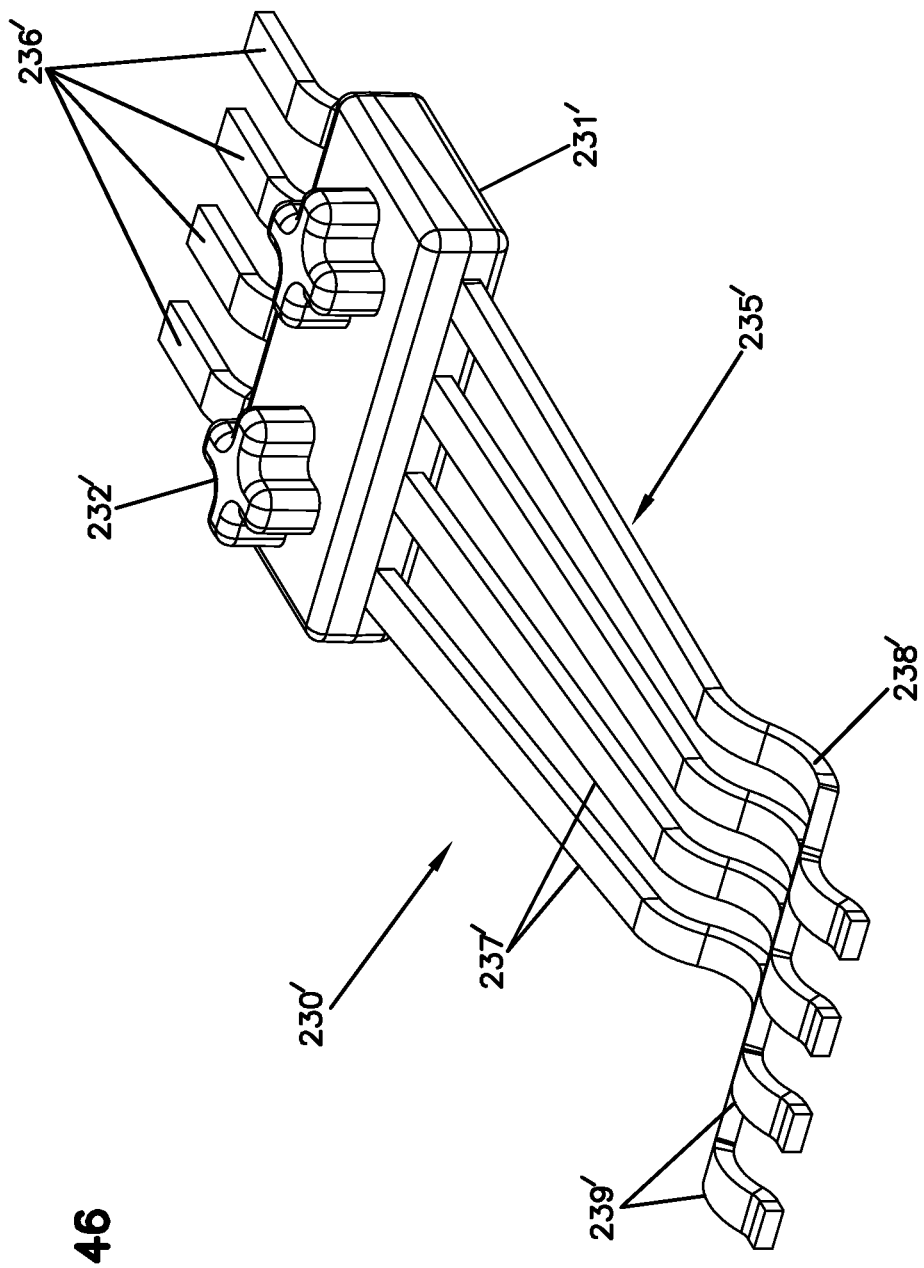
FIGS. 46-47 show an alternative contact assembly mounted to an alternative example adapter.
Figure 47:
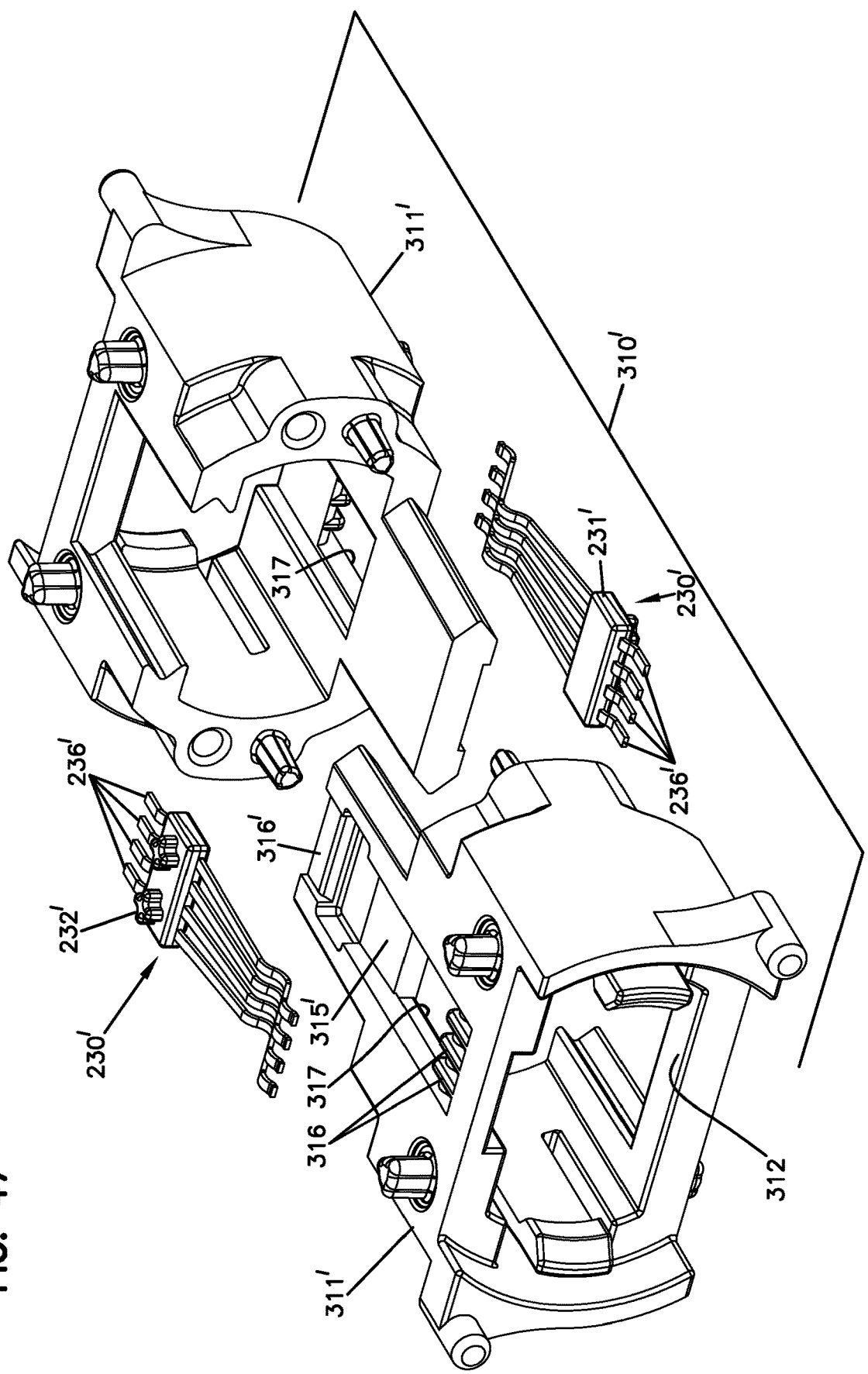

Referring now to FIGS. 46-47, an alternative contact assembly 230' suitable for use in any of the adapter assemblies disclosed herein is shown. The contact assembly 230' includes a body 231' holding one or more contact members 235'. The body 231' is generally rectangular in shape. The body 231' does not include an alignment peg for mounting to an adapter (e.g., adapter 210, adapter 310, adapter 310', etc.). Rather, the body 231' can define a flat surface facing the adapter. In certain implementations, the body 231' includes one or more mounting posts 232' that extend outwardly from the body 231' to mount to a circuit board (e.g., circuit boards 260, 360, 520). In some implementations, the posts 232' can be snap-fit to the circuit board. In other implementations, the posts 232' can be soldered to the circuit board. The contact assembly 230' is held within an adapter by holding the circuit board to which the contact assembly 230' attaches to the adapter (e.g., with any of the adapter block assembly housings or cassette housings described herein).

A longer section of the contact members 235' extends from one side of the body 231' and a shorter section of the contact members 235' extends from an opposite side of the body 231'. The shorter section of each contact member 235' defines a first contact surface 236'. In certain implementations, the first contact surface 236' is configured to be soldered or otherwise secured to a circuit board (FIG. 46). For example, the first contact surface 236' can be generally flat. The longer section of each contact member 235' defines a second contact surface 238' and a third contact surface 239'. In certain implementations, the longer sections of the contact members 235' are substantially identical to the longer sections of the contact members 235 of the contact assembly 230.

One example alternative adapter 310' configured to receive two contact assemblies 230' is shown in FIG. 47. The alternative adapter 310' includes a body 311' that defines substantially the same ports 312, apertures 317, and mounting pegs 319 as the body 311 of the adapter 310 shown in FIG. 23. However, the mounting recess 315' of the body 311' differs from the mounting recess 315 of the adapter body 311 in that the mounting recess 315' does not define a second aperture 318. Rather, the flat surface of the contact assembly body 231' is configured to seat on the flat surface defined by the mounting recess 315'. The adapter body 311' includes ribs 316 positioned between the third contact surfaces 239'. The adapter body 311' defines a flat region 316' on which the short sections of contact members 235' can seat. The flat region 316' does not include ribs extending between the first contact surfaces 236'.

In accordance with some aspects of the disclosure, some of the adapter block assemblies disclosed above have heights of no more than 13 mm including the adapters, the contact assemblies, the circuit board assemblies, and any cover assembly or housing assembly. For example, some of the adapter block assemblies have heights of no more than 12.75 mm. Certain of the adapter block assemblies have heights of no more than 12.5 mm. In an example, certain of the adapter block assemblies have heights of no more than 12.55 mm. In certain implementations, the adapter assemblies by themselves can have heights of no more than 9.5 mm. In an example, certain of the adapter block assemblies by themselves can have heights of no more than 9.35 mm. In certain implementations, the adapter assemblies by themselves can have heights of no more than 9 mm. In certain implementations, the adapter assemblies by themselves can have heights of no more than 8.5 mm. In certain implementations, the adapter assemblies by themselves can have heights of no more than 8 mm.

FIG. 48 illustrates an example tray arrangement 600 including another example tray 610 to which any of the adapter block assemblies or cassettes disclosed herein can be mounted. A circuit board arrangement 620 is configured to mount to the tray 610. The circuit board arrangement 620 is configured to communicate with components (e.g., a controller) of the circuit board arrangement of the adapter block assembly or cassette mounted to the tray 610. The tray 610 is configured to be slideably mounted to a side plane 640. A flexible cable 630 or other electrical circuit connects the circuit board arrangement 620 of the tray 610 to an electrical circuit or local processor located at or connected to the side plane 640. The tray 610 also can be configured to manage optical fibers routed to the ports of the adapter block assembly or cassette mounted to the tray 610.

In the example shown in FIG. 48, the tray 610 includes cross-members 613 extending between two side rails 611, 612. A mounting rail 614 extends between the cross-members 613. In some implementations, mounting members 616 extend upwardly from the mounting rail 614. The mounting members 616 are configured to engage an adapter block assembly or cassette to further secure the adapter block assembly or cassette to the tray 610. Mounting structures 615 also are provided at the inner sides of the side rails 611, 612. In certain implementations, the mounting structures 615 are laterally aligned with each other and with the mounting members 616.

The mounting rail 614 defines a pocket 617 at which the circuit board 620 can be mounted. Connection members 622 are mounted to the circuit board 620 in alignment with circuit board contact members of the adapter block assembly/cassette to be mounted to the tray 610. The circuit board 620 also includes a connection member 625 at a cross-member 613. In certain implementations, at least part of the cross-member 613 can also define part of the pocket 617. At least a portion 632 of the flexible cable 630 can be routed through the second side rail 612, through the pocket 617 along the cross-member 613, to the connection member 625 of the circuit board 620. A cover 618 can be mounted to the cross-member 613 to cover (e.g., protect) the flexible cable portion 632.

An opposite end 636 of the flexible cable is routed to or through the side plane 640. The side plane 640 defines one or more guide slots 642 along which the tray 610 can slide. For example, one of the side rails 611, 612 of the tray 610 can slide along one of the guide slots 642. The flexible cable 630 includes an intermediate length 634 that extends between the side rail 612 of the tray 610 and the side plane 640. The intermediate length 634 is folded back on itself to accommodate movement of the tray 610 relative to the side plane 640.

FIGS. 49-55 illustrate another example implementation of an adapter block assembly 700 that holds one or more adapter assemblies 750. The adapter block assembly 700 has a front 701, a rear 702, a top 703, a bottom 704, a first side 705, and a second side 706. The front and rear 701, 702 provide access to the ports 753 of the adapter assemblies 750. The sides 705, 706 of the adapter block assembly 700 are configured to mount the adapter block assembly 700 to a tray 800 (FIG. 56) or other mounting structure. For example, each side 705, 706 of the adapter block assembly 700 can include a retention member 709.

Figure 51:
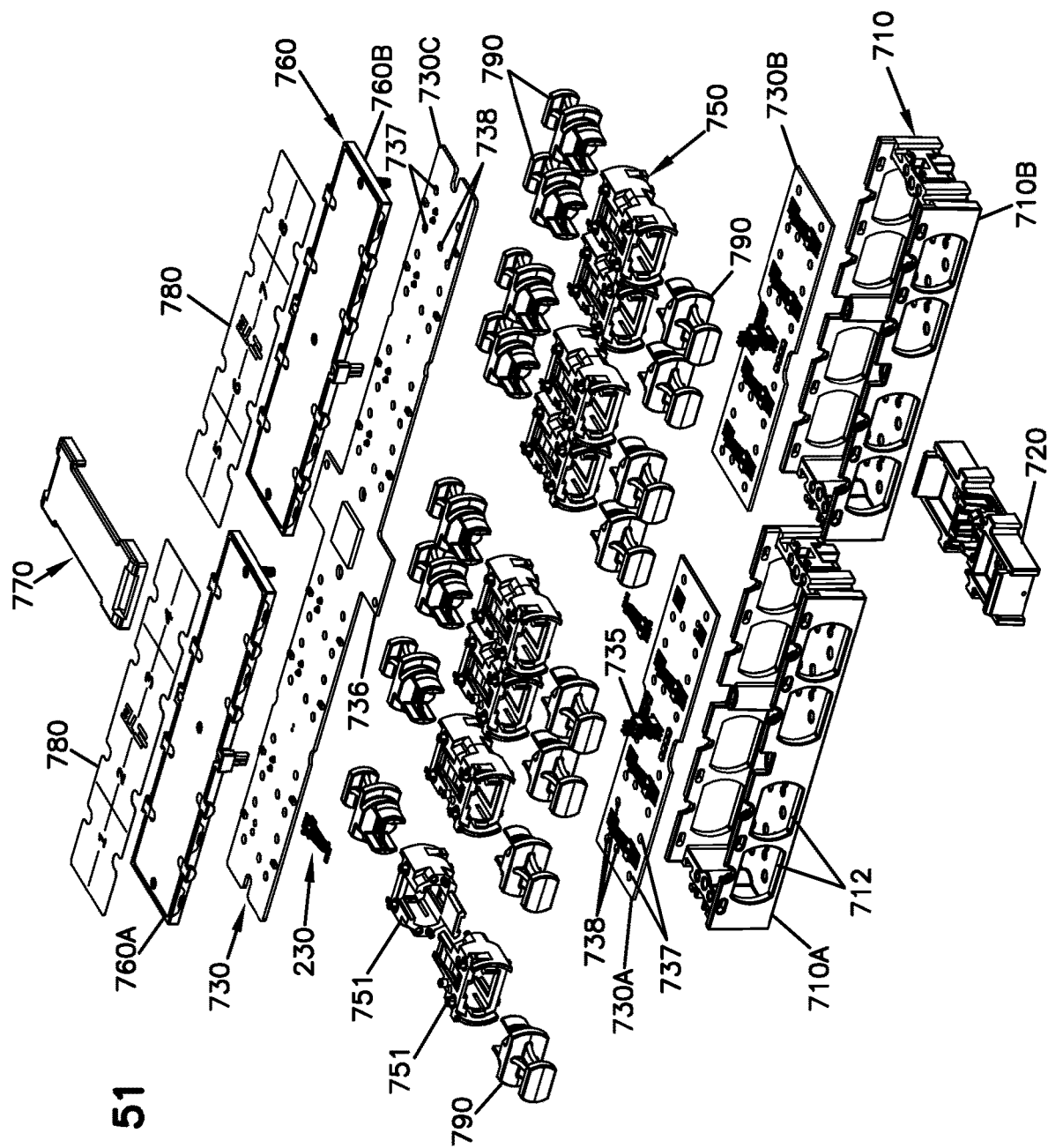
FIG. 51 is an exploded view of the adapter block assembly of FIG. 49.
Figure 52:
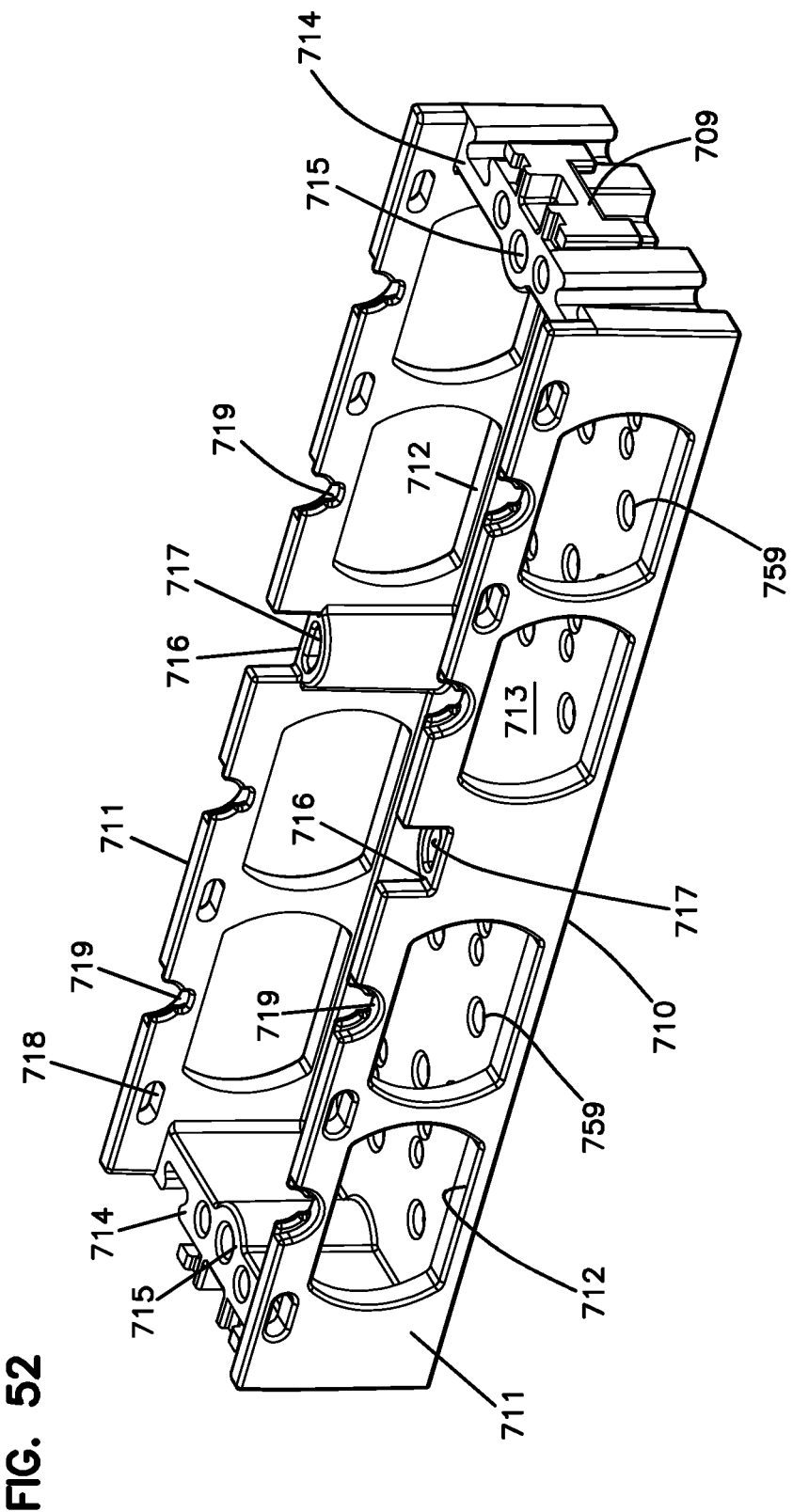
FIG. 52 is a perspective view of block arrangement suitable for use with the adapter block assembly of FIG. 49.

As shown in FIG. 51, the adapter block assembly 700 includes at least one adapter block arrangement 710, a circuit board 730, and a cover arrangement 760. The adapter block arrangement 710 includes a first adapter block 710A, a second adapter block 710B, and a joining member 720. The joining member 720 couples the first and second adapter blocks 710A, 710B together. In other implementations, the adapter block arrangement 710 can be formed as a single piece. Each adapter block 710A, 710B is configured to receive one or more of the adapter assemblies 750. One example adapter block 710 is shown in FIG. 52. The adapter block 710 includes two parallel walls 711 connected by a base 713 and sidewalls 714. Each of the walls 711 defines one or more ports 712. Each of the sidewalls 714 defines one of the retention members 709. The adapter block 710 is configured to receive a cover 760. The walls 711 include support surfaces 716 that define cavities 717. Each wall 711 also defines openings 718 that pass through the wall 711. Each wall 711 also defines notches 719 opening away from the base 713.

Figure 53:
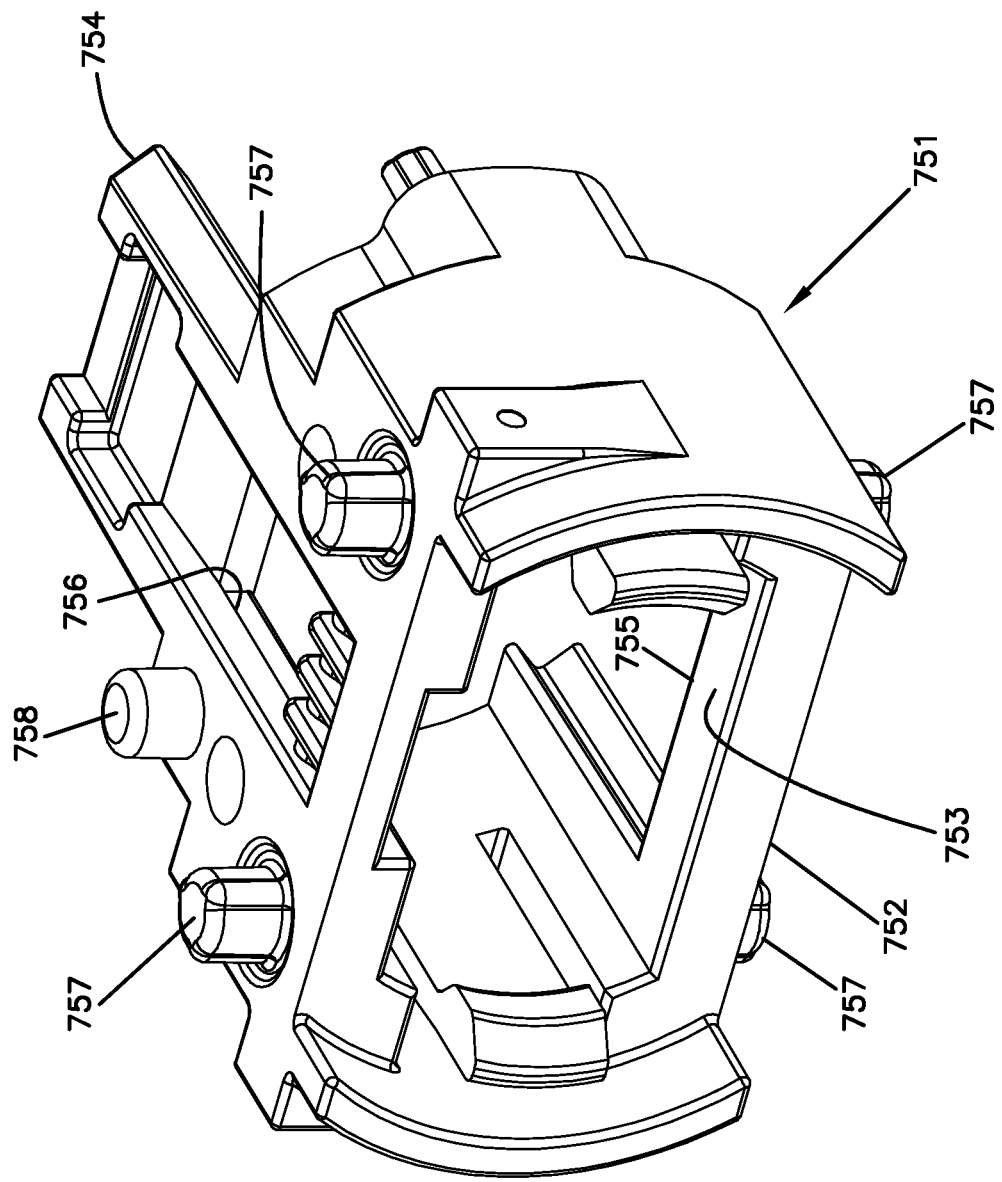
FIG. 53 is a perspective view of an example half adapter.

The adapter block 710 is configured to hold one or more adapter assemblies 750. As disclosed above, each adapter assembly 750 can include two adapter pieces 751 rotated 180° from each other (see FIG. 51). One example adapter piece 751 is shown in FIG. 53. The adapter piece 751 includes a port region 752 defining a port 753. The adapter piece 751 also includes a shroud 754 extending outwardly from a first end of the port region 752 away from the port 753. A second end of the port region 752 defines a slot 755 that is sized and configured to receive the shroud 754 of another adapter piece 751. The shroud 754 defines a through-opening or recess 756 at which a contact assembly 230 can be disposed.

Each adapter piece 751 includes two pegs 757 extending outwardly from the first end of the port region 752 and two pegs 757 extending outwardly from the second end of the port region 752. Each adapter piece 751 also includes a peg 758 that extends outwardly from the shroud 754 or the first end of the port region 752. The pegs 757, 758 align with openings 759 (FIG. 52) defined in the base 713 of the adapter block 710. In some implementations, the openings 759 aid in positioning the adapter pieces 751 into a proper orientation. For example, the openings 759 can facilitate mounting the adapter pieces 751 so that all connectors received at the front of the adapter block 710 are keyed by the adapter block 710 in the same rotational orientation.

The circuit board arrangement 730 includes a first circuit board 730A, a second circuit board 730B, and a third circuit board 730C (see FIG. 51). The first circuit board 730A attaches to the bottom 704 of the first adapter block 710A; the second circuit board 730B attaches to the bottom 704 of the second adapter block 710B; and the third circuit board 730C attaches to the top 703 of the joining member 720 and both adapter blocks 710A, 710B. Circuit board connectors 735 extend from the first and second circuit boards 730A, 730B to the third circuit board 730C to electrically connect the circuit board arrangement 730. Another circuit board connector 735 (FIG. 50) extends downwardly from the third circuit board 730C towards the joining member 720. The circuit board connector 735 of the third circuit board 730C is configured to electrically connect the circuit board arrangement 730 to a data processing network (e.g., via a tray 400, 400', 610, 800) as will be disclosed in more detail herein.

Figure 50:
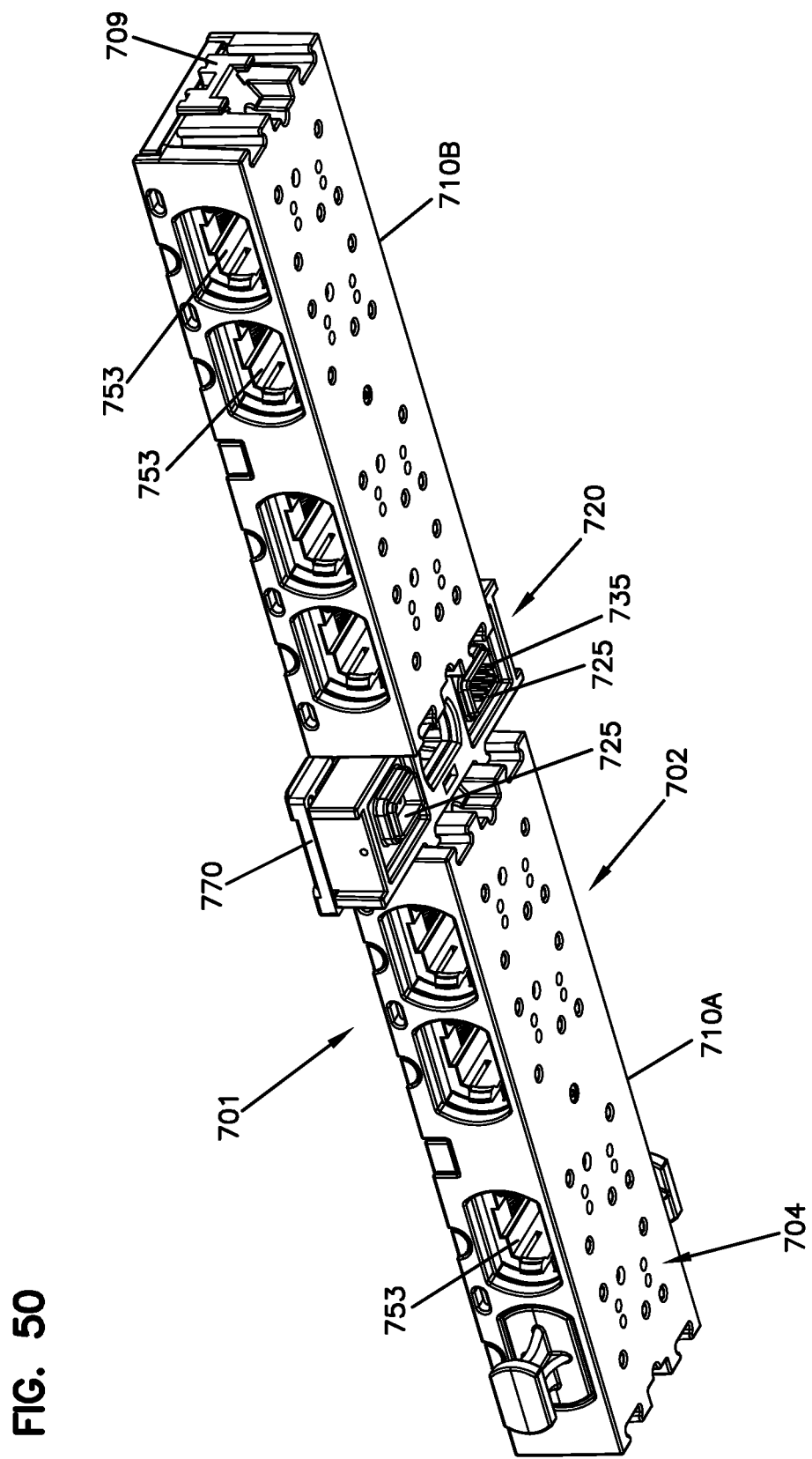
FIG. 50 is a bottom perspective view of the adapter block assembly of FIG. 49.

As shown in FIG. 50, the joining member 720 is sized to accommodate passage of pins of the circuit board connector 735 from the third circuit board 730C therethrough. In some implementations, the joining member 720 includes a shroud 725 through which the pins of the connector 735 extend. The shroud 725 inhibits damage (e.g., bending, breaking, etc.) to the pins when the adapter block assembly 700 is being mounted to a tray 400, 400', 610, 800 or other mounting surface. In certain implementations, the joining member 720 includes two shrouds 725 (e.g., a forward shroud and a rearward shroud). The circuit board connector 735 can extend through either shroud 725 depending on how the printed circuit board 730 is positioned on the adapter block assembly 700.

Furthermore, the adapter block 710 can be positioned on a tray (e.g., tray 610 of FIG. 48) in one of two positions. For example, the adapter block 710 can be positioned on the tray 610 so that a first connection member 622 on the circuit board 620 seats in the first shroud 725 and a second connection member 622 on the circuit board 620 seats in the second shroud 725. In other implementations, the adapter block 710 can be flipped 180° relative to the tray 610 so that a first connection member 622 on the circuit board 620 seats in the second shroud 725 and a second connection member 622 on the circuit board 620 seats in the first shroud 725. Of course, the other trays (e.g., tray 800) disclosed herein also can include circuit boards with multiple connection members on which any of the adapter blocks disclosed herein can seat.

As shown in FIG. 51, the cover arrangement 760 includes a first cover 760A, a second cover 760B, and an intermediate cover 770. The first and second covers 760A, 760B are disposed over the third circuit board 730C and coupled to the adapter blocks 710A, 710B as will be disclosed in more detail herein. The intermediate cover 770 extends over an intermediate portion 736 (FIG. 51) of the third circuit board 730C between the first and second covers 760A, 760B and couples to the joining member 720. For example, the intermediate cover 770 can define slots 775 (FIG. 51) into which latching hooks 722 of the joining member 720 can snap to secure the intermediate cover 770 to the joining member 720. In other implementations, the covers 760A, 760B, 770 can be formed as a single piece.

Figure 54:
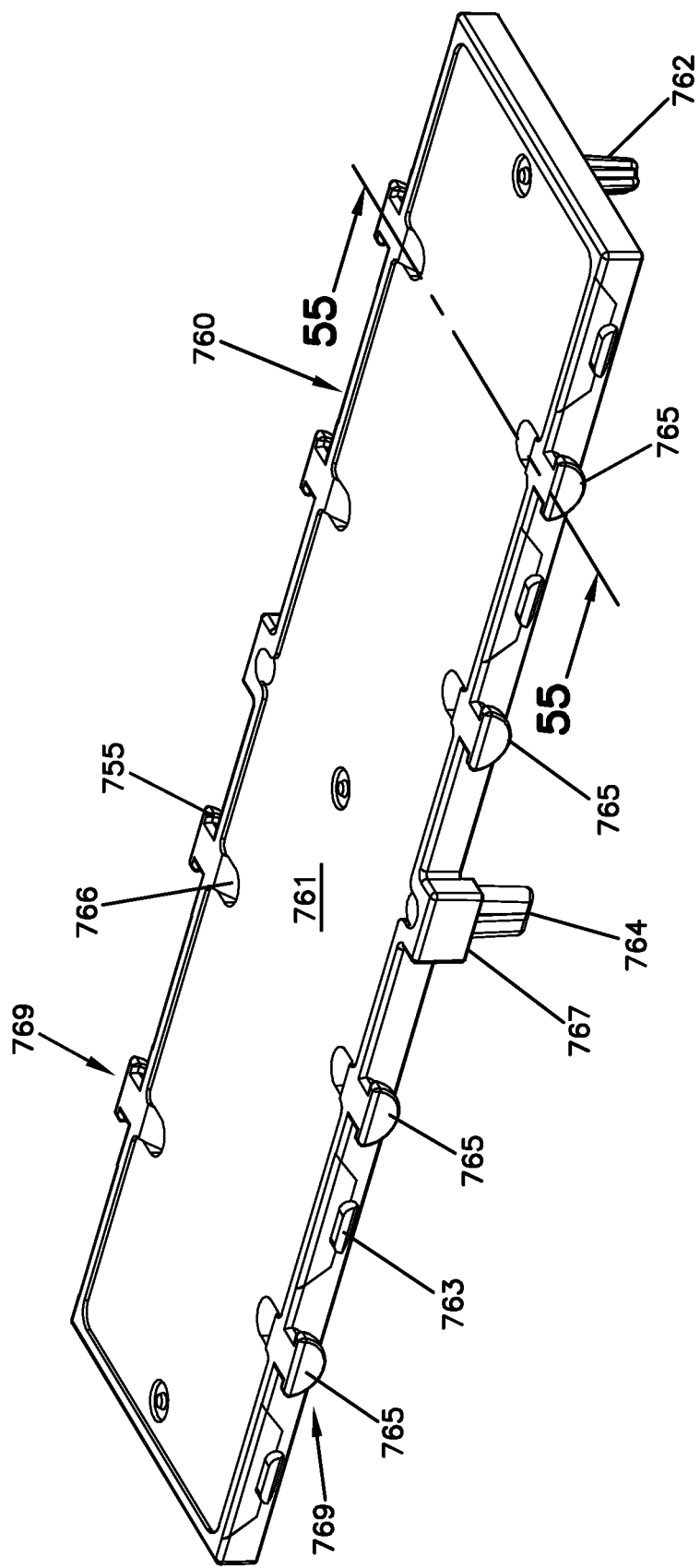
FIG. 54 is a perspective view of an example cover arrangement suitable for use with the adapter block assembly of FIG. 49.
Figure 55:
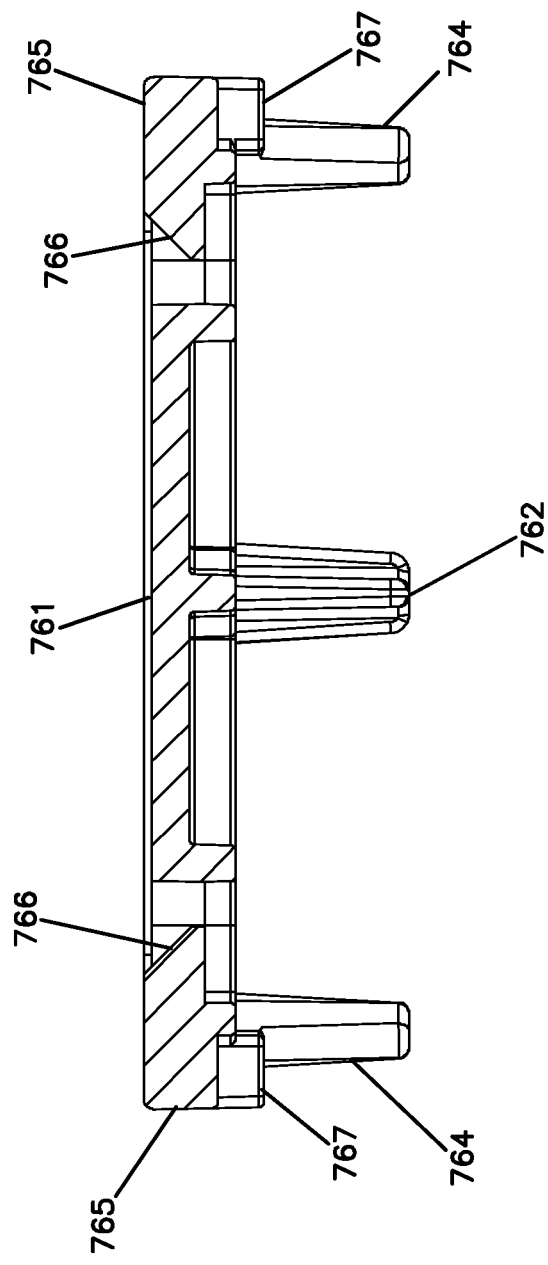
FIG. 55 is a transverse cross-section of the cover arrangement of FIG. 54.

One example cover 760 is shown in FIGS. 54 and 55. The cover 760 includes a body 761 and one or more lugs 763 extending outwardly from a perimeter of the body 761. In an example, the cover body 761 is planar and the lugs 763 extend outwardly from opposite ends of the body 761. The cover body 761 also includes side pegs 762 and end pegs 764 extending downwardly. In certain implementations, the end pegs 764 extend downwardly from support blocks 767. The cover body 761 is configured to seat on the on the support surfaces 716 and sidewalls 714 of the adapter block 710. The side pegs 762 extend through cavities 715 defined in the sidewalls 714. The end pegs 764 extend through cavities 717 defined in the support surfaces 716. The lugs 763 snap into the openings 718 defined in the walls 711.

In some implementations, the cover 760 includes one or more light indicators 769 that are disposed along the ends of the body 761. The light indicators 769 align with the ports 712 of the adapter block 710 when the cover 760 is mounted to the adapter block 710. For example, the light indicators 769 can seat in the open-ended notches 719 defined in the walls 711 of the adapter 710. The light indicators 769 are configured to glow or otherwise emit light to indicate a particular one of the ports 712.

In some implementations, the light indicators 769 include light pipes 765 that direct the light from a light source towards a user (see FIG. 54). For example, the light pipes 765 can be configured to direct light from one or more LEDs mounted to the third circuit board 730C towards a user. In certain implementations, the light pipes 765 include angled regions 766 to direct the light from an upwardly emitting LED outwardly towards distal ends 768 of the light pipes 765. In the example shown, the angled regions 766 each define a 45° angle that receives the upwardly emitted light from the LED and directs the light towards the distal ends 768 of the light pipes 765 (FIG. 55).

In certain implementations, the light pipes 765 extend outwardly from the cover body 761 to bulbous or otherwise enlarged ends 768. In an example, each light pipe end 768 forms a semi-circle. In another example, each light pipe end 768 can form a full circle. In still other implementations, the outward ends 768 of the light pipes 765 can have any desired shape.

FIG. 56 illustrates another example tray 800 to which any of the adapter block assemblies or cassettes disclosed herein can be mounted. A circuit board arrangement is configured to mount to the tray 800. The circuit board arrangement is configured to communicate with components (e.g., a controller) of the circuit board arrangement of the adapter block assembly or cassette mounted to the tray 800. The tray 800 is configured to be slideably mounted to a side plane. A flexible cable or other electrical circuit connects the circuit board arrangement of the tray 800 to an electrical circuit or local processor located at or connected to the side plane. The tray 800 also can be configured to manage optical fibers routed to the ports of the adapter block assembly or cassette mounted to the tray 800.

In the example shown in FIG. 56, the tray 800 includes cross-members 803 extending between two side rails 801, 802. A mounting rail 804 extends between the cross-members 803. In some implementations, mounting members 806 extend upwardly from the mounting rail 804. The mounting members 806 are configured to engage any of the adapter block assemblies or cassettes to further secure the adapter block assembly or cassette to the tray 800. Mounting structures 805 also are provided at the inner sides of the side rails 801, 802. In certain implementations, the mounting structures 805 are laterally aligned with each other and with the mounting members 806.

FIGS. 57-63 illustrate another example cassette 900 suitable for mounting to a tray 400, 400', 610, 800 or other mounting structure. The cassette 900 is configured to couple together first multi-fiber cables and second cables (multi-fiber cables or single-fiber cables). In some implementations, the cassette 900 couples a number of first cables to a greater number of second cables. In an example, the cassette 900 is configured to couple each first cable to the second cables. In another example, the cassette 900 couples each pair of first cables to three second cables. In other implementations, each first cable is coupled to any desired number of second cables.

The cassette 900 has a first port end 901, a second port end 902, a first side 905, and a second side 906. The first cables are configured to plug into ports 753 at the first port end 901 and the second cables are configured to plug into ports 753 at the second port end 902. At least one port 753 is defined at the first port end 901 and at least one port 753 is disposed at the second port end 902. In the example shown, two ports 753 are defined at the first port end 901 and six ports 753 are disposed at the second port end 902.

Figure 62:
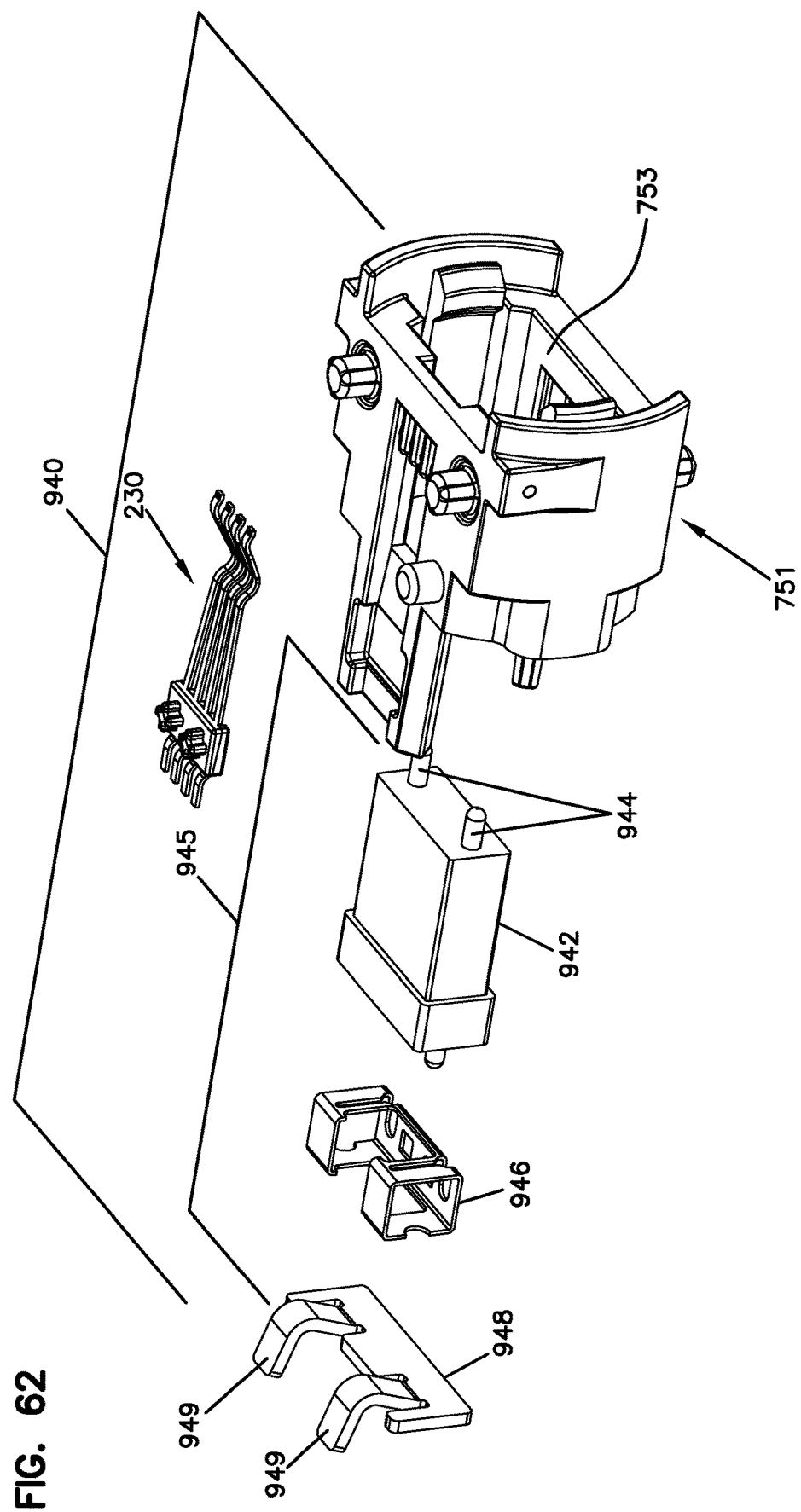
FIG. 62 is an exploded view of an example half adapter.
Figure 63:
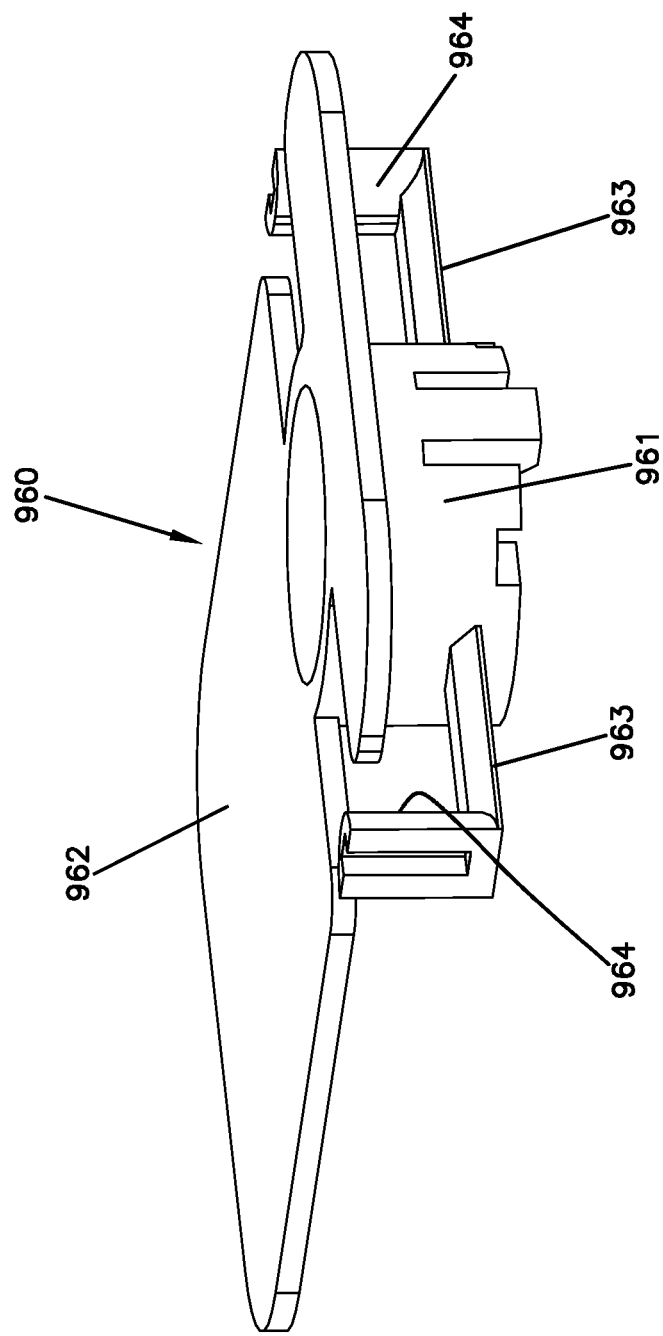
FIG. 63 illustrates an example spool arrangement.

In some implementations, the ports 753 at the first and second port ends 901, 902 are defined by half-adapter assemblies 940. As shown in FIG. 62, each half-adapter assembly 940 includes an adapter piece 751 (FIG. 53), a contact assembly 230, and a ferrule arrangement 945. The adapter piece 751 defines the port 753 accessible from an exterior of the cassette 900. The ferrule arrangement 945 includes a ferrule 942, alignment pins 944, a carriage 946, and a spring 948. The ferrule 942 holds internal optical fibers 970; and the spring 948 biases the ferrule 942 towards the port 753 of the adapter piece 751. Accordingly, the ferrule arrangement 945 and adapter piece 751 cooperate to optically couple the internal optical fibers 970 to optical fibers of any cable plugged into the respective port 753.

The internal optical fibers 970 optically couple each ferrule arrangement 945 at the first port end 901 of the cassette 900 to one or more ferrule arrangements 945 at the second port end 902. In certain implementations, one set of internal optical fibers 970 can optically couple at least one ferrule arrangement 945 at the first port end 901 to three ferrule arrangements 945 at the second port end 902. For example, a set of twenty-four internal fibers 970 can be routed from a ferrule 942 at the first port end 901 into three groups of eight fibers with each group being routed to a respective ferrule 942 at the second port end 902. In an example, one set of internal optical fibers 970 can optically couple a pair of ferrule arrangements 945 at the first port end 901 to three ferrule arrangements 945 at the second port end 902.

In some implementations, the internal optical fibers 970 are loose optical fibers. In other implementations, the internal optical fibers 970 include a flex cable 971 (see FIG. 58). A flex cable 971 includes a cable formed by lacing optical fibers 970 on a sticky foil or other flexible substrate. For example, a machine can automatically arrange the internal optical fibers 970 on the foil into a particular configuration (e.g., having a particular polarity) to form the flex cable 971. The flex cable 971 is disposed within the cassette 900 so that a first end 974 is routed to a ferrule arrangement 945 at the first port end 901 and a second end 977 is routed to a ferrule arrangement 945 at the second port end 902. In certain implementations, loose fibers stubs 973, 976 can extend outwardly from transition points 972, 975, respectively, of the flex cable 971. In such implementations, the distal ends 974, 977 of the fiber stubs 973, 976, respectively, are taped or otherwise organized for insertion into the ferrules 942.

Figure 59:
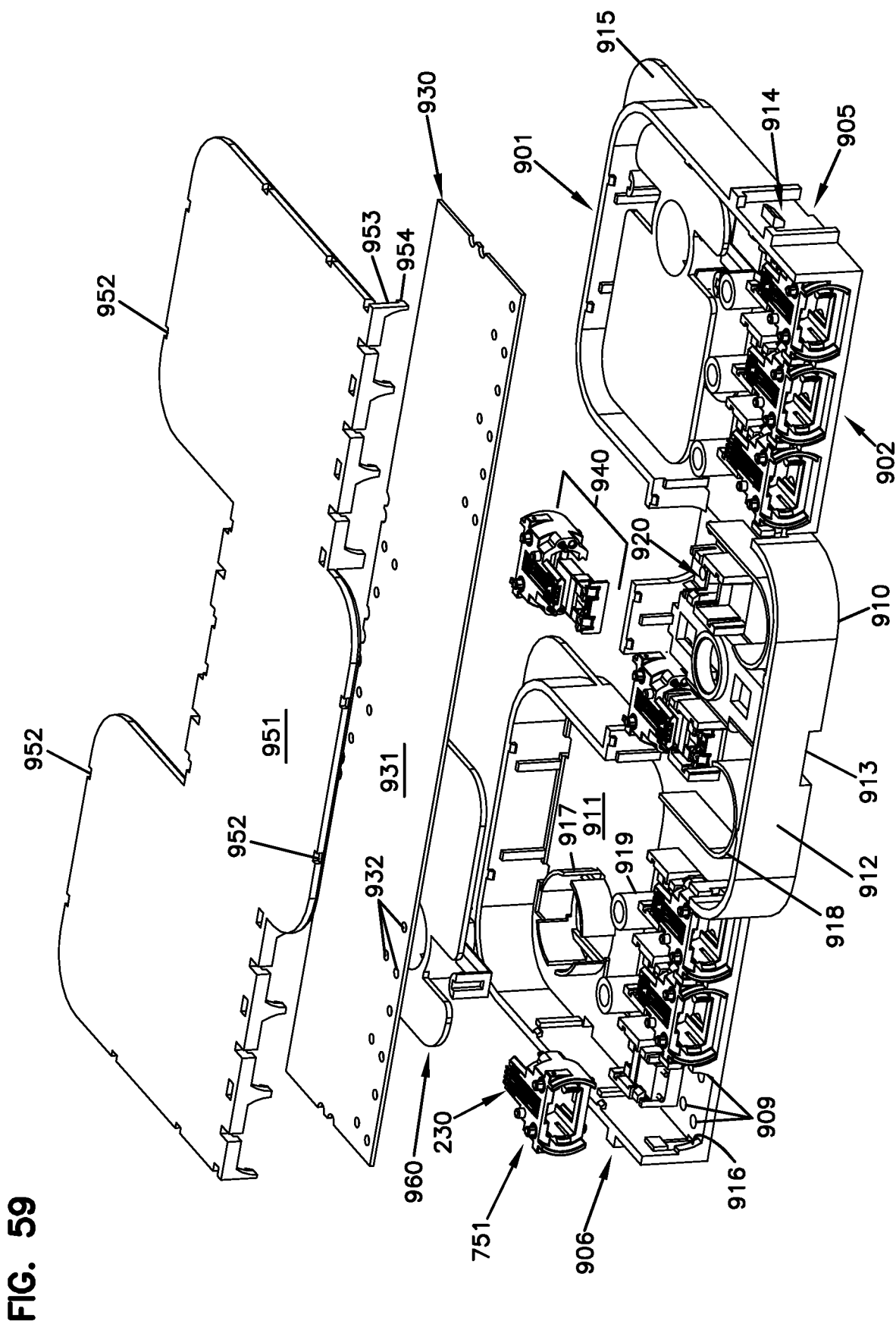
FIG. 59 is an exploded view of the cassette of FIG. 57.

As shown in FIG. 59, a circuit board 930 is disposed within the cassette 900 in electrical connection with contact assemblies 230 on the half-adapter assemblies 940. For example, the circuit board 930 extends over the half-adapter assemblies 940 so that contact assemblies 230 disposed on the half-adapter assemblies 940 are electrically connected to the circuit board 930 (e.g., by touching contact pads on the board 930). In certain implementations, each half-adapter assembly 940 includes only one contact assembly 230. Because the internal optical fibers 970 optically couple the ferrule arrangements 945 at the first and second port ends 901, 902, the adapter pieces 751 at the first and second ports 901, 902 can be oriented in the same direction. Accordingly, a single circuit board 930 can contact all of the contact assemblies 230. The circuit board 930 includes a circuit board connector that extends through an opening 908 (FIG. 61) in the cassette 900 to plug into a circuit on the tray 400, 400', 610, 800 to provide communication to a distribution network.

Figure 58:
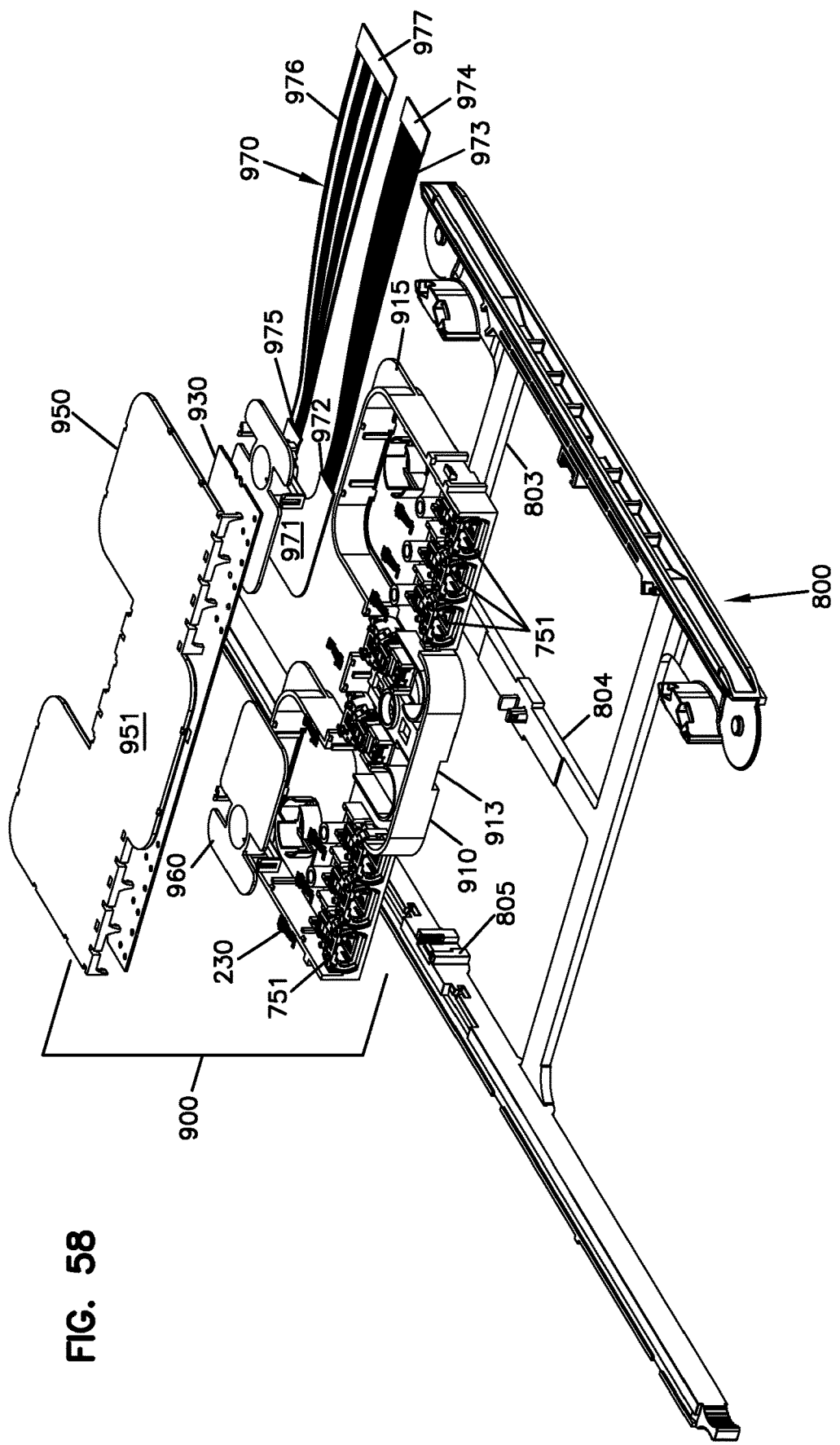
FIG. 58 is an exploded view of FIG. 57.

As shown in FIGS. 58 and 59, the cassette 900 includes a cassette body 910 and a cover 950 that cooperate to hold the half-adapter assemblies 940. The cassette body 910 includes a peripheral wall 912 extending upwardly from a base 911. The base 911 defines a recessed section 913 that facilitates mounting the cassette 900 to the mounting bar of a tray (e.g., bar 804 of tray 800). The body 910 also includes a retention arrangement 914 at each side 905, 906 to secure the cassette 900 to the mounting structures of the tray (e.g., mounting structure 805 of tray 800). The body 910 also includes flanges 915 that extend outwardly from the first port end 901 to seat on one of the cross-members of the tray (e.g., cross-member 803 of tray 800).

Port openings 916 are defined in the peripheral wall 912 of the cassette body 910 to provide access to the ports 753 of the half-adapter assemblies 940. The base 911 of the cassette body 910 defines peg openings 909 (FIG. 59) sized and arranged to receive the pegs 757, 758 of the adapter piece 751 of the half-adapter assembly 940. The cassette body 910 includes an adapter cradle 920 at each port opening 916. A half-adapter assembly 940 can be mounted at each adapter cradle 920 (see FIG. 59).

Figure 61:
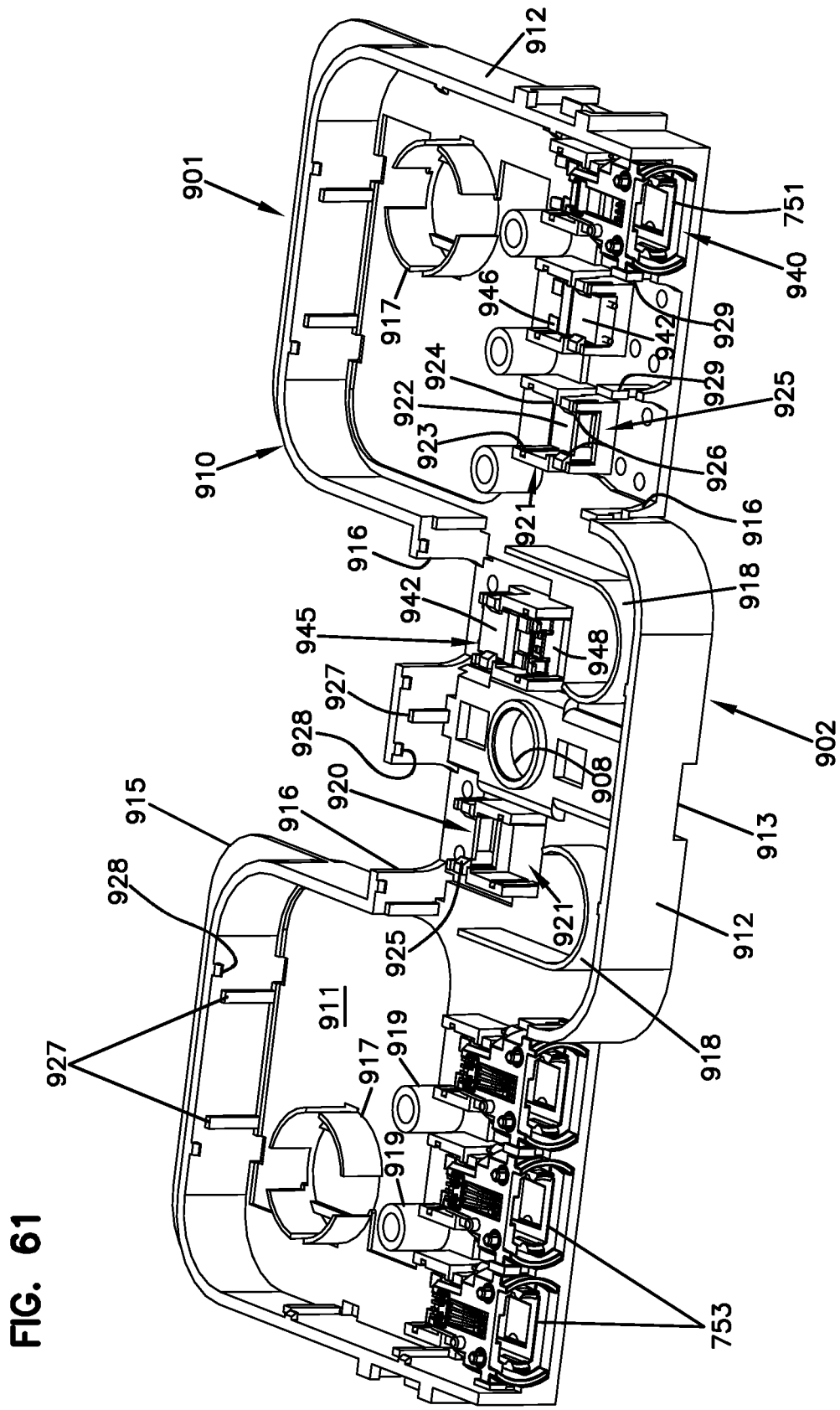
FIG. 61 shows the cassette of FIG. 57 with the cover and some interior components removed.

As shown in FIG. 61, each adapter cradle 920 includes a first section 921 facing an interior of the cassette 900 and a second section 925 facing the port opening 916. The first section 921 defines a cavity 922, vertical channels 923 at one end, and an inwardly-extending ridge 924 at an opposite end of the first section 921. The spring 948 of the half-adapter assemblies 940 is held at the vertical channels 923 of the first section 921 of the cradle 920. Each adapter cradle 920 also includes a second section 925 including two upwardly-extending latching fingers 926. The ferrule 942 of a ferrule arrangement 945 can be held at the latching fingers 926 of the second section 925 of the cradle 920. A ridge on the ferrule 942 abuts the inwardly-extending ridge 924 at the first section 921 to limit movement of the ferrule 942 towards the port opening 916.

In FIG. 61, an example half-adapter assembly 940 is disposed at the right-most port opening 916 at the second port end 902. Empty cradles 920 are located at the third port opening 916 from the right at the second port end 902 and at the left-most port opening 916 at the first port end 901. A ferrule arrangement 945 is disposed at the right-most port opening 916 at the first port end 901. Various components of half-adapter assemblies 940 are disposed at the remaining port openings 916.

As shown in FIG. 59, the half-adapter assemblies 940 are sandwiched between the cassette body 910 and the circuit board 930. The circuit board 930 includes a body 931 defining peg holes 932 that are sized and configured to receive the pegs 757, 758 of the adapter piece 751 of the half-adapter assemblies 940. The peg holes 932 aid in aligning the circuit board 930 relative to the half-adapter assemblies 940, which aligns the contact assemblies 230 with contacts pads on the body 931 of the board 930. In the example shown, both the base 911 and the circuit board 930 define openings 909, 932 that receive both pegs 757 and alignment peg 758. Accordingly, the adapter piece 751 can be mounted to the cassette body 910 in either orientation (e.g., shroud-up or shroud-down).

Figure 60:
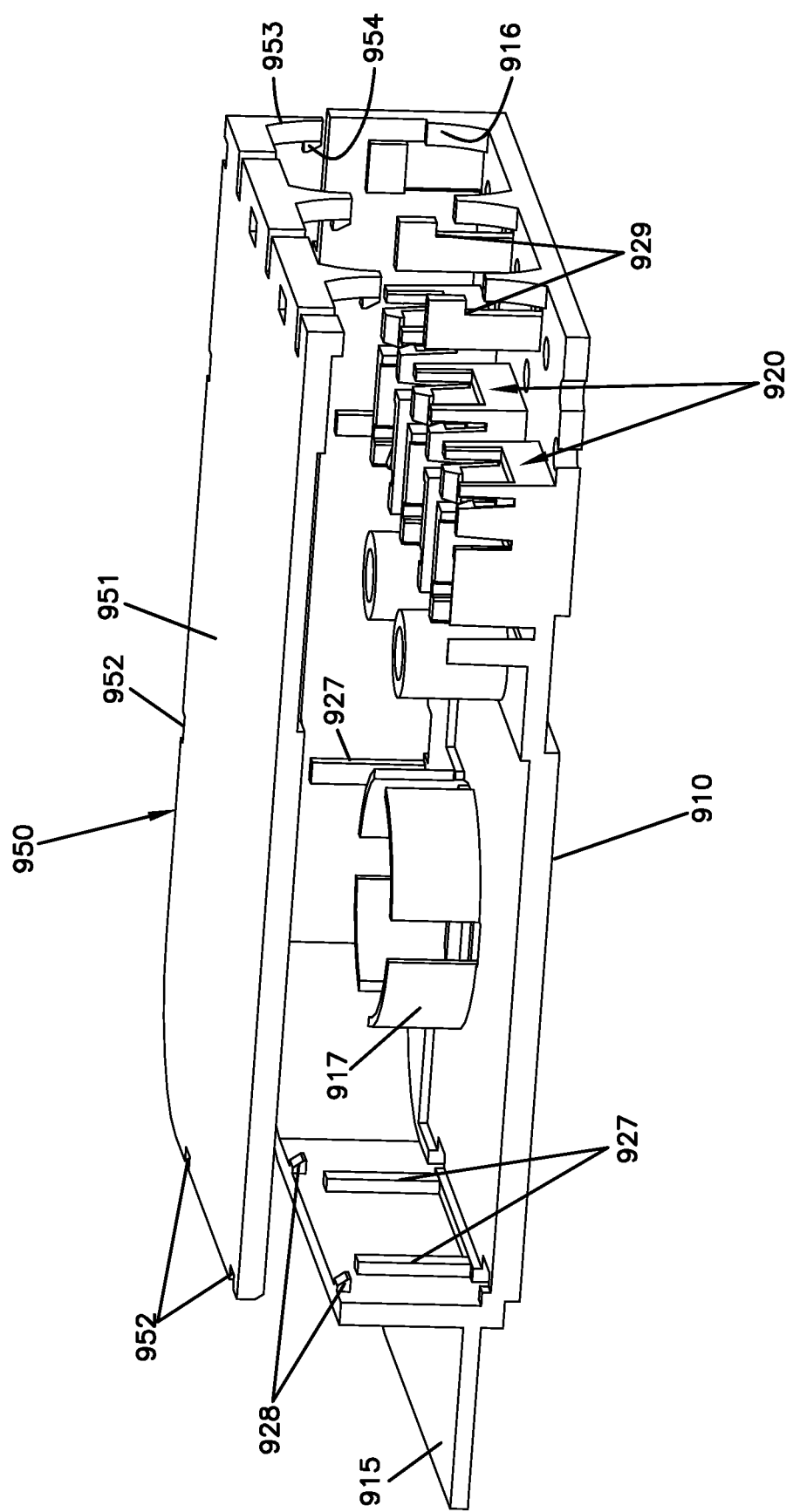
FIG. 60 is a cross-sectional view of the cassette of FIG. 57.

As shown in FIG. 60, the cassette body 910 and cover 950 are configured to fit together to form the cassette 900. The cover 950 retains the circuit board 930 and half-adapter assemblies 940 within the cassette body 910. The cassette body 910 includes pillars 927 disposed about an interior of the peripheral wall 912. Latch hooks 928 extend inwardly from a top of the peripheral wall 912. The cover 950 includes a body 951 that is sized to extend over an open top of the cassette body 910. The cover body 951 is sized to seat on the pillars 927 within the peripheral wall 912 of the cassette body 910. The latch hooks 928 of the cassette body 910 snap into notches 952 provided along a peripheral edge of the body 951 to hold the cover 950 to the cassette body 910.

In some implementations, retention flanges 929 extend upwardly from the base 911 between the port openings 916. Latching arms 953 extend downwardly from the cover body 951. Latching hooks 954 extend inwardly from distal ends of the latching arms 953. The latching hooks 954 are configured to catch on the retention flanges 929 of the cassette body 910. In certain implementations, the latching arms 953 and retention flanges 929 cooperate to reduce movement of the cover 950 away from the cassette body 910 even when the contact assemblies 230 push upwardly against the circuit board 930 (e.g., when a plug connector is received at the port), which pushes upwardly against the cover 950.

As shown in FIGS. 59-61, the cassette body 910 also includes fiber routing structures that facilitate routing the internal optical fibers 970 within the cassette 900. For example, the fiber routing structures provide bend radius limiting for the internal optical fibers 970 routed between the ferrule arrangements 950 at the first and second port ends 901, 902. In the example shown, the cassette body 910 includes routing flanges 918 configured to lead the internal fibers 970 from the ferrule arrangements 945 at the first port end 901 towards one side of the cassette 900. The internal optical fibers 970 are routed to a fiber spool 917 for redirection towards the port openings 916 at one side of the second port end 902. Slack fiber length also can be stored at the spool 917. Radius limiters 919 aid in directing the internal fibers 970 to the ferrule arrangements 945 at the second port end 902.

As shown in FIG. 58, a fiber spool arrangement 960 can be disposed within the cassette 900. For example, a fiber spool arrangement 960 can be mounted at each fiber spool 917. In certain implementations, each fiber spool arrangement 960 includes a spool 961 that fits with the fiber spool 917. A flange 962 extends from a top of the spool 961 to aid in separating the internal fibers 970 from the circuit board 930. Two arms 963 extend outwardly from opposite sides of the spool 961. A bend radius limiter 964 can be provided at a distal end of each arm 963. The spool 961 and bend radius limiters 964 can define a storage space in which the internal optical fibers 970 can be routed.

In some implementations, the fiber spool arrangement 960 is utilized with loose internal fibers 970. In other implementations, the fiber spool arrangement 960 is utilized with a flex circuit cable 971. In some such implementations, the arms 963 of the fiber spool arrangement 960 are located sufficiently towards the bottom of the spool 961 to press against the transition points 972, 975 of the flex cable 971. Accordingly, the arms 963 can inhibit curling of the flex cable 971 at the transition points 972, 975.

FIGS. 64-70 illustrate another example cassette 1000 suitable for mounting to a tray 400, 400', 610, 800 or other mounting structure. The cassette 1000 is configured to couple together first multi-fiber cables and second cables (multi-fiber cables or single-fiber cables). In some implementations, the cassette 1000 couples a number of first cables to a greater number of second cables. In an example, the cassette 1000 is configured to couple each first cable to the second cables. In another example, the cassette 1000 couples each pair of first cables to three second cables. In other implementations, each first cable is coupled to any desired number of second cables.

The cassette 1000 includes a body 1007 having a first port end 1001, a second port end 1002, a top 1003 (FIG. 64), a bottom 1004 (FIG. 65), a first side 1005, and a second side 1006. At least one port 1026 is defined at the first port end 1001 and at least one port 1027 is disposed at the second port end 1002. One or more first cables are configured to plug into the one or more ports 1026 at the first port end 1001 and one or more second cables are configured to plug into the one or more ports 1027 at the second port end 1002. In the example shown, two ports 1026 are defined at the first port end 1001 and six ports 1027 are disposed at the second port end 1002.

The cassette body 1007 includes a retention arrangement 1008 at each side 1005, 1006 to secure the cassette 1000 to the mounting structures of the tray (e.g., mounting structure 805 of tray 800). The body 1007 has mounting structure 1009 at the bottom 1004 of the cassette 1000 to facilitate mounting the cassette 1000 to the tray (see FIG. 65). In some implementations, the mounting structure 1009 includes a channel 1013 defined through a portion of the cassette body 1007. The cassette body 1007 is mounted to the tray so that a portion of the tray extends through one or more channels 1013.

Figure 65:
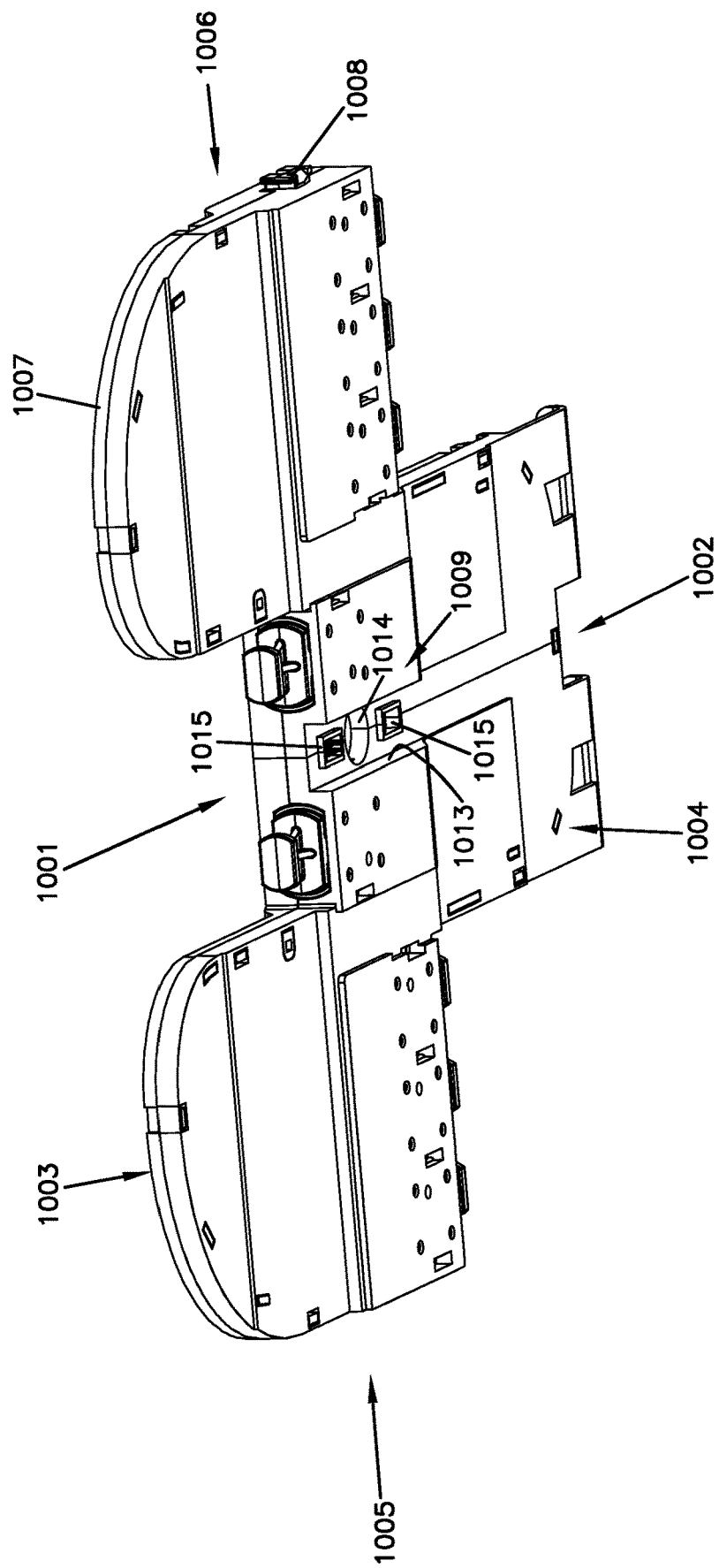
FIG. 65 is a bottom perspective view of the cassette of FIG. 64.

As shown in FIG. 65, a mounting opening 1014 and at least one connector opening 1015 lead from the bottom 1004 of the cassette body 1007 into the interior of the cassette 1000. Latches or other connection structures on the tray extend upwardly through the mounting opening 1014 to secure the cassette 1000 to the tray. Interior electrical (e.g., electronic) circuitry within the cassette 1000 connects to electrical circuitry on the tray through the connector openings 1015. In the example shown, two connector openings 1015 extends into the cassette interior from the channel 1013. In certain examples, a shroud may extend downwardly from each connector opening 1015 to protect a connector extending through the opening 1015. In certain examples, the mounting opening 1014 and the at least one connector opening 1015 are disposed within the channel 1013.

Figure 64:
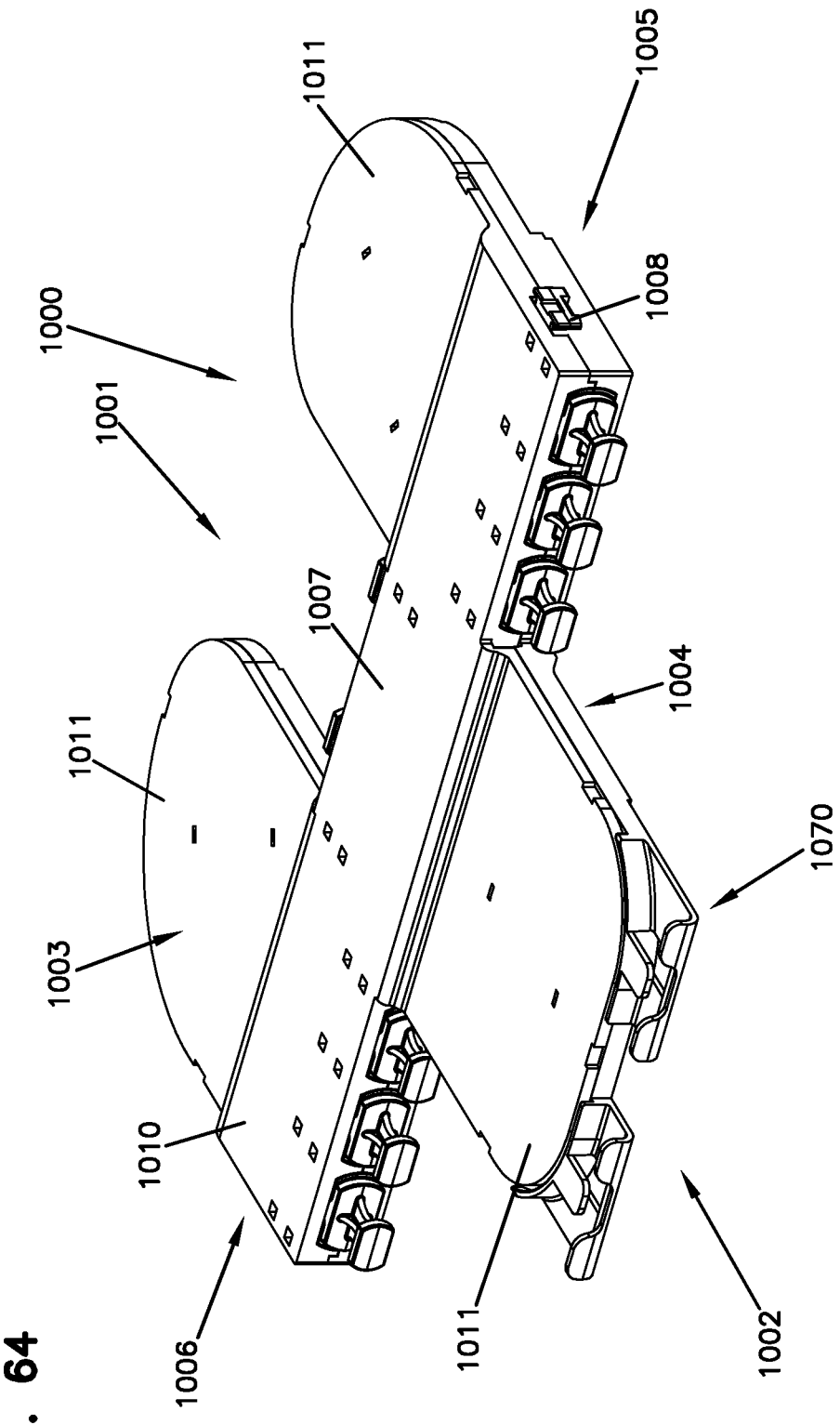
FIG. 64 is a top perspective view of another example cassette.

In some implementations, the cassette body 1007 includes a connection section 1010 and at least one fiber management section 1011 (see FIG. 64). In certain examples, the cassette body 1007 includes multiple fiber management sections 1011. In certain examples, the fiber management sections 1011 extend from both sides of the connection section 1010. For example, in certain implementations, one fiber management section 1011 extends in a first direction and another fiber management section 1011 extends in a second direction. In the example shown, first and second fiber management sections 1011 extend from outer locations of the first port end 1001 and a third fiber management section 1011 extends from an intermediate location of the second port end 1002.

In certain examples, the fiber management sections 1011 are thinner than the connection section 1010. In an example, the top 1003 of each fiber management section 1011 is substantially parallel with the top 1003 of the connection section 1010. In an example, the bottom 1004 of each fiber management section 1011 is substantially parallel with the bottom 1004 of the connection section 1010.

Figure 66:
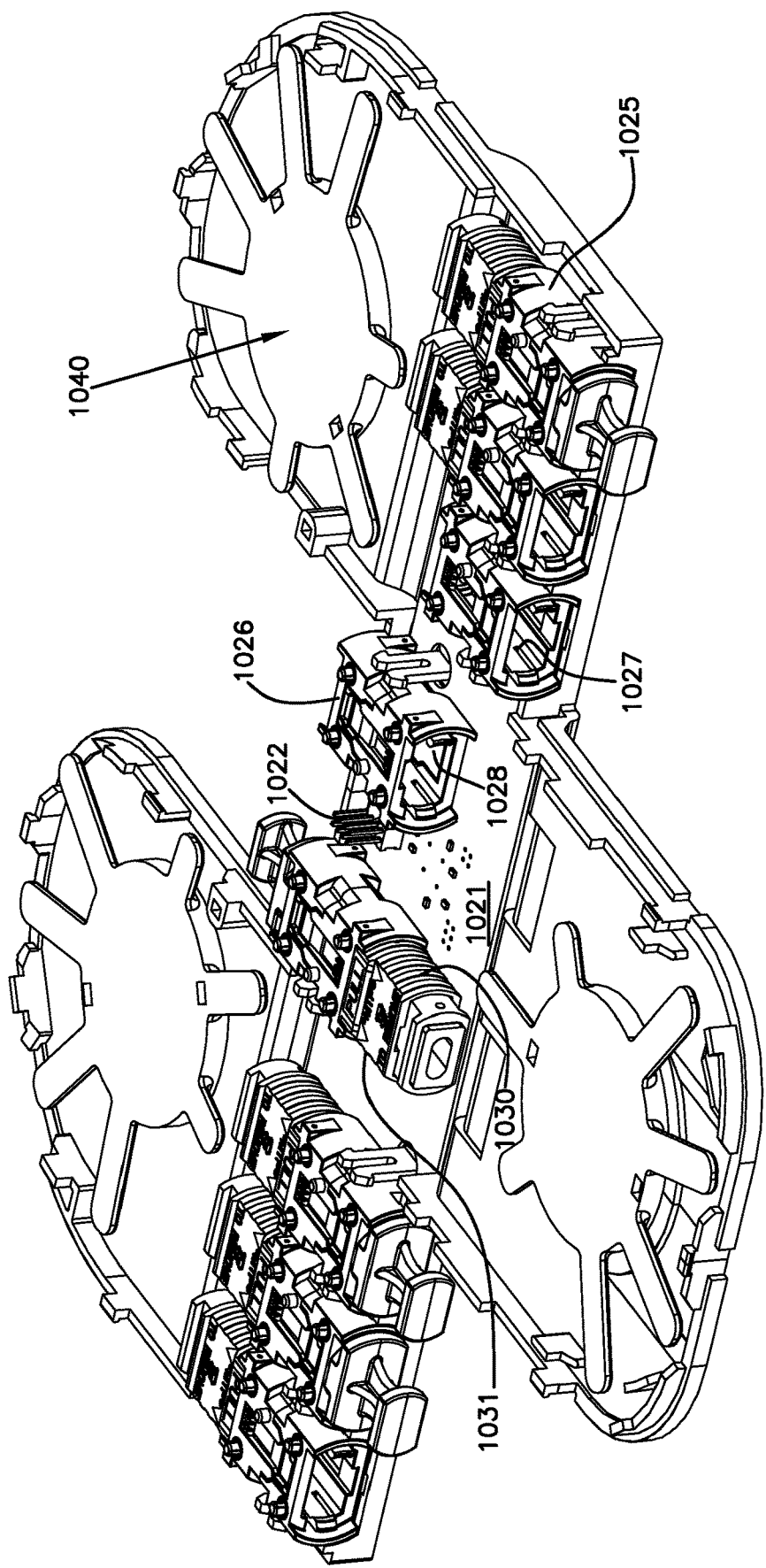
FIG. 66 shows an interior side of a top member of the cassette of FIG. 64.

FIG. 66 illustrates example optical components disposed within the cassette 1000. For example, a circuit board 1021 and one or more optical adapters 1025 are disposed within the cassette body 1007. For example, the circuit board 1021 and the optical adapters 1025 may be disposed within the connection section 1010 of the cassette body 1007. In certain implementations, one or more branching devices (e.g., for signal monitoring) can be disposed within the cassette body 1007. In certain implementations, one or more optical taps (e.g., for signal monitoring) can be disposed within the cassette body 1007.

The optical adapters 1025 define the cassette ports 1026, 1027 at the first and second ports ends 1001, 1002, respectively, of the cassette 1000. In some implementations, the optical adapters 1025 are positioned and oriented within the cassette body 1007 so that each optical adapter 1025 has an exterior port (i.e., a port accessible from an exterior of the cassette body 1007) and an interior port 1028 (i.e., a port accessible from an interior of the cassette body 1007). In an example, the optical adapters 1025 do not extend beyond the cassette body 1007.

Figure 67:
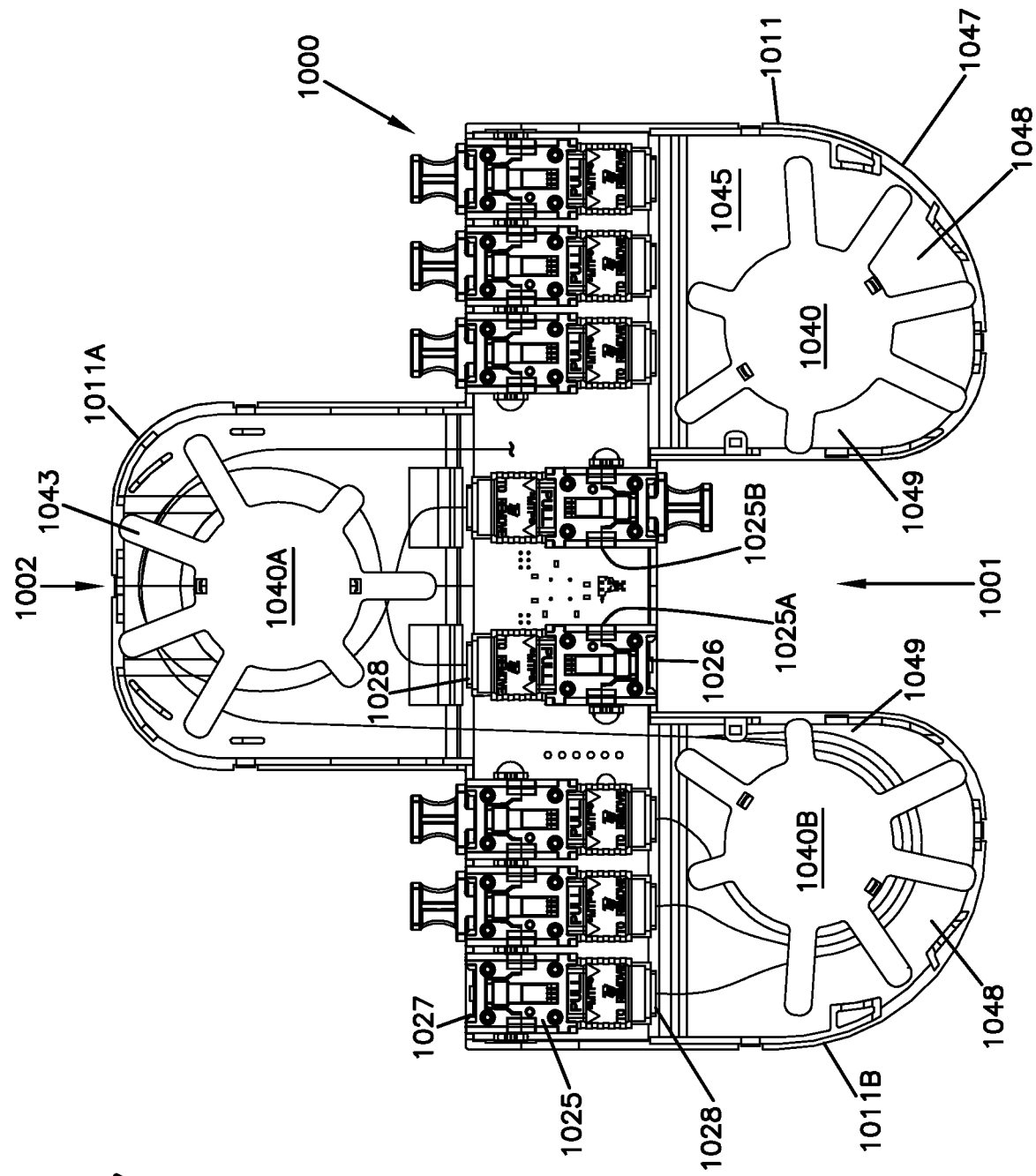
FIG. 67 is a plan view of FIG. 66 showing example cabling.

As shown in FIG. 67, optical fibers (e.g., loose fibers, flex-foil fibers, etc.) are routed between the interior ports 1028 of the optical adapters 1025 to create optical connections between optical connectors plugged into the exterior ports of the adapters 1025. For example, a first optical adapter 1025 may define a port 1026 at the first port end 1001 of the cassette body 1007 and at least two optical adapters 1025 may define ports 1027 at the second port end 1002 of the cassette body 1007. Optical fibers may be routed from an interior port 1028 of the first optical adapter 1025 at the first connection end 1001 to the interior ports 1028 of the two optical adapters 1025 at the second connection end 1002.

In an example, optical fibers may be routed from the interior port 1028 of the first optical adapter 1025 to interior ports 1028 of three optical adapters 1025 defining ports 1027 at the second port end 1002 (e.g., see FIG. 67). In another example, optical fibers may be routed from the interior ports of two optical adapters 1025 defining ports 1026 at the first port end 1001 to interior ports of three optical adapters 1025 defining ports 1027 at the second port end 1002.

Figure 2:
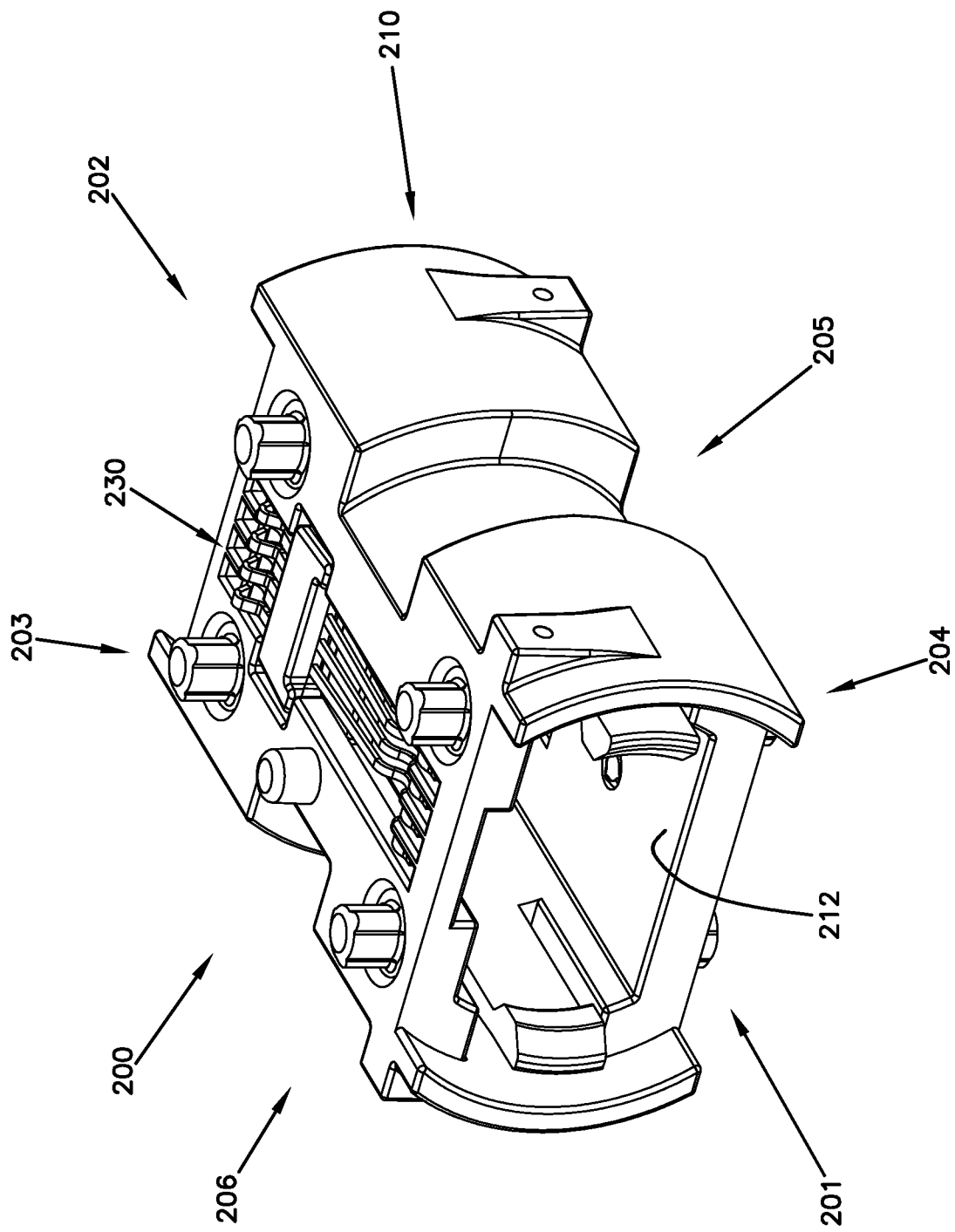
FIG. 2 is a perspective view of an example optical adapter and a contact assembly configured in accordance with aspects of the present disclosure.
Figure 22:
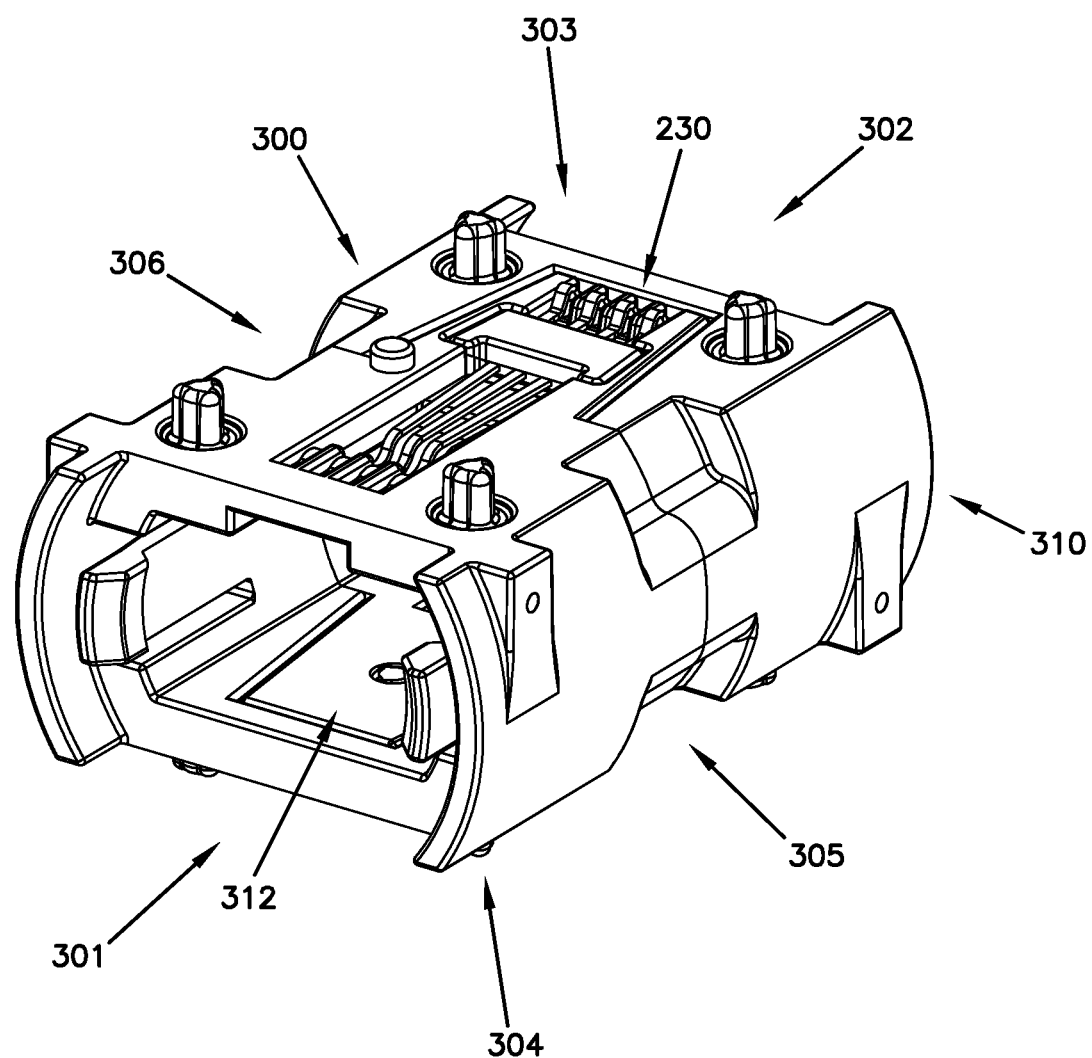
FIG. 22 is a perspective view of another example optical adapter and contact assembly configured in accordance with aspects of the present disclosure.

In some implementations, the optical adapters 1025 include full optical adapters (e.g., optical adapter 210 of FIG. 2; optical adapter 310 of FIG. 22; and optical adapter 310' of FIG. 47). In certain implementations, multi-fiber connectors 1030 are plugged into the interior ports 1028 of the optical adapters 1025. In examples, the multi-fiber connectors 1030 differ from conventional multi-fiber connectors in that they do not include a strain-relief boot (e.g., see FIG. 66). In an example, the multi-fiber connectors 1030 also do not include the ribbed portions of the spring retainers. In examples, the multi-fiber connectors 1030 do not include crimps. In other implementations, the optical adapters 1025 include partial optical adapters (e.g., partial adapter 512, 514 of FIG. 41; and partial adapter 751 of FIG. 53).

In some implementations, each of the optical adapters 1025 is configured to hold a contact assembly (e.g., contact assembly 230 of FIG. 11; or contact assembly 230' of FIG. 46) to provide a media reading interface for a connector plugged into the exterior port. In some implementations, PLI or other information is obtained from optical connectors received at the exterior ports 1026, 1027 of the optical adapters 1025. In some such implementations, the contact assemblies are disposed at only one end of the optical adapters 1025 and a single circuit board 1021 extends across the contact assemblies.

In some implementations, one or more management spools 1040 are disposed within the cassette body 1007. For example, the management spools 1040 may be disposed in the fiber management sections 1011 of the cassette body 1007. In the example shown, one fiber management spool 1040 is disposed in each of the fiber management sections 1011. The management spools 1040 aid in routing optical fibers between the interior ports 1028 of the optical adapters 1025. In an example, the management spools 1040 aid in routing loose fibers between management sections 1011. In another example, at least portions of the optical fibers can be disposed on a flexible substrate (e.g., a tape, a spool, etc.). The substrate portions extend between the management sections 1011 and the management spools 1040 within the management sections 1011 manage the portions of the optical fibers extending from the substrate. In an example, the substrate laterally aligns the optical fibers to lessen the amount of vertical space needed to accommodate the optical fibers.

Figure 68:
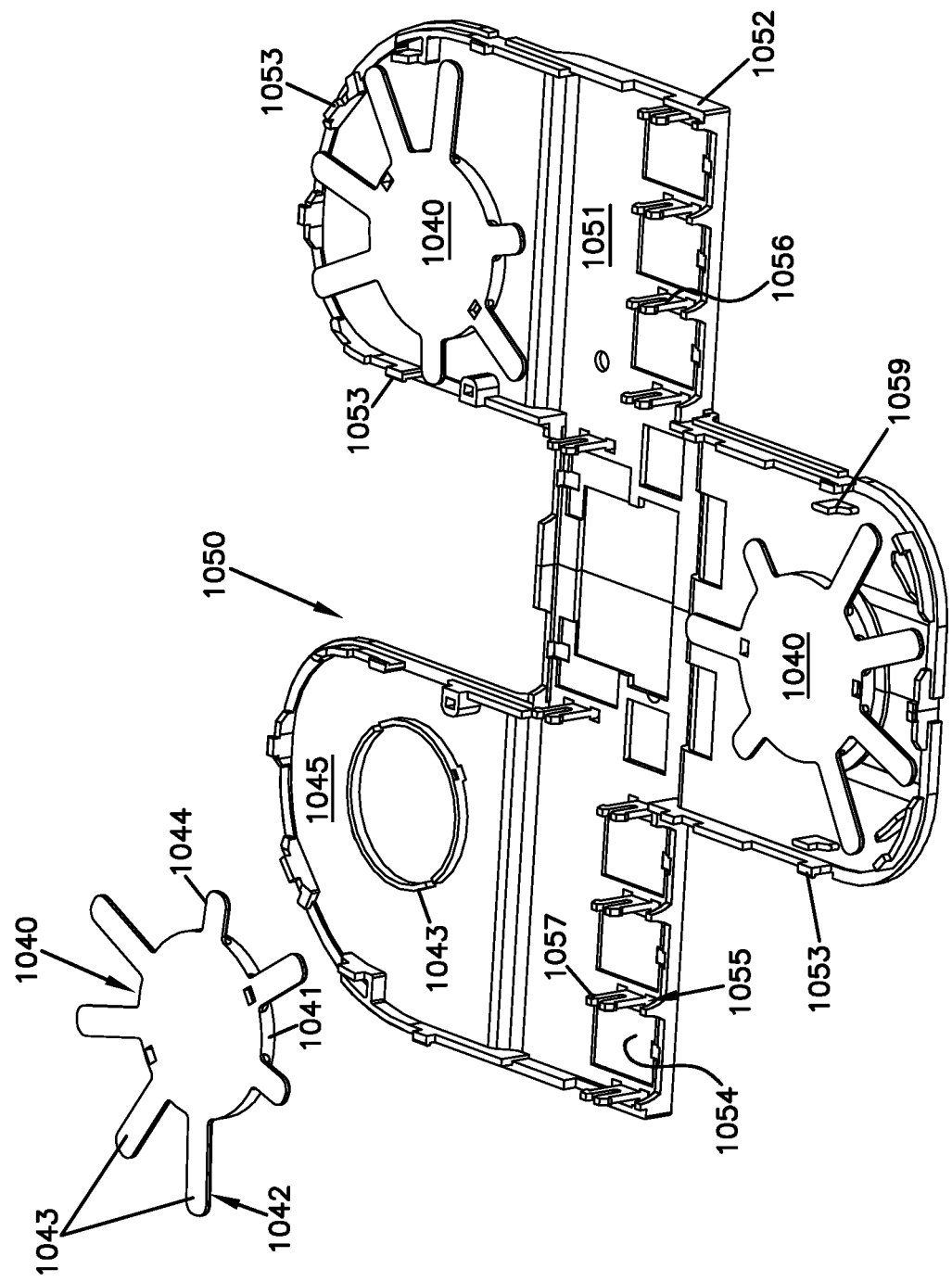
FIG. 68 is a perspective view of the top member of FIG. 66 with a management spool exploded from the top member.

Each management spool 1040 includes a bend radius limiter 1041 and one or more retention flanges 1042 extending outwardly from the bend radius limiter 1041 (FIG. 68). In some implementations, the retention flanges 1042 extend a common distance from the bend radius limiter 1041. In other implementations, the retention flanges 1042 extend at varying distances. In certain examples, the retention flanges 1042 include long flanges 1043 and short flanges 1044 that are shorter than the long flanges 1043. In other implementations, the retention flanges 1042 may have more than two lengths.

Figure 69:
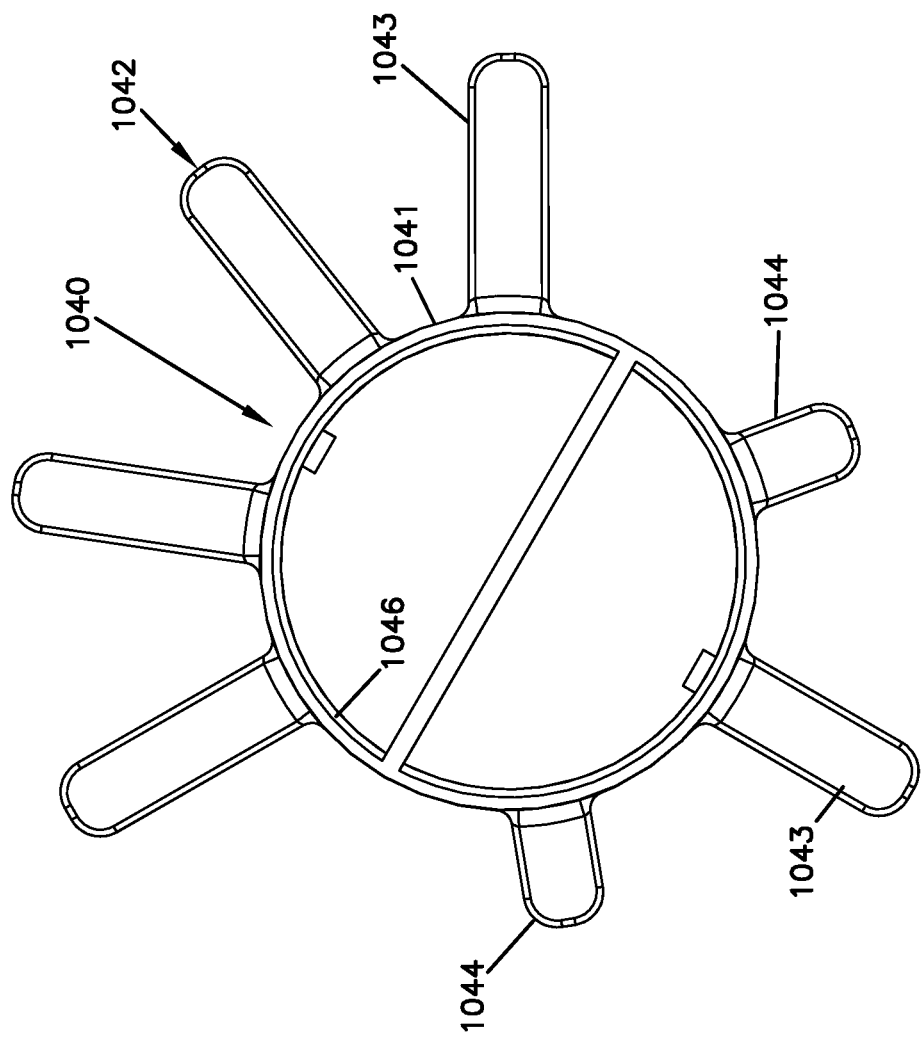
FIG. 69 is a plan view of the management spool of FIG. 68.

As shown in FIG. 67, each fiber management section 1011 of the cassette body 1007 defines a management region 1045 in which the management spool 1040 is disposed to form a routing path through the management region 1045. In some implementations, the management spools 1040 are separately manufactured components coupled to mounts 1058 within the cassette body 1007 (e.g., see FIG. 68). As shown in FIG. 69, each spool 1040 may include a hollow or partially hollow interior 1046 in which the mount 1058 can be received. In an example, the spools 1040 are snap-fit to the mounts 1058. In an example, the spools 1040 are friction-fit to the mounts 1058. In other examples, the spools 1040 can be otherwise coupled to the mounts 1058 (e.g., glued, welded, latched, etc.).

The spools 1040 are sized to fit within the fiber management sections 1011. For example, in some implementations, the routing path has a height that is less than about 0.075 inches. The height of the routing path is measured between the management region 1045 and one of the retention flanges 1042. In certain implementations, the routing path has a height that is less than about 0.07 inches. In an example, the routing path has a height that is about 0.069 inches.

In certain implementations, at least a portion of the periphery 1047 of the management section 1011 is rounded or contoured that aids in routing the optical fibers around the spool 1040 and providing bend radius protection to the fibers routed therethrough. In some implementations, the width of the routing path varies through the management section 1011. For example, the longer retention flanges 1043 cooperate with the periphery 1047 of the retention section 1045 to define wider portions 1048 of the routing path and the shorter retention flanges 1044 cooperate with the periphery 1047 of the retention section 1045 to define shorter portions 1049 of the routing path (see FIG. 67).

In certain examples, the spools 1040 are oriented so that some of the wider portions 1048 of the routing path are disposed at locations where optical fibers cross over each other. For example, the long retention flanges 1043 of the spool 1045A in FIG. 67 extend over the regions where the optical fibers from the optical adapter 1025A cross over optical fibers from the optical adapter 1025B. The short retention flanges 1044 of the spool 1045A extend over regions where optical fibers from only one of the optical adapters 1025A, 1025B are routed around the spool 1040A.

In certain examples, the spools 1040 are oriented so that the narrower portions 1049 of the routing path are disposed at locations where the optical fibers extend generally linearly and the wider portions 1048 are disposed at locations where the fibers are routed around a curve. For example, one of the short retention flanges 1044 extends over a region 1049 at which the optical fibers from the optical adapter 1025A extend linearly from a first retention section 1011A to a second retention section 1011B. Some of the long retention flanges 1043 extend over a region 1048 at which the optical fibers from the optical adapter 1025A curve around the spool 1045B.

In some implementations, the cassette body 1007 includes a top member 1050 and a bottom member 1060. The top and bottom members 1050, 1060 cooperate to enclose the optical components within the cassette body 1007. In certain implementations, the top and bottom members 1050, 1060 cooperate to define port openings through which the port openings 1026, 1027 are accessible. In some implementations, each of the top and bottom members 1050, 1060 defines a portion of the connection section 1010 and a portion of each management section 1011.

Each of the top and bottom members 1050, 1060 includes a base 1051, 1061 from which a sidewall 1052, 1062, respectively, extends. The top and bottom members 1050, 1060 include attachment structures that hold the top and bottom members 1050, 1060 together. For example, in some implementations, one of the top and bottom members 1050, 1060 includes tabs (e.g., latch tabs) 1053 and the other of the top and bottom members 1050, 1060 defines openings 1063 to receive the latch tabs 1053. In an example, the top member 1050 includes the tabs 1053 and the bottom member 1060 defines the openings 1063. In other implementations, the top and bottom members 1050, 1060 can be otherwise attached (e.g., welded, glued, fastened, friction-fit, etc.).

In certain examples, one or more latch arrangements 1055, 1065 are disposed within the cassette body 1007 to secure the top and bottom members 1050, 1060 together. In the example shown, the latch arrangements 1055 of the top member 1050 include latch fingers 1056 having outwardly directed hooks 1057; and the latch arrangements 1065 of the bottom member 1060 include latch fingers 1066 having inwardly directed hooks 1067. When the top and bottom members 1050, 1060 are assembled, the inwardly directed hooks 1067 snap over the outwardly directed hooks 1057 to hold the top and bottom members 1050, 1060 together.

In certain implementations, the latch arrangements 1055, 1065 are disposed in the connection section 1010 of the module body 1007. Accordingly, the top and bottom members 1050, 1060 are held together at locations close to the circuit board 1021 and contact assemblies. In certain examples, the latch arrangements 1055, 1065 extend between the optical adapters 1025 (e.g., see FIG. 66). These latching connections aid in maintaining contact between the contact assemblies and the circuit board 1021 during insertion and/or removal of optical connectors from the ports 1026, 1027.

The connection section 1010 of the top member 1050 is configured to receive the circuit board 1021. For example, the top section 1050 includes multiple depressions 1054 sized and located to accommodate components and/or circuitry on the circuit board 1021. In certain examples, some of the depressions 1054 can be provided between the latch arrangements 1055. The depressions 1054 can be shaped and sized to match specific components on the circuit board 1021. In certain implementations, the circuit board 1021 can include or be electrically coupled to one or more active circuits (e.g., detectors, monitoring circuitry).

In certain implementations, one or more light indicators (e.g., LEDs) can be disposed on the circuit board 1021. In some implementations, at least part of the cassette body 1007 is formed of a transparent material through which light emitted from the light indicator can be viewed. In certain examples, the light emitted from the light indicators at least partly shines out through the ports 1026, 1027. In the example shown, the connection section 1010 defines a recess 1080 aligned with each port 1026, 1027 to accommodate the light indicators. In other implementations, the cassette body 1007 includes an opaque material and a light transmissible material that forms paths between the light indicators and an exterior of the cassette 1000.

In some implementations, the management spools 1040 within the cassette 1000 extend downwardly from the top of the cassette 1000. For example, in certain implementations, the management sections 1011 of the top member 1050 include the mounts 1058 for the management spools 1040. The management spools 1040 couple to the mounts 1058 so that the retention flanges 1042 are spaced from the management region 1045 of the top member 1050. Accordingly, when the cassette 1000 is assembled, the optical fibers are routed between the retention flanges 1042 and the top member 1050 of the cassette 1000.

In certain examples, one or more guides 1059 can be provided along the fiber routing path to aid in directing the optical fibers. In an example, the guides 1059 aid in retaining the optical fibers within the bounds of the retention flanges 1042. In some implementations, the cassette 1000 is configured so that each optical fiber wraps no more than once around a particular management spool 1040. In an example, each optical fiber is routed about two spools 1040. In certain examples, the optical fibers are initially routed through the fiber routing paths so that the fibers are radially offset from the bend radius limiters 1041 of the spools 1040. Accordingly, the fibers have slack length that allows one or more of the fibers to be reconnectorized or otherwise operated on.

Figure 70:
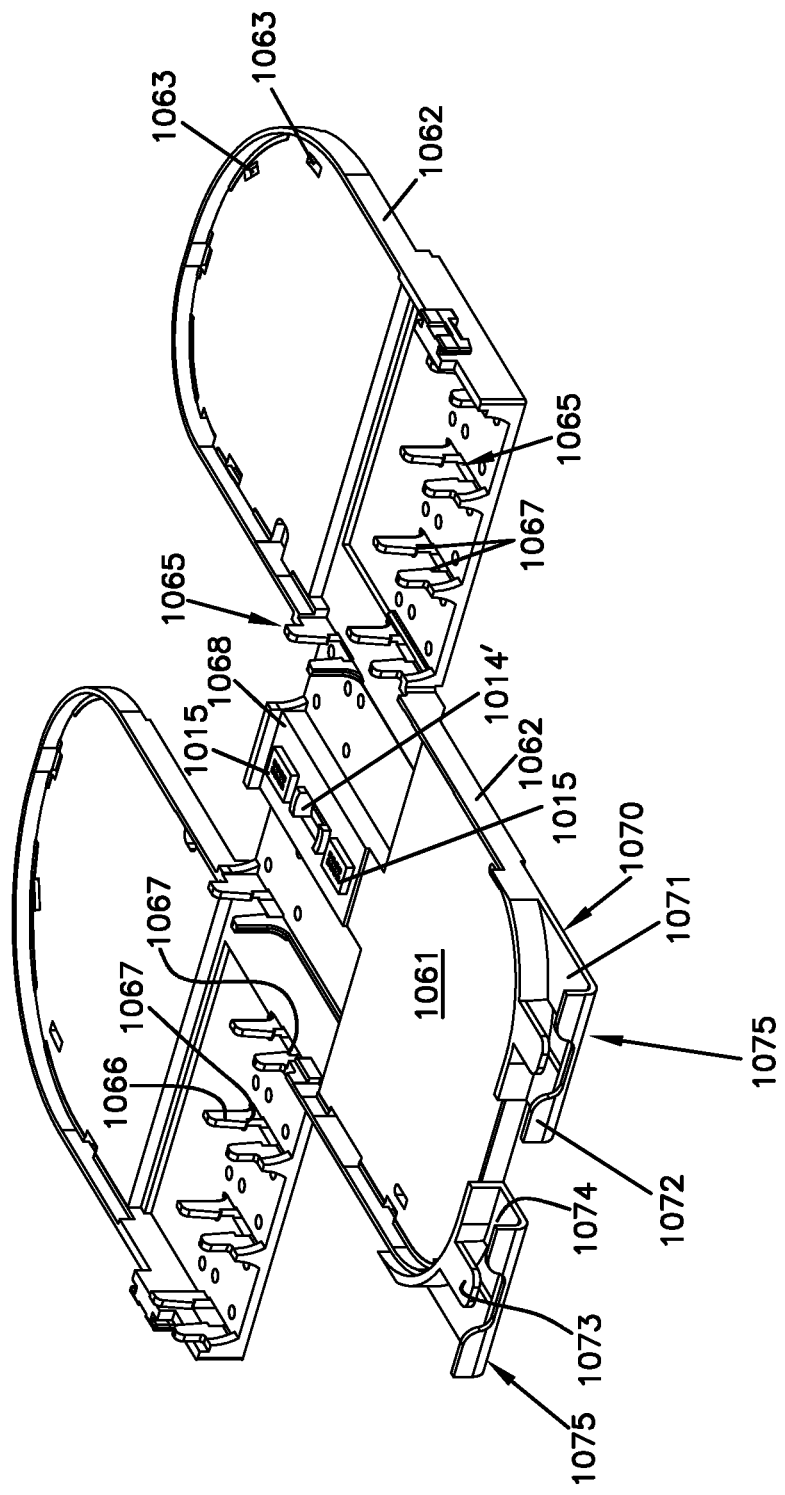
FIG. 70 is a perspective view of a bottom member of the cassette of FIG. 64.

The bottom member 1060 is configured to fit with the top member 1050. As shown in FIG. 70, the bottom member 1060 includes a raised portion 1068 sized to accommodate the channel 1013 defined along the bottom exterior of the cassette 1000. The mounting opening 1014 and the connector opening(s) 1015 are defined in the raised portion 1068. In certain examples, the interior entrance 1014' of the mounting opening 1014 is elongated having rounded edges at opposite ends (e.g., se FIG. 70). In an example, the exterior entrance of the mounting opening also is elongated with rounded ends. In other examples, the mounting opening 1014 is circular (see FIG. 65). In an example, the interior entrance of the mounting opening 1014 also is circular.

In some implementations, the bottom member 1060 also includes a cable routing arrangement 1070 disposed at an exterior thereof. In the example shown in FIG. 70, the cable routing arrangement 1070 extends outwardly from the intermediate management section 1011 at the second port end 1002 of the cassette 1000. The cable routing arrangement 1070 is configured to route optical fibers extending from the ports 1027 at the second port end 1002 laterally across the cassette 1000. In an example, the cable routing arrangement 1070 is configured to route optical fibers that extend from ports 1027 at one side of the second port end 1002 towards an opposite side of the second port end 1002.

In some examples, the cable routing arrangement 1070 includes one or more support flanges 1071 extending outwardly from the bottom member 1060. Tabs or flanges 1072 extend upwardly from each support flange 1071 to retain optical fibers on the support flange 1071. In an example, the tabs or flanges 1072 are integral with the support flanges 1071 (e.g., bent distal portions of the support flange 1071). One or more retaining fingers 1073 extend outwardly from the sidewall 1062 of the bottom member 1060 to further define the cable passage through the routing arrangement 1070.

In some implementations, the cable routing arrangement 1070 includes one or more routing members 1075. Each routing member 1075 includes a support flange 1071 and at least one retaining finger 1073. In the example shown in FIG. 70, a routing member 1075 is disposed at opposite sides of the management section 1011 of the second port end 1002. In certain implementations, the routing member 1075 can support additional fiber retention devices, such as clips or hooks. In certain implementations, the routing member 1075 can be slotted to support tie-wraps or hook-and-loop fasteners.

Figure 71:
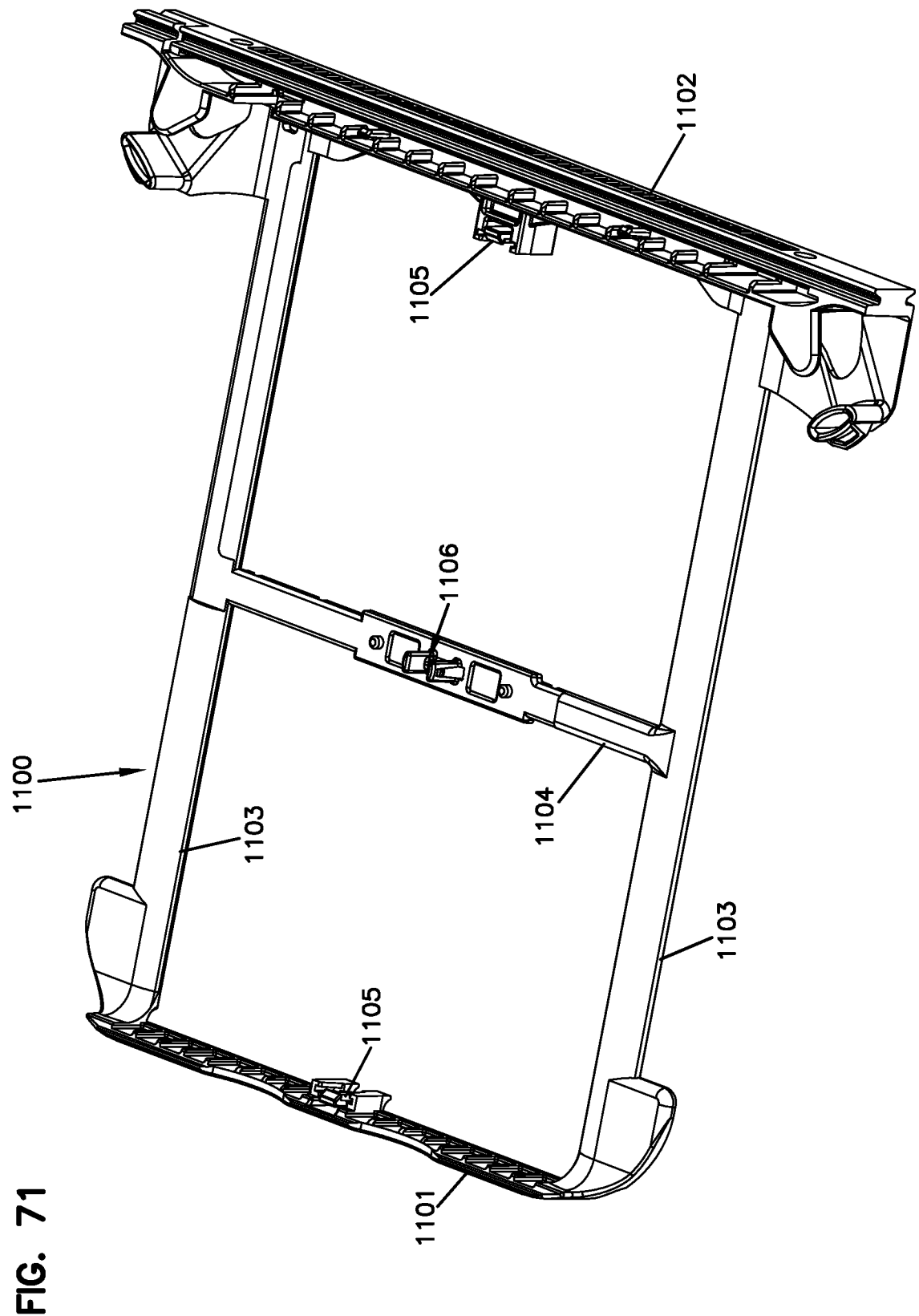
FIG. 71 is a perspective view of another example tray suitable for mounting any of the adapter block assemblies or cassettes disclosed herein.

FIG. 71 illustrates another example tray 1100 to which any of the adapter block assemblies 250, 350, 700 or cassettes 500, 900, 1000 disclosed herein can be mounted. The tray 1100 is similar to trays 400, 400', and 600 in that the tray 1100 is configured to be mounted to a rack for movement relative to the rack. For example, the tray 1100 can be slideably mounted to a side plane (e.g., see side rail 640 in FIG. 48). A circuit board arrangement is configured to mount to the tray 1100 (e.g., see circuit board arrangement 620 of FIG. 48). The circuit board arrangement is configured to communicate with components (e.g., a controller) of the circuit board arrangement of the adapter block assembly or cassette mounted to the tray 1100.

In the example shown in FIG. 71, the tray 1100 includes cross-members 1103 that extend between side rails 1101, 1102. The tray 1100 also includes a mounting rail 1104 on which the cassette or adapter block assemblies seat. In the example shown, the mounting rail 1104 extends between the cross-members 1103. Mounting members 1106 extend upwardly from the mounting rail 1104 to connect to the cassette or adapter block assembly. The tray 1100 also includes mounting structures 1105 that engage retention arrangements on the cassettes or adapter block assemblies.

In some implementations, the cassette body 1007 is shaped to fit on the tray 1100. For example, the cassette body 1007 defines the channel 1013 in which the mounting rail 1104 is accommodated. In certain implementations, the management sections 1011 extending from the first port end 1001 of the bottom member 1060 define recessed regions 1085 that seat on one of the cross-members 1103. The cross-members 1103 support the cassette 1000. The channel 1013 and recessed regions 1085 enable the cassette 1000 to seat low on the tray 1100. In an example, the channel 1013 and recessed regions 1085 enable a top of the cassette 1000 to be no more than flush with the side rail 1102.

Figure 72:
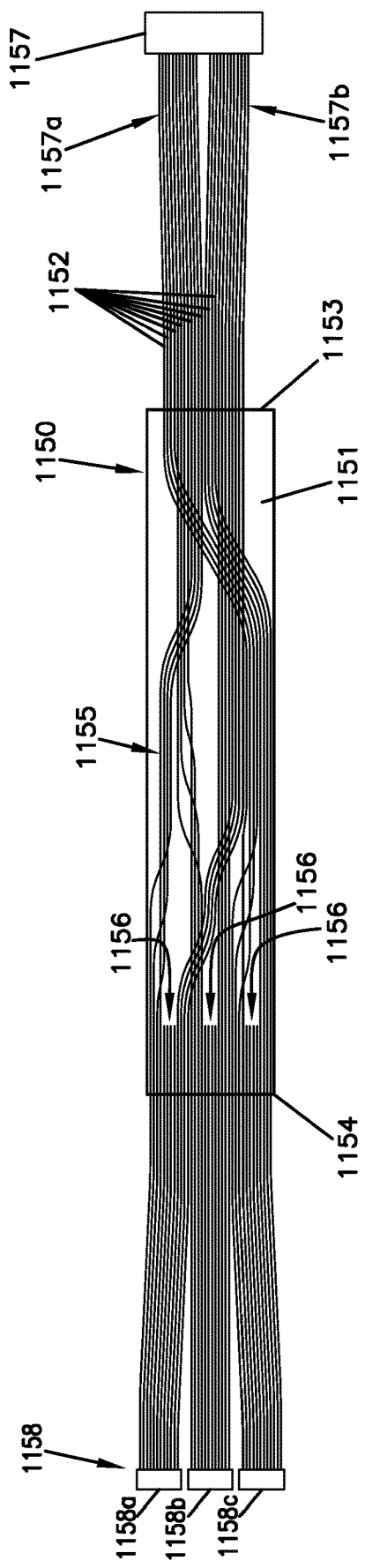
FIG. 72 illustrates one example optical fiber arrangement including a plurality of optical fibers disposed on a flexible substrate.

FIG. 72 schematically shows an example optical fiber arrangement 1150 including a flexible substrate 1151 and multiple optical fibers 1152. The flexible substrate 1151 longitudinally extends from a first end 1153 to a second end 1154. The optical fibers 1152 extend longitudinally across the flexible substrate 1151. The optical fibers 1152 are disposed on the flexible substrate 1151 so that positions of the optical fibers 1152 are fixed relative to the flexible substrate 1151. Examples of flexible substrate 1151 include adhesive tape, foil, or other flexible materials.

The optical fibers 1152 extend laterally across the first end 1153 in a row and extend laterally across the second end 1154 in a row. In certain examples, one or more of the optical fibers 1152 cross-over or otherwise laterally shift positions at an intermediate region 1155 of the flexible substrate 1151. In certain examples, additional optical fibers 1156 are disposed on the flexible substrate 1151 along with the optical fibers 1152. The additional optical fibers 1156 have first ends that terminate at a location on the flexible substrate 1151. In certain implementations, the crossing-over and shifting of the optical fibers 1152 at the intermediate region 1155 provides room to accommodate the additional optical fibers 1156.

In some implementations, the optical fibers 1152 extending from the first end 1153 of the flexible substrate 1151 are terminated by a single optical connector 1157 (e.g., an MPO connector). In an example, the optical connector 1157 terminates twenty-four optical fibers 1152 (e.g., arranged in two rows 1157a, 1157b of twelve). In another example, the optical connector 1157 terminates twelve optical fibers 1152. In other implementations, the optical fibers 1152 extending from the first end 1153 of the flexible substrate 1151 are terminated by multiple (e.g., two) optical connectors 1157 (e.g., single-fiber connectors or multi-fiber connectors).

In some implementations, the optical fibers 1152 extending from the second end 1154 of the flexible substrate 1151 are terminated by multiple optical connectors 1158 (e.g., MPO connectors). In an example, the optical fibers 1152 are terminated by two optical connectors 1158. In another example, the optical fibers 1152 are terminated by three optical connectors 1158a, 1158b, 1158c. In examples, each of the optical connectors 1158 receives twelve of the optical fibers 1152. In certain examples, end of the optical fibers 1152 are ribbonized, coated, or otherwise held together to facilitate connectorization of the optical fibers 1152. In other implementations, the optical fibers 1152 extending from the second end 1154 of the flexible substrate 1151 are terminated by multiple single-fiber connectors.

In certain examples, each of the optical connectors 1158 receives at least one of the optical connectors 1152 and at least one of the additional optical connectors 1156. In an example, each of the optical connectors 1158a, 1158b, 1158c receives eight of the optical fibers 1152 and four of the additional optical fibers 1156. In other implementations, a first optical connector 1158a can receive a different number of additional optical fibers 1156 from a second optical connector 1158b. In certain examples, end of the additional optical fibers 1156 are ribbonized, coated, or otherwise held together with the corresponding ends of the optical fibers 1152 to facilitate connectorization of the optical fibers 1152.

In certain implementations, the optical fiber arrangement 1150 can be keyed by color coding one or more of the optical fibers 1152 and/or the additional optical fibers 1156. For example, one or more of the additional optical fibers 1156 may be colored differently than the rest of the optical fibers 1152 and/or additional optical fibers 1156. In an example, each connector 1158a, 1158b, 1158c terminates a different number of colored additional optical fibers 1156. For example, the first optical connector 1158a may have a single colored additional optical fiber; the second optical connector 1158b may have two colored additional optical fibers; and the third optical connector 1158c may have three colored additional optical fibers. In other implementations, other coding sequences may be utilized.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fiber optic cassette arrangement comprising:
a body extending along a depth between a front and a rear, extending along a width between opposite first and second sides, and extending along a height between a bottom and an open top, the body defining a retention arrangement at the first side of the body, the bottom of the body defining an external channel extending along the depth of the body, the body defining a first rear port opening disposed at the rear of the body between the bottom channel and the first side of the body and a second rear port opening disposed at the rear of the body between the bottom channel and the second side of the body, and the body defining a plurality of front port openings at the front of the body;
a multi-fiber optical adapter disposed at the first rear port opening; and
a plurality of front optical adapters disposed at the front port openings.

2. The fiber optic cassette arrangement of claim 1, wherein the multi-fiber optical adapter is a first multi-fiber optical adapter; and wherein the fiber optic cassette arrangement further comprises a second multi-fiber optical adapter disposed at the second rear port opening.

3. The fiber optic cassette arrangement of claim 1, wherein the retention arrangement is configured to secure the fiber optic cassette arrangement to a tray.

4. The fiber optic cassette arrangement of claim 1, wherein the retention arrangement is a first retention arrangement; and wherein a second retention arrangement is disposed at the second side of the body.

5. The fiber optic cassette arrangement of claim 1, wherein the multi-fiber optical adapter is offset along the width of the body from the front optical adapters.

6. The fiber optic cassette arrangement of claim 1, wherein a cover is mounted to the body to close the open top and define an interior.

7. The fiber optic cassette arrangement of claim 6, further comprising optical fibers extending between the multi-fiber optical adapter and a first of the front optical adapters.

8. The fiber optic cassette arrangement of claim 7, further comprising a cable routing arrangement disposed within the interior at a fiber management region of the body, wherein the optical fibers wind around the cable routing arrangement.

9. The fiber optic cassette arrangement of claim 8, wherein the cable routing arrangement includes a spool.

10. The fiber optic cassette arrangement of claim 8, wherein a portion of the fiber management region of the body is thinner than a connection region of the body, wherein the front optical adapters are disposed at the connection region.

11. The fiber optic cassette arrangement of claim 1, wherein the front optical adapters are separated into a plurality of groups, wherein the groups are spaced apart from each other more than the front optical adapters within each group are spaced.

12. The fiber optic cassette arrangement of claim 1, further comprising a circuit board carried by the body.

13. The fiber optic cassette arrangement of claim 12, wherein the multi-fiber optical adapter is mounted to the circuit board.

14. The fiber optic cassette arrangement of claim 12, wherein the bottom of the body defines an opening in alignment with the circuit board.

15. The fiber optic cassette arrangement of claim 14, further comprising a shroud extending downwardly from the opening.

16. The fiber optic cassette arrangement of claim 14, wherein the opening is one of a plurality of openings through the bottom of the body in alignment with the circuit board.

17. The fiber optic cassette arrangement of claim 14, wherein the opening is spaced from the front optical adapters.

18. The fiber optic cassette arrangement of claim 14, wherein the opening is spaced from the multi-fiber optical adapter.

19. The fiber optic cassette arrangement of claim 14, wherein the circuit board is a first circuit board; and wherein the fiber optic cassette arrangement comprises a tray on which the fiber optic cassette is mounted, the tray carrying a second circuit board.

20. The fiber optic cassette arrangement of claim 19, further comprising electrical contacts extending through the opening between the first and second circuit boards.

* * * * *